United States Patent
Sekiya et al.

(10) Patent No.: US 12,065,376 B2
(45) Date of Patent: Aug. 20, 2024

(54) CHEMICALLY STRENGTHENED GLASS AND MANUFACTURING METHOD THEREOF

(71) Applicant: AGC INC., Tokyo (JP)

(72) Inventors: Kaname Sekiya, Tokyo (JP); Yusuke Fujiwara, Tokyo (JP)

(73) Assignee: AGC INC., Tokyo (JP)

( * ) Notice: Subject to any disclaimer, the term of this patent is extended or adjusted under 35 U.S.C. 154(b) by 14 days.

(21) Appl. No.: 17/652,543

(22) Filed: Feb. 25, 2022

(65) Prior Publication Data

US 2022/0281769 A1   Sep. 8, 2022

(30) Foreign Application Priority Data

Feb. 26, 2021 (JP) ................. 2021-030726

(51) Int. Cl.
    *B32B 15/04* (2006.01)
    *B32B 17/06* (2006.01)
    *C03C 3/083* (2006.01)
    *C03C 4/18* (2006.01)
    *C03C 21/00* (2006.01)

(52) U.S. Cl.
    CPC ............ *C03C 21/002* (2013.01); *C03C 3/083* (2013.01); *C03C 4/18* (2013.01); *C03C 2204/00* (2013.01)

(58) Field of Classification Search
    CPC .................................................. C03C 21/002
    USPC .................................................. 428/410, 426
    See application file for complete search history.

(56) References Cited

U.S. PATENT DOCUMENTS

| | | | |
|---|---|---|---|
| 11,634,359 B2 * | 4/2023 | Amin | C03C 3/091 428/141 |
| 2014/0087159 A1 * | 3/2014 | Cleary | C03C 3/095 428/339 |
| 2015/0030834 A1 | 1/2015 | Morey et al. | |
| 2015/0239775 A1 | 8/2015 | Amin et al. | |
| 2015/0239776 A1 | 8/2015 | Amin et al. | |

(Continued)

FOREIGN PATENT DOCUMENTS

| | | |
|---|---|---|
| JP | 2017-523110 A | 8/2017 |
| JP | 2020-33202 A | 3/2020 |

(Continued)

OTHER PUBLICATIONS

International Search Report and Written Opinion issued Apr. 19, 2022 in PCT/JP2022/008086, 7 pages.

*Primary Examiner* — Lauren R Colgan
(74) *Attorney, Agent, or Firm* — Oblon, McClelland, Maier & Neustadt, L.L.P.

(57) ABSTRACT

The present invention relates to a chemically strengthened glass having a thickness t (mm), in which a first-order derivative $CS_x'$ of a stress value $CS_x$ (MPa) is −4.7 or larger in a range of $CS_x \geq 0$ in a profile of the stress value $CS_x$ (MPa), in which the stress value $CS_x$ (MPa) is a function of depth $x$ (μm) from a glass surface, and in which the stress value $CS_x$ (MPa) is measured by a scattered light photoelastic stress meter, and a manufacturing method thereof.

7 Claims, 59 Drawing Sheets

(56) References Cited

U.S. PATENT DOCUMENTS

| | | |
|---|---|---|
| 2015/0259244 A1 | 9/2015 | Amin et al. |
| 2015/0368148 A1 | 12/2015 | Duffy et al. |
| 2015/0368153 A1 | 12/2015 | Pesansky et al. |
| 2016/0257605 A1 | 9/2016 | Amin et al. |
| 2016/0264452 A1 | 9/2016 | Amin et al. |
| 2017/0036952 A1 | 2/2017 | Amin et al. |
| 2017/0036953 A1* | 2/2017 | Amin ................ C03C 21/00 |
| 2017/0129803 A1 | 5/2017 | Amin et al. |
| 2018/0306658 A1 | 10/2018 | Orihara et al. |
| 2019/0047909 A1 | 2/2019 | Amin et al. |
| 2019/0219463 A1 | 7/2019 | Orihara et al. |
| 2019/0225537 A1* | 7/2019 | Kashima ............. C03C 3/087 |
| 2020/0055764 A1* | 2/2020 | Duffy ................ C03C 21/002 |
| 2020/0109083 A1 | 4/2020 | Imakita et al. |
| 2020/0131085 A1* | 4/2020 | Hu .................... C03C 3/097 |
| 2020/0148591 A1* | 5/2020 | Andrews ............. C03C 4/20 |
| 2020/0308046 A1* | 10/2020 | Amin ................. H05K 5/03 |
| 2020/0325066 A1* | 10/2020 | Murayama .......... C03C 3/097 |
| 2020/0346969 A1* | 11/2020 | Li .................... C03C 1/004 |
| 2021/0371332 A1 | 12/2021 | Ichimaru et al. |
| 2021/0387904 A1 | 12/2021 | Ichimaru et al. |
| 2022/0009820 A1 | 1/2022 | Duffy et al. |
| 2022/0041493 A1 | 2/2022 | Yuki et al. |

FOREIGN PATENT DOCUMENTS

| | | |
|---|---|---|
| WO | WO 2017/115811 A1 | 7/2017 |
| WO | WO 2018/056121 A1 | 3/2018 |
| WO | WO 2019/004124 A1 | 1/2019 |
| WO | WO 2020/075708 A1 | 4/2020 |

* cited by examiner

CHEMICALLY STRENGTHENED GLASS AND MANUFACTURING METHOD THEREOF

TECHNICAL FIELD

The present invention relates to a chemically strengthened glass and a manufacturing method thereof.

BACKGROUND ART

A chemically strengthened glass is used for cover glasses of portable terminals etc. The chemically strengthened glass is a glass in which a compressed stress layer is formed in a glass surface portion through ion exchange between alkali metal ions contained in the glass and alkali metal ions having a larger ion radius contained in a molten salt composition of by bringing a glass into contact with the molten salt composition such as sodium nitrate. The strength of the chemically strengthened glass depends on a stress profile represented by a compressive stress (hereinafter may be abbreviated as "CS") with the depth from the glass surface as a variable.

The cover glasses of portable terminals etc. may be broken by deformation that occurs when, for example, they are dropped. To prevent such breaking, that is, breaking due to bending, it is effective to increase the compressing stress at the glass surface. To this end, in recent years, it has become common to produce surface compressive stress of 700 MPa or larger.

On the other hand, the cover glasses of portable terminals etc. may also be broken by collision with a protrusion when they are dropped onto an asphalt surface or grit. To prevent such breaking, that is, breaking due to impact, it is effective to increase its strength by forming a compressive stress layer to a deeper portion of the glass by increasing the compressive stress layer depth.

However, when the compressive stress layer is formed in a surface portion of a glass article, tensile stress (hereinafter may be abbreviated as "CT") necessarily occurs in a core portion of the glass article according to the total amount of compressive stress in the surface layer. If this tensile stress value is too large, a glass article is broken violently to scatter fragments. If CT exceeds a threshold value (hereinafter referred to as a "CT limit"), the number of fragments at the time of breaking starts to increase explosively.

Thus, in a chemically strengthened glass, whereas a compressive stress layer is formed to a deeper portion by setting the surface compressive stress large, the total amount of compressive stress in a surface layer is determined so that CT does not exceed a CT limit. For example, Patent document 1 discloses a chemically strengthened glass in which CT is controlled so as to fall within a particular range.

[Patent document 1] JP-T-2017-523110 (The symbol "JP-T" as used herein means a published Japanese translation of a PCT patent application.)

As described above, a chemically strengthened glass is desired in which a compressive stress layer is formed while the tensile stress CT is made smaller than a CT limit and that is excellent in drop strength as to be able to suppress breaking when subjected to impact.

An object of the present invention is therefore to provide a chemically strengthened glass that is excellent in drop strength and hence can suppress breaking when subjected to impact, as well as a manufacturing method thereof.

SUMMARY OF INVENTION

The present inventors studied the above problems and have found that a chemically strengthened glass can be obtained in which the compressive stress in a glass deep layer that is effective in increasing the impact resistance at the time of dropping is controlled to a prescribed level or higher while the compressive stress at the glass surface is lowered, by adding a small amount of lithium ions to a molten salt composition that is used in the second-stage chemical strengthening of two-step chemical strengthening for lithium-containing glass. The inventors have found that the above object can be attained by such chemically strengthened glass and thereby completed the invention.

The present invention relates to a chemically strengthened glass having a thickness t (mm), in which a first-order derivative $CS_x'$ of a stress value $CS_x$ (MPa) is −4.7 or larger in a range of $CS_x \geq 0$ in a profile of the stress value $CS_x$ (MPa), in which the stress value $CS_x$ (MPa) is a function of depth×(μm) from a glass surface, and
in which the stress value $CS_x$ (MPa) is measured by a scattered light photoelastic stress meter.

The present invention relates to a manufacturing method for a chemically strengthened glass, the method including:

performing a first ion exchange by immersing a lithium-containing glass in a first molten salt composition containing sodium ions; and
performing a second ion exchange by immersing the lithium-containing glass obtained after the first ion exchange in a second molten salt composition containing potassium ions and lithium ions, in which:
a concentration of a sodium nitrate in the first molten salt composition is higher than 50 mass %; and
in the second molten salt composition a concentration of a potassium nitrate is 85 mass % or higher and a ratio of a mass of sodium ions to a mass of lithium ions represented by a mass ratio of (sodium ions)/(lithium ions) is 0 or larger and 15 or smaller.

The present invention relates to a manufacturing method for a chemically strengthened glass, the method including:

performing a first ion exchange by immersing a lithium-containing glass in a first molten salt composition containing sodium ions; and
performing a second ion exchange by immersing the lithium-containing glass obtained after the first ion exchange in a second molten salt composition containing potassium ions and lithium ions, in which:
the lithium-containing glass is chemically strengthened so that a maximum tensile stress $CT_2$ (MPa) of the chemically strengthened glass obtained after the second ion exchange becomes 50% to 99% of a maximum tensile stress $CT_1$ (MPa) of the chemically strengthened glass obtained after the first ion exchange.

The present invention relates to a manufacturing method for a chemically strengthened glass, the method including:

a first step of immersing a lithium-containing glass in a first molten salt composition; and
a second step of immersing the lithium-containing glass in a second molten salt composition that is different in composition from the first molten salt composition, in which:
an ion exchange for giving a stress that is larger than a CT limit to the lithium-containing glass is performed in the first step; and
a step of reducing the stress to a value lower than the CT limit is executed in the second step.

The present invention relates to a chemically strengthened glass, in which:

a base composition includes, as represented by mol % based on oxides,

SiO$_2$ of 40% to 75%;
Al$_2$O$_3$ of 1% to 20%; and
Li$_2$O of 5% to 35%; and
in which a stress value CS$_{90}$ at a depth 90 (μm) from a glass surface satisfies the following inequality:

$$CS_{90}/\{CT_2 \times (t - 2 \times DOL/1{,}000)\}/t \geq 2.0$$

where t (mm) is a thickness of the chemically strengthened glass, CT$_2$ (MPa) is maximum tensile stress and DOL (μm) is a compressive stress layer depth.

The chemically strengthened glass according to the present invention exhibits high drop strength because it is given a particular stress profile and hence its tensile stress CT is made smaller than a CT limit.

DESCRIPTION OF EMBODIMENTS

<Stress Measuring Method>

Figure 1A:
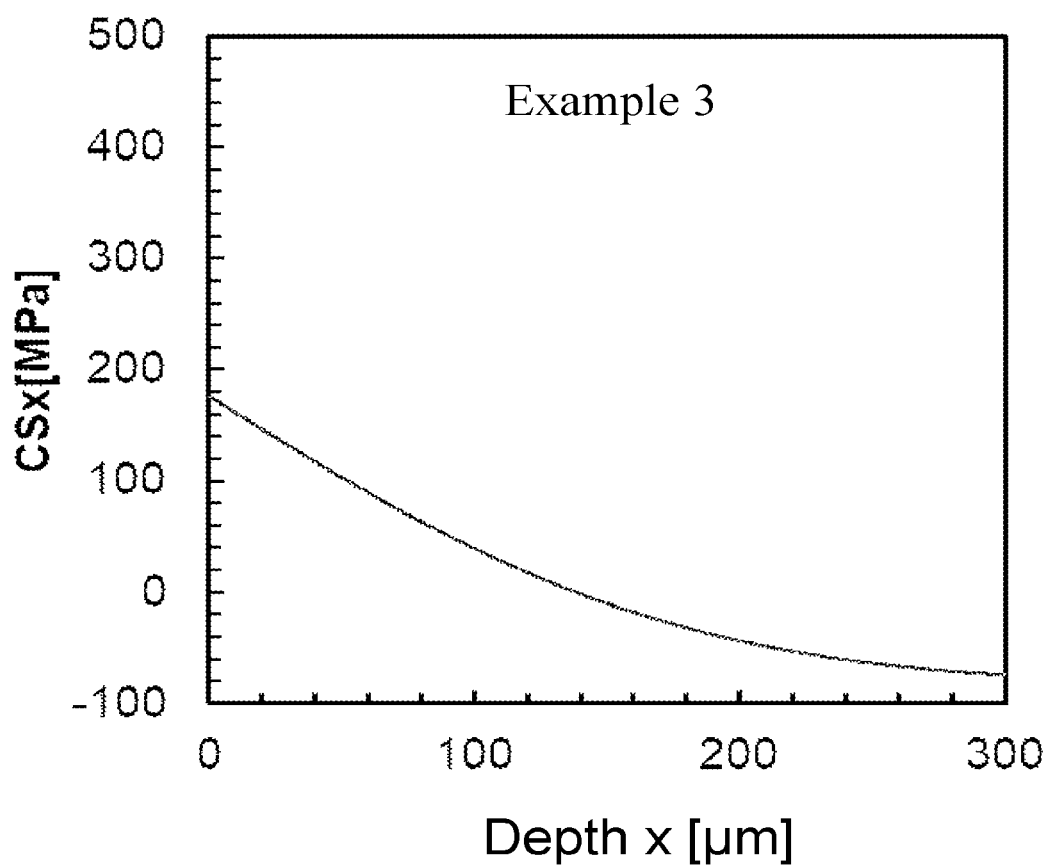
FIG. 1A is a graph showing an example stress profile of the stress value CS$_x$ of the chemically strengthened glass according to the present invention.

In recent years, glass manufactured by two-step chemical strengthening in which lithium ions in glass are replaced with sodium ions (Li—Na exchange) and then sodium ions in the glass are replaced with potassium ions (Na—K exchange) in a glass surface layer has become the mainstream glass for cover glasses of smartphones etc.

A stress profile of the chemically strengthened glass manufactured by such two-step chemical strengthening is acquired nondestructively by, for example, using a scattered light photoelastic stress meter (hereinafter may be abbreviated as "SLP") and a film stress measurement meter (hereinafter may be abbreviated as FSM) in combination.

A method using a scattered light photoelastic stress meter (SLP) can measure compressive stress originating from Li—Na exchange in a glass deep portion that is distant from the glass surface by several tens of micrometers or more. On the other hand, a method using a film stress measurement meter (FSM) can measure compressive stress originating from Na—K exchange in a glass surface layer that is distant from the glass surface by several tens of micrometers or less (refer to WO 2018/056121 and WO 2017/115811, for example). Thus, a stress profile obtained by combining information obtained by an SLP and information obtained by an FSM may be used as a stress profile, including a surface layer profile and a deep portion profile, of chemically strengthened glass manufactured by the two-step chemical strengthening.

On the other hand, the present invention employs a stress profile measured by a scattered light photoelastic stress meter (SLP) is mainly used for studying influence of sodium ions that are introduced by ion exchange. In the present specification, a stress profile measured by a scattered light photoelastic stress meter (SLP) is referred to as an "SLP stress profile" or merely as a "stress profile" and is discriminated from a stress profile obtained by combining information obtained by an SLP and information obtained by an FSM which is referred to as, for example, a "combined profile." Furthermore, terms "stress value CS$_x$", "tensile stress value CT", and "compressive stress depth DOL" etc. mean values in an SLP stress profile.

The scattered light photoelastic stress meter is a stress measuring device including: a polarization phase difference variable member configured to vary a polarization phase difference of a laser light by one wavelength of the laser light or more; an imaging element to image a plurality of times at a predetermined time interval a scattered light emitted according to the laser light with the varied polarization phase difference entering the strengthened glass, and obtain a plurality of images; and an arithmetic unit configured to measure a periodic change in luminance of the scattered light using the plurality of images, calculate a change in a phase of the change in luminance, and calculate a stress distribution in a depth direction from a surface of the strengthened glass based on the change in the phase.

An example method for measuring a stress profile using a scattered light photoelastic stress meter is a method disclosed in WO 2018/056121. Examples of scattered light photoelastic stress meters are SLP-1000 and SLP-2000 manufactured by Orihara Industrial Co., Ltd. A highly accurate stress measurement can be performed by combining each of these scattered light photoelastic stress meters with software SlpIV (ver. 2019.01.10.001) attached to it.

<Stress Profile>

A stress profile of the chemically strengthened glass according to the invention is measured by a scattered light photoelastic stress meter as described above and is characterized in that the first-order derivative CS$_x$' of stress value CS$_x$ (MPa) at a depth of x (μm) from the glass surface is −4.7 or larger in a range of CS$_x$≥0.

Figure 1B:
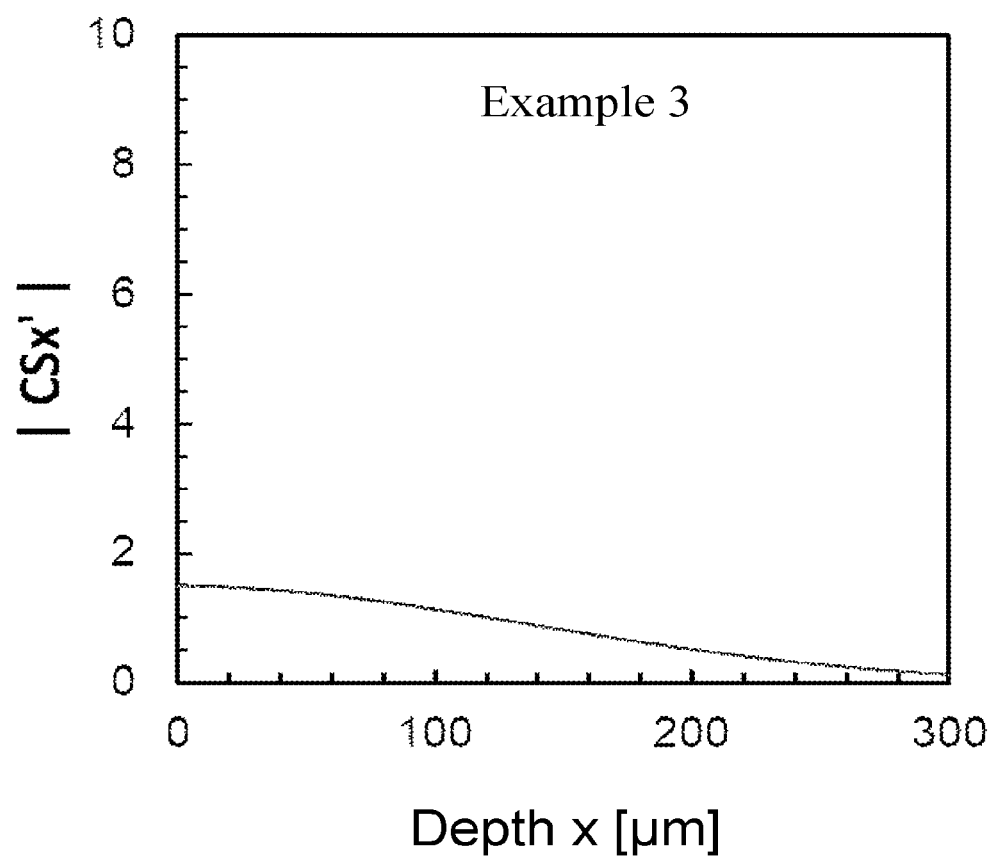
FIG. 1B is a graph showing an absolute value of a first-order derivative CS$_x$' of the stress profile of the stress value CS$_x$.
Figure 1C:
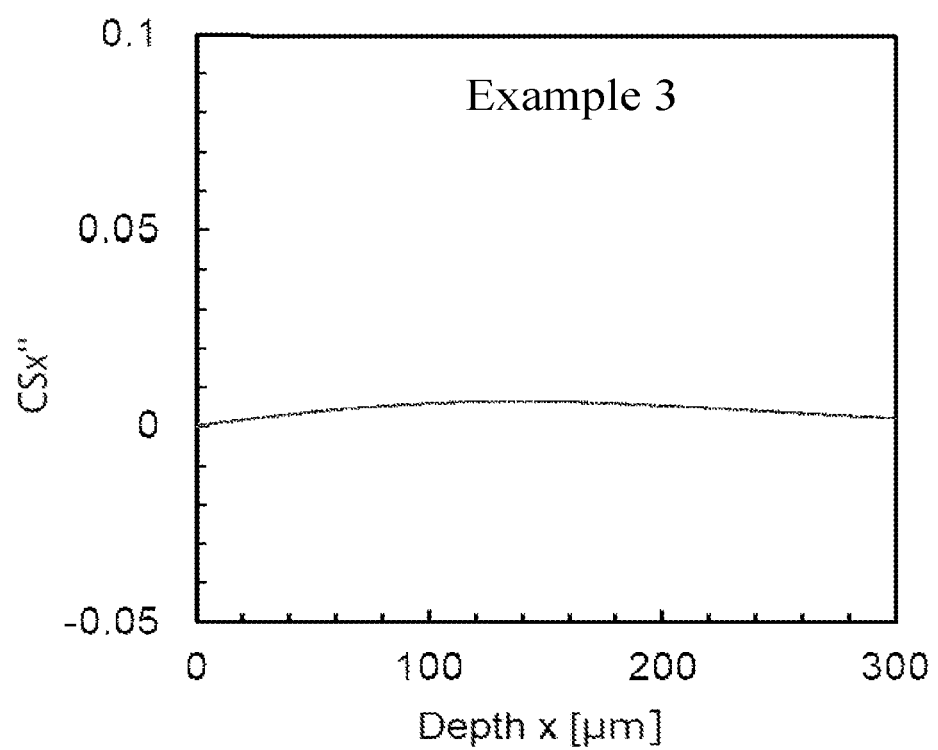
FIG. 1C is a graph showing a second-order derivative CS$_x$" of the stress profile of the stress profile of the stress value CS$_x$.

FIG. 1A shows an example stress profile of the chemically strengthened glass according to the present invention. FIG. 1B shows an absolute value of a first-order derivative of the stress profile shown in FIG. 1A. FIG. 1C shows a second-order derivative of the stress profile shown in FIG. 1A. As shown in FIG. 1A, the stress value CS$_x$ varies depending on the depth x from the glass surface. The graph shown in FIG. 1B is a graph of CS$_x$' obtained by differentiating CS$_x$ with respect to x and is plotted in terms of absolute values to make it easier to see.

As shown in FIGS. 1A and 1B, in the present invention, the first-order derivative CS$_x$' of stress value CS$_x$ is −4.7 or larger in a range of CS$_x$≥0. That is, this stress profile has a feature that the rate of stress decrease in a compressive stress layer is small.

As described later, in the chemically strengthened glass according to the present invention having the above-shaped stress profile, the resistance to fracture due to drop impact is made higher than in chemically strengthened glass manufactured by conventional two-step chemical strengthening by increasing a stress value CS$_{90}$ at a depth 90 μm. Furthermore, since the sum of compressive stress values in a compressive stress layer can be made smaller, stress values in a tensile stress layer that depend on the sum of compressive stress values in the compressive stress layer can be reduced and tensile stress CT can be made smaller than a CT limit.

A stress value $CS_{90}$ at a depth 90 μm is a parameter that contributes to increase the resistance to fracture due to drop impact. When a glass article is dropped onto an asphalt-paved road or grit, a crack may develop due to collision with a protrusion such as a grit object. Whereas the length of the crack depends on the size of the protrusion, the glass article can be prevented from breaking into fragments even when it collides with a relatively large protrusion if a compressive stress value $CS_{90}$ (MPa) at a depth of 90 μm from the glass surface is set large, in which case a stress profile having a large compressive stress portion around the depth 90 μm, for example, is formed.

In the present specification, the term "CT limit" means a maximum tensile stress CT value at a boundary where the number of fragments changes from 10 or less to 10 or more in a number-of-fragments test that will be described later in Examples. The CT limit is a value that depends on the kind of glass and is determined experimentally and relates to the thickness and a compressive stress depth DOL of glass.

A stress profile of the chemically strengthened glass according to the present invention is formed by, for example, two-step chemical strengthening. In first-stage chemical strengthening, glass is immersed in a molten salt containing sodium ions, thereby "Li—Na exchange" in which lithium ions in the glass are mainly replaced with sodium ions in the molten salt occurs. In the first-stage chemical strengthening, the molten salt may contain lithium ions or potassium ions. In the case where the molten salt contains potassium ions, "Na—K exchange" in which sodium ions in the glass are replaced with potassium ions in the molten salt occurs. As a result, compressive stress is produced at such a level that the tensile stress CT exceeds a CT limit. In the case where the molten salt contains lithium ions, "Na—Li exchange" in which sodium ions in the glass are replaced with lithium ions in the molten salt occurs, whereby a stress value CS at the glass surface is reduced. As a result, a compressive stress depth DOL can be larger, even though the chemically strengthened glass has the tensile stress CT according to the CT limit.

In the subsequent second-stage chemical strengthening, a molten salt obtained by adding a small amount of lithium ions to a molten salt containing potassium ions is used. While sodium ions in the glass are replaced with potassium ions in the molten salt (Na—K exchange), sodium ions in a glass surface layer is decreased by replacement of sodium ions in the glass with lithium ions in the molten salt (Li—Na exchange). With this treatment, only stress produced in a surface layer is reduced to a proper level and the tensile stress CT can be made smaller than the CT limit while a stress value $CS_{90}$ at a depth 90 μm is maintained.

Figure 2:
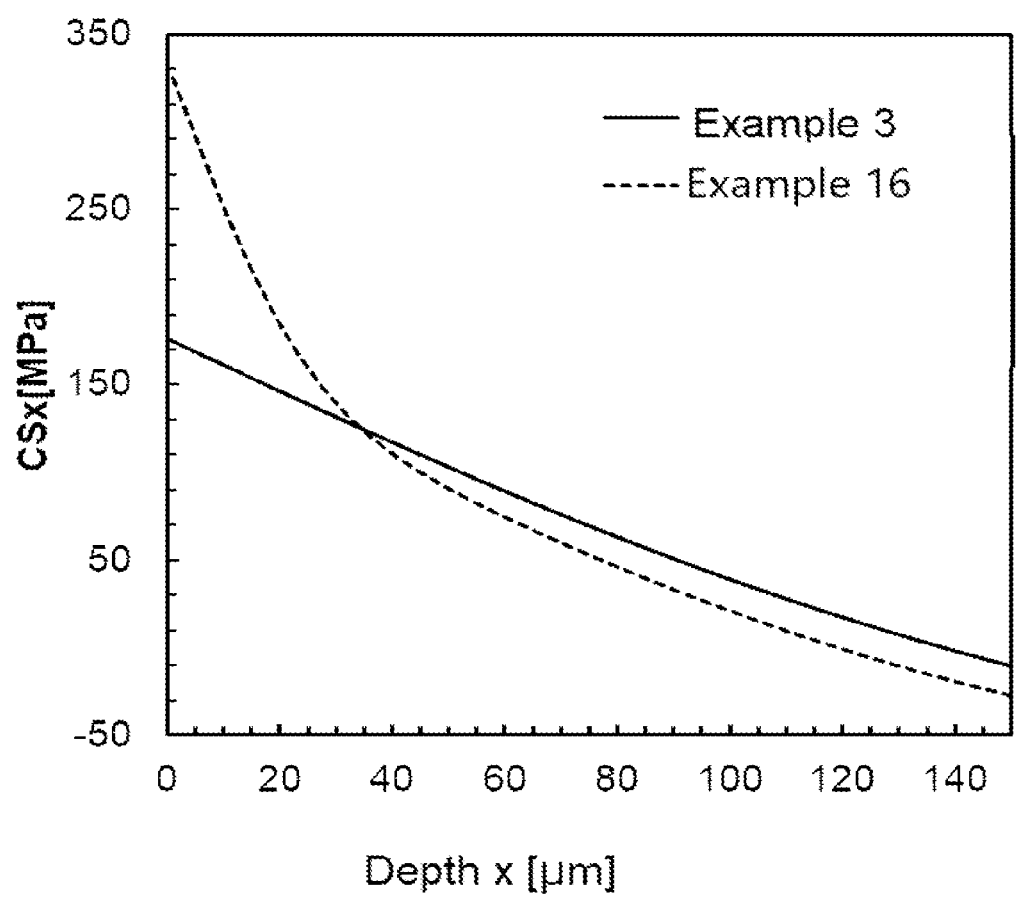
FIG. 2 shows comparison between an example CS$_x$ stress profile of chemically strengthened glass according to the invention and an example CS$_x$ stress profile of chemically strengthened glass manufactured by the conventional two-step chemical strengthening.

FIG. 2 shows comparison between an example stress profile of the chemically strengthened glass according to the present invention (Example 3) and an example stress profile of the chemically strengthened glass manufactured by the conventional two-step chemical strengthening (Example 16). As shown in FIG. 2, in the stress profile of the chemically strengthened glass according to the present invention, compressive stress produced in a surface layer is reduced and the tensile stress CT exceeds a CT limit can be avoided while a stress value $CS_{90}$ is increased.

As described above, in the chemically strengthened glass according to the present invention, since the first-order derivative $CS_x'$ of stress value $CS_x$ satisfies the relationship $CS_x' \geq -4.7$ in a range of $CS_x \geq 0$, the rate of decrease of a stress profile from a value at the surface is made small. As a result, the tensile stress CT can be made smaller than the CT limit while a stress value $CS_{90}$ at a depth 90 μm is increased to increase the resistance to fracture due to drop impact. The present invention will be described in detail below.

Embodiment of Chemically Strengthened Glass

Stress Profile in Embodiment

As described above, the chemically strengthened glass according to the present invention is characterized in that the first-order derivative $CS_x'$ of the stress value $CS_x$ (MPa) is −4.7 or larger in the profile of the stress value $CS_x$ (MPa) at the depth of x (μm) from the glass surface measured by a scattered light photoelastic stress meter. The first-order derivative $CS_x'$ of the stress value $CS_x$ is preferably −3.5 or larger, more preferably −3.0 or larger, further more preferably −2.6 or larger, and even further more preferably −1.9 or larger. In the case where the first-order derivative $CS_x'$ is in the above range, the rate of decrease of the stress profile is small, whereby stress values in a glass deep layer can be increased easily. For example, in the case where a compressive stress value $CS_0$ at the glass outermost surface is kept the same, larger $CS_x'$ provides an effect of keeping $CS_{90}$ large. The $CS_x'$ is preferably 0 or smaller, more preferably −0.3 or smaller, further more preferably −0.5 or smaller, and even further more preferably −0.8 or smaller.

FIG. 1C shows a second-order derivative $CS_x''$ of the stress value $CS_x$. The $CS_x''$ is preferably 0.050 or smaller, even more preferably 0.035 or smaller, further more preferably 0.023 or smaller, even further more preferably 0.016 or smaller, and particularly preferably 0.010 or smaller. In the case where the first-order derivative $CS_x'$ is in the above range, the $CS_x''$ comes closer to a straight line and the stress value $CS_{90}$ at the depth 90 μm can be increased more effectively. The $CS_x''$ may have a value 0, that is, the stress profile may have an inflection point. With a stress profile having an inflection point in a deep layer, the tensile stress CT can be made particularly small and hence such a stress profile is preferable from the viewpoint that CT can easily be made smaller than a CT limit. On the other hand, the stress profile may be such that $CS_x''$ is positive and has no inflection point. Having no local stress reduction, a stress profile having no inflection point is preferable in that development of a crack originating from a glass surface layer can be prevented.

As for a method for differentiating stress profile, as is understood from the following equation, rates of change of $CS_x$ for a 0.5 μm variation of x are employed as $CS_x'$ values and rates of change of $CS_x'$ for a 0.5 μm variation of x are employed as $CS_x''$ values:

$$CS_x' = (CS_{x+0.5} - CS_x)/0.5$$

$$CS_x'' = (CS_{x+0.5}' - CS_x')/0.5.$$

In chemically strengthened glass having a thickness t (mm) according to the present invention, it is preferable that $CS_{90}/\{CT_2 \times (t - 2 \times DOL/1,000)\}/t$ is 1.62 or larger, where $CT_2$ is a maximum tensile stress value (MPa) and DOL is a compressive stress layer depth (μm), more preferably 1.72 or larger, further more preferably 2.00 or larger, and even further more preferably 2.50 or larger.

There are physical phenomena that $CS_{90}$ increases with the maximum tensile stress value $CT_2$ and, on the other hand, the maximum tensile stress value $CT_2$ increases as the thickness t decreases. For generalization with elimination of influences of the thickness t, as described above, comparison is made using values of the above formula $CS_{90}/\{CT_2\times(t-2\times DOL/1,000)\}/t$. The chemically strengthened glass according to the present invention can increase the drop strength if $CS_{90}/\{CT_2\times(t-2\times DOL/1,000)\}/t$ is 1.62 or larger.

In chemically strengthened glass having a thickness t (mm) according to the present invention, it is preferable that a maximum tensile stress value $CT_2$ (MPa) measured by the scattered light photoelastic stress meter be $19.5/(t/2-DOL/1,000)$ or smaller. In the case where the thickness is t (mm) and the value of $CT_2$ (MPa) is $19.5/(t/2-DOL/1,000)$ or smaller, $CT_2$ is made a CT limit or smaller and occurrence of violent fracture can be suppressed. Since a CT limit is determined by a thickness t of chemically strengthened glass and a compressive stress depth DOL, the above value, for example, can be used as a replacement value for a CT limit instead of determining a CT limit by a number-of fragments test to be described in Examples.

On the other hand, it is preferable that a maximum tensile stress value $CT_2$ (MPa) as measured by a scattered light photoelastic stress meter be $15/(t/2-DOL/1,000)$ or larger. In the case where $CT_2$ (MPa) is $15/(t/2-DOL/1,000)$ or larger, sufficiently large compressive stress can be introduced according to a compressive stress layer to increase the strength.

In the chemically strengthened glass according to the present invention, a compressive stress value $CS_0$ at the glass outermost surface as measured by a scattered light photoelastic stress meter is preferably 300 MPa or smaller, more preferably 275 MPa or smaller, further more preferably 245 MPa or smaller, and even further more preferably 200 MPa or smaller. In the case where $CS_0$ is 300 MPa or smaller, the total amount of stress in a compressive stress layer can be decreased, a maximum tensile stress $CT_2$ can be reduced so as to be smaller than a CT limit.

In the chemically strengthened glass according to the present invention, where its thickness is t (mm), the compressive stress depth DOL (μm) is preferably larger than (100 t+30), even more preferably (100 t+40) or larger, further more preferably (100 t+45) or larger, even further more preferably (100 t+50) or larger. In the case where the thickness is t (mm) and the compressive stress depth DOL is larger than (100 t+30), compressive stress is introduced to a deep portion in the glass thickness direction, which is advantageous to preventing fracture due to impact. On the other hand, to balance the total amount of the compressive stress and the tensile stress in the glass thickness direction, where the thickness is t (mm), the DOL (m) is preferably (100 t+90) or smaller, more preferably (100 t+85) or smaller, and further more preferably (100 t+80) or smaller.

(Base Composition of Chemically Strengthened Glass)

The base composition of the chemically strengthened glass according to the present invention coincides with the composition of glass before being subjected to chemical strengthening, which is described later. The base composition is a composition of a portion in such a region as not to be influenced by ion exchange, and is a composition of portion that is deeper than a compressive stress depth DOL of the chemically strengthened glass except for a case that it has been subjected to extreme ion exchange treatment.

<Embodiment of Manufacturing Method of Chemically Strengthened Glass>

The chemically strengthening treatment is treatment of replacing metal ions having a small ion radius (typically, lithium ions or sodium ions) in glass with metal ions having a large ion radius (typically, sodium ions or potassium ions for lithium ions and potassium ions for sodium ions) in the metal salt by, for example, a method of immersing glass in a melt of a metal salt (e.g., sodium nitrate or potassium nitrate) containing metal ions having a large ion radius (typically, sodium ions or potassium ions).

A manufacturing method for chemically strengthened glass according to the present invention has the following features:

(Process 1) First ion exchange is performed by immersing lithium-containing glass in a first molten salt composition in which the concentration of sodium nitrate is higher than 50 mass %.

(Process 2) Second ion exchange is performed by immersing the lithium-containing glass after the first ion exchange in a second molten salt composition in which the ratio of a mass of sodium ions to a mass of lithium ions represented by the mass ratio of (sodium ions/lithium ions) is 0 or larger and 15 or smaller.

Each of these processes will be described below in detail.
(Process 1) First Ion Exchange Process In the first process of the manufacturing method of chemically strengthened glass according to the present invention, first ion exchange is performed by immersing lithium-containing glass in a first molten salt composition containing sodium ions. The details of lithium-containing glass to be subjected to chemical strengthening will be described later in detail.

In Process 1, sodium ions are introduced to a glass deep layer by "Li—Na exchange" in which lithium ions in the glass are exchanged with sodium ions in the molten salt, whereby a deep compressive stress layer can be formed.

The term "molten salt composition" means a composition containing a molten salt. Examples of a molten salt contained in a molten salt composition include a nitrate salt, a sulfate salt, a carbonate salt, and a chloride salt. Examples of nitrate salt include lithium nitrate, sodium nitrate, potassium nitrate, cerium nitrate, rubidium nitrate, and silver nitrate. Examples of sulfate salt include lithium sulfate, sodium sulfate, potassium sulfate, cesium sulfate, rubidium sulfate, and silver sulfate. Examples of chloride include lithium chloride, sodium chloride, potassium chloride, cesium chloride, rubidium chloride, and silver chloride. These molten salts may be used either singly or in a combination of plural kinds.

The molten salt composition is preferably a composition having a nitrate salt as a base component, more preferably a composition having sodium nitrate or potassium nitrate as a base component. The expression "as a base component" means that the content of the salt in the molten salt composition is 80 mass % or higher.

In first ion exchange, the content of sodium nitrate in the first molten salt composition is higher than 50 mass %. In the first embodiment, the content of sodium nitrate in the first molten salt composition may be 65 mass % or higher, 75 mass % or higher, 85 mass % or higher, or 95 mass % or higher. In the case where the content of sodium nitrate is in the above range, amount of sodium ions which are introduced into a glass deep layer becomes to be large by "Li—Na exchange," whereby an effect of increasing $CS_{90}$ is obtained.

On the other hand, in the case where potassium nitrate is added in the first molten salt composition, the content of potassium nitrate may be 35% or lower, 25 mass % or lower, 15% or lower, or 5% or lower. In the case where the content of potassium nitrate is in the above range, a sufficient amount of sodium ions can be introduced into a glass deep layer because "Li—Na exchange" works dominantly over "Na—K exchange."

It is preferable that a maximum tensile stress value $CT_1$ of a stress profile that is formed inside the glass by the first ion exchange is larger than a CT limit. In the case where the maximum tensile stress value $CT_1$ obtained after the first ion exchange is larger than the CT limit, a sufficiently large compressive stress is produced by the first ion exchange and $CS_{90}$ can be kept large even after stress values in a glass surface layer are lowered by the subsequent second ion exchange process.

More preferably, ion exchange is performed so that the maximum tensile stress value $CT_1$ of the chemically strengthened glass obtained after the first ion exchange becomes larger than $17.5/(t/2-DOL/1,000)$. That is, a maximum tensile stress $CT_1$ (MPa) of the chemically strengthened glass obtained after the first ion exchange preferably satisfies $CT_1 > 17.5/(t/2-DOL/1,000)$, where t is a thickness of a the chemically strengthened glass and DOL (μm) is a compressive stress layer depth. In the case where the maximum tensile stress value $CT_1$ is larger than $17.5/(t/2-DOL/1,000)$, compressive stress can be introduced so that $CT_1$ exceeds a CT limit.

In Process 1, the lithium-containing glass is preferably immersed in the first molten salt composition whose temperature is 360° C. or higher. In the case where the temperature of the first molten salt composition is 360° C. or higher, the ion exchange proceeds easily and compressive stress can be introduced in such a range that $CT_1$ exceeds the CT limit. The temperature of the first molten salt composition is more preferably 380° C. or higher and further more preferably 400° C. or higher. From the viewpoints of occurrence of danger and variation of the composition of the first molten salt composition caused by evaporation, the temperature of the first molten salt composition is usually set at 450° C. or lower.

From the viewpoint of increasing the surface compressive stress, it is preferable that the time for which the lithium-containing glass is immersed in the first molten salt composition is 0.5 hour or longer, more preferably 1 hour or longer. If the immersion time is too long, not only the productivity lowers but also the compressive stress may lower due to a relaxation phenomenon. Thus, the immersion time is usually set at 12 hours or shorter.

(Process 2) Second Ion Exchange Process

Process 2 is a process of performing second ion exchange by immersing glass subjected to the first ion exchange process in Process 1 in a second molten salt composition that has potassium nitrate as a base component and contains a small amount of lithium ions.

In the second ion exchange, "Na—K exchange" in which sodium ions in the glass are replaced with potassium ions occurs, whereby potassium ions are introduced into a glass surface layer having a thickness of several tens of micrometers. At the same time, the amount of sodium ions in a glass surface layer is lowered by "Na—Li exchange," whereby the compressive stress produced by sodium ions is reduced. In the second ion exchange, the compressive stress in the chemically strengthened glass is reduced while $CS_{90}$ is maintained and it is adjusted so that $CT_2$ becomes smaller than the CT limit. Incidentally, a stress profile measured by an SLP does not reflect influence of stress in the glass surface layer in which potassium ions have been introduced. Thus, tensile stress reduction caused by the decrease of sodium ions can be checked using a stress profile measured by an SLP.

The concentration of potassium nitrate in the second molten salt composition is preferably 85 mass % or higher, more preferably 90 mass % or higher, and further more preferably 95 mass % or higher. Although there are no particular limitations on the upper limit, the concentration of potassium nitrate is usually 99.9 mass % or lower. Furthermore, the ratio of the mass of sodium ions to a mass of lithium ions represented by a mass ratio of (sodium ions)/(lithium ions) in the second molten salt composition is preferably 0 or larger and 15 or smaller. The mass ratio of (sodium ions)/(lithium ions) being in the above range means that a lithium salt such as lithium nitrate is added to the second molten salt composition intentionally.

In the case where, for example, sodium nitrate is added to the second molten salt composition, lithium ions in the glass are replaced with sodium ions in the second molten salt composition (Li—Na exchange), whereby lithium ions are mixed into the second molten salt composition. The amount of lithium ions that are mixed into the second molten salt composition at this time increases according to the amount of sodium ions contained in the second molten salt composition.

On the other hand, the replacement of sodium ions in the glass with lithium ions mixed in the second molten salt composition (Na—Li exchange) is suppressed by the sodium ions in the second molten salt composition. Thus, the compressive stress that was produced in the glass surface layer in Process 1 can be weakened by effectively causing the replacement of sodium ions in the glass with lithium ions in the second molten salt composition (Na—Li exchange) by adding lithium ions in the second molten salt composition intentionally by an amount that is larger than or equal to an amount of sodium ions mixed in it by addition of sodium nitrate.

It is preferable that the second molten salt composition contain lithium nitrate of 0.1 mass % or higher and 10 mass % or lower. In the case where the second molten salt composition contains lithium nitrate in this range, replacement of sodium ions introduced in the vicinity of the glass surface in Process 1 with lithium ions in the second molten salt composition occurs parallel with replacement of those sodium ions with potassium ions in the second molten salt composition, whereby the compressive stress in a glass surface layer can be weakened. The content of lithium nitrate in the second molten salt composition is more preferably 0.3 mass % or higher and 5 mass % or lower and further more preferably 0.5 mass % or higher and 2.5 mass % or lower.

The second molten salt composition may contain sodium nitrate. In the case where the second molten salt composition contains sodium nitrate, the concentration of sodium nitrate is preferably higher than 0.1 mass % and more preferably 0.5 mass % or higher. In the case where the concentration of sodium nitrate in the second molten salt composition is in the above range, the effect of increasing $CS_{90}$ is enhanced. The presence of sodium ions in the second molten salt composition causes Li—Na exchange to proceed also in the second ion exchange, whereby $CS_{90}$ is increased. Furthermore, in the case where the concentration of sodium nitrate in the second molten salt composition is in the above range, the period when the effect of the present invention is demonstrated can be elongated without replacing the second molten salt composition, whereby the amount of glass processed can be increased. The concentration of sodium nitrate in the second molten salt composition is preferably 5 mass % or lower, more preferably 3 mass % or lower, further more preferably 2 mass % or lower, and most preferably 1 mass % or lower. Setting the concentration of sodium nitrate in the above range makes it easier to suppress the maximum tensile stress value $CT_2$ within the CT limit.

The second molten salt composition may further contain an additive other than nitrate salts. Examples of additive include a silicic acid and a particular inorganic salt. In the case where the second molten salt composition contains an additive, $CS_0$ in a combined profile of FSM and SLP can be increased. A detailed description will be made below.

The second molten salt composition may contain a silicic acid as an additive. The silicic acid is a compound that consists of silicon atoms, hydrogen atoms, and oxygen atoms and is expressed by a chemical formula $nSiO_2 \cdot xH_2O$, where n and x are natural numbers. Examples of silicic acid include metasilicic acid ($SiO_2 \cdot H_2O$), di silicic acid ($2SiO_2 \cdot H_2O$), orthosilicic acid ($SiO_2 \cdot 2H_2O$), pyrosilicic acid ($2SiO_2 \cdot 3H_2O$), and silica gel ($SiO_2 \cdot mH_2O$, m is a real number of 0.1 to 1).

In the case where a silicic acid is contained, since the silicic acid absorbs a lithium ion to facilitate potassium ions to enter the glass, the stress in a surface layer having a thickness of several micrometers in the combined profile of FSM and SLP can be increased while CT is suppressed. Since lithium ions react with sodium ions through "Na—Li exchange," the progress of "Na—K exchange" can be suppressed. Thus, the addition of a silicic acid is effective in accelerating "Na—K exchange."

The addition amount of the silicic acid is preferably 0.1 mass % or larger, more preferably 0.3 mass % or larger, and most preferably 0.5 mass % or larger. On the other hand, the addition amount of the silicic acid is preferably 3 mass % or smaller, more preferably 2 mass % or smaller, and most preferably 1 mass % or smaller. In the case where the addition amount of the silicic acid is in the above range, the surface layer stress in an SLP stress profile can be reduced meaningfully by "Na—Li exchange." That is, the effects of a rise of compressive stress in a surface layer having a thickness of several micrometers in the combined profile by introduction of potassium ions and reduction of stress in a layer to DOL in an SLP profile through decrease of sodium ions can be obtained.

It is preferable that the silicic acid is silica gel ($SiO_2 \cdot mH_2O$, m is a real number of 0.1 to 1). Since silica gel has relatively large size of secondary particles, silica gel is easily sedimented in a molten salt and hence has an advantage that it can be input and collected easily. Since silica gel do not swirl as particles, silica gel can secure safety of workers. Furthermore, since silica gel has a porous body, a molten salt tends to be supplied to the surfaces of primary particles, silica gel is superior in reactivity and exhibits a great effect of absorbing lithium ions.

The second molten salt composition may contain a particular inorganic substance (hereinafter referred to as flux) as an additive. The flux is preferably a carbonate salt, a hydrogen carbonate salt, a phosphate salt, a sulfate salt, a hydroxide, and a chloride. It is more preferable that the second molten salt composition contain at least one selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, NaOH, KCl, and NaCl. It is further more preferable that the second molten salt composition contain at least one kind selected from the group consisting of $K_2CO_3$ and $Na_2CO_3$. It is particularly preferable that the second molten salt composition contain $K_2CO_3$.

Whereas lithium ions in the second molten salt composition can weaken compressive stress originating from sodium ions in the glass through "Na—Li" exchange, they may obstruct "Na—K exchange." If "Na—K exchange" is impaired, it becomes difficult to obtain the effect of increasing $CS_0$ in the combined profile by introducing potassium ions in a glass surface layer. In the second molten salt composition, the mutual energy with an anion generated from flux increases in order of a potassium ion, a sodium ion, and a lithium ion. In the case where the second molten salt composition contains flux, since anions generated from the flux attract lithium ions, the phenomenon that lithium ions impair "Na—K exchange" can be suppressed, allowing potassium ions to be introduced into the glass easily. On the other hand, since anions generated from flux do not suppress "Na—Li exchange", the stress originating from sodium ions in the glass can be weakened. As a result, the effect of increasing $CS_0$ in the combined profile can be obtained while the effect of weakening the compressive stress in a layer from the surface to DOL in an SLP profile is maintained. Among anions, a carbonate salt is preferable because it is high in the effect of attracting a lithium ion and hence is particularly high in the effect of increasing $CS_0$ in the combined profile.

The content of a carbonate salt is preferably 0.1 mass % or higher, in which case the effect of increasing $CS_0$ can be obtained easily. On the other hand, to suppress variation of the properties of the glass surface, that the content of a carbonate salt is preferably 2 mass % or lower and more preferably 1 mass % or lower.

It is preferable that the second molten salt composition contain one of a silicic acid and a carbonate salt. It is more preferable that the second molten salt composition contain both of a silicic acid and a carbonate salt because in that case the effect of increasing $CS_0$ can be obtained particularly easily.

It is preferable that in Process 2 lithium-containing glass be immersed in the second molten salt composition whose temperature is 360° C. or higher. When the temperature of the second molten salt composition is 360° C. or higher, ion exchange proceeds easily. The temperature of the second molten salt composition is more preferably 380° C. or higher and further more preferably 400° C. or higher. From the viewpoint of occurrence of danger and variation of composition of the second molten salt composition caused by evaporation, the temperature of the second molten salt composition is usually set at 450° C. or lower. From the viewpoint of preventing excessive stress decrease due to "Na—Li" exchange, the temperature of the second molten salt composition is more preferably 435° C. or lower.

In Process 2, the time in which lithium-containing glass is immersed in the second molten salt composition is preferably 0.1 hour or longer, in which case sodium ions that were introduced into a layer close to the glass surface in Process 1 are replaced sufficiently with lithium ions in the second molten salt composition and hence the stress at the glass surface can be weakened easily. The immersion time is more preferably 0.5 hour or longer and further more preferably 0.75 hour or longer. From the viewpoint of preventing excessive stress decrease by "Na—Li exchange", the immersion time is preferably 3 hours or shorter.

It is preferable that the time t2 (min) in which the lithium-containing glass is immersed in the second molten salt composition whose temperature is at T (° C.) satisfy the following inequality, in which case the stress at the glass surface can be weakened to a proper value:

$$-0.38\ T + 173 < t2 < -1.4\ T + 720.$$

The time t2 (min) is preferably longer than (−0.38 T+173), more preferably (−0.36 T+167) or longer, and further more preferably (−0.35 T+167) or longer. On the other hand, the time t2 (min) is preferably shorter than (−1.4 T+720), more preferably (−1.3 T+670), and further more preferably (−1.2 T+620).

In Process 2, it is preferable to adjust the temperature of the second molten salt composition in which lithium-containing glass is to be immersed and the immersion time. More specifically, if the temperature of the second molten salt composition in which lithium containing glass is to be immersed is 380° C., the immersion time is preferably 30 minutes or longer and 180 minutes or shorter. If the temperature of the second molten salt composition in which lithium-containing glass is to be immersed is 400° C., the immersion time is preferably 20 minutes or longer and 150 minutes or shorter. If the temperature of the second molten salt composition in which lithium-containing glass is to be immersed is 420° C., the immersion time is preferably 10 minutes or longer and 120 minutes or shorter. If the temperature of the second molten salt composition in which lithium-containing glass is to be immersed is higher than 420° C., the immersion time is preferably 100 minutes or shorter.

As described above, it is preferable that the second ion exchange be performed so that the maximum tensile stress value $CT_2$ of the chemically strengthened glass obtained after the second ion exchange becomes the CT limit or smaller.

Furthermore, the chemical strengthening is preferably performed so that the maximum tensile stress value $CT_2$ (MPa) of the chemically strengthened glass obtained after the second ion exchange becomes 50% to 99% of the maximum tensile stress value $CT_1$ (MPa) of the chemically strengthened glass obtained after the first ion exchange, more preferably 60% or larger, further more preferably 75% or larger, and even further more preferably 80% or larger.

It is more preferable that the chemical strengthening be performed so that the maximum tensile stress value $CT_2$ (MPa) after the second ion exchange is 19.5/(t/2−DOL/1,000) or smaller, where t is the thickness of the chemically strengthened glass and DOL is the depth (μm) of a compressive stress layer.

(Third and Subsequent Ion Exchange Processes)

In the manufacturing method according to the present invention, a plurality time of ion exchange processes may further be executed before and after Process 2. For example, in the case where third ion exchange is performed after Process 2, it is preferable to perform chemical strengthening at 380° C. to 420° C. for 5 to 30 minutes using a molten salt composition containing potassium nitrate of 95 mass % or higher. In this case, the concentration of potassium nitrate is preferably 95 mass % or higher, more preferably 97 mass % or higher, and further more preferably 99 mass % or higher. Such third ion exchange provides an effect of increasing the compressive stress at the outermost surface in a combined profile.

(Lithium-Containing Glass)

In the manufacturing method of chemically strengthened glass according to the present invention, chemical strengthening is performed on lithium-containing glass. In the present invention, the glass for chemical strengthening is preferably lithium aluminosilicate glass and may be crystallized glass or amorphous glass. In the present invention, the base composition of the chemically strengthened glass coincides with the composition of the glass for chemical strengthening. In the case where the glass for chemical strengthening is crystallized glass, resulting chemically strengthened glass is also crystallized glass.

More specifically, as for the composition of lithium-containing glass, it is preferable that lithium-containing glass be lithium aluminosilicate glass containing, as represented by mol % based on oxides of oxides, $SiO_2$ of 52% to 75%;
$Al_2O_3$ of 8% to 20%; and
$Li_2O$ of 5% to 16%.

More specifically, as for the composition of lithium-containing glass, it is preferable that lithium-containing glass be lithium aluminosilicate glass containing, as represented by mol % based on oxides of oxides, $SiO_2$ of 40% to 75%;
$Al_2O_3$ of 1% to 20%; and
$Li_2O$ of 5% to 35%.

In the present specification, the symbol "-" (or the word "to") is used to express a numerical range including the numerical values written before and after it as a lower limit value and an upper limit value, respectively, unless otherwise specified.

In the present specification, a glass composition is described in mol % based on oxides and mol % may be written simply as "%" unless otherwise specified. The expression "substantially not contains" means that the substance in a raw material or the like is lower than or equal to an impurity level, that is, the substance is not contained intentionally. More specifically, for example, the content of the substance is lower than 0.1%.

Preferable glass compositions will be hereinafter described.

$SiO_2$ is a component that constitutes a framework of glass. $SiO_2$ is also a component that increases chemical durability and lowers the probability of development of cracks when a glass surface is scratched.

The content of $SiO_2$ is preferably 40% or higher, more preferably 55% or higher, and particularly preferably 65% or higher. On the other hand, from the viewpoint of increasing the meltability, the content of $SiO_2$ is preferably 75% or lower, more preferably 72% or lower, further more preferably 70% or lower, and particularly preferably 68% or lower.

$Al_2O_3$ is a component that is effective from the viewpoints of improving the ion exchange performance at the time of chemical strengthening and increasing the surface compressive stress obtained after the strengthening.

The content of $Al_2O_3$ is preferably 1% or higher, more preferably 6% or higher, further more preferably 9% or higher, and particularly preferably 11% or higher. Typically, the $Al_2O_3$ content is 12% or higher. On the other hand, if the content of $Al_2O_3$ is too high, crystals grow easily while materials are in a molten state and the production yield is prone to lower due to devitrification defects. Furthermore, the glass viscosity increases to lower the meltability. The content of $Al_2O_3$ is preferably 20% or lower, more preferably 19% or lower, and further more preferably 18% or lower.

$SiO_2$ and $Al_2O_3$ are both a component that stabilizes the glass structure. To lower the brittleness, the total content of $SiO_2$ and $Al_2O_3$ is preferably 65% or higher, more preferably 70% or higher, and further more preferably 75% or higher.

$Li_2O$ is a component for producing surface compressive stress by ion exchange as well as a component for increasing the glass meltability. In the case where the glass for chemical strengthening contains $Li_2O$, a stress profile can be obtained in which the surface compressive stress is large and a compressive stress layer is thick by the method of replacing lithium ions in a glass surface layer with sodium ions and, furthermore, replacing sodium ions with potassium ions. From the viewpoint of facilitating formation of a preferable stress profile, the content of $Li_2O$ is preferably 5% or higher, more preferably 7% or higher, further more preferably 9% or higher, particularly preferably 10% or higher, and most preferably 11% or higher.

On the other hand, if the content of $Li_2O$ is too high, the crystal growth rate at the time of glass shaping becomes so high as to worsen the problem of production yield reduction due to devitrification defects. The content of $Li_2O$ is preferably 35% or lower, more preferably 25% or lower, further more preferably 15% or lower, and particularly preferably 12% or lower.

Whereas $Na_2O$ and $K_2O$ are not essential components, they are components for increasing the glass meltability and lowering the glass crystal growth rate. To enhance the ion exchange performance, it is preferable that they be contained at 2% or higher in total. Their total content of $Na_2O$ and $K_2O$ is preferably 10% or lower, more preferably 9% or lower, further more preferably 8% or lower, even further more preferably 7% or lower, and particularly preferably 5% or lower.

$Na_2O$ is a component for forming a surface compressive layer in chemically strengthening treatment that uses a potassium salt as well as a component for increasing the glass meltability. To have it exhibit these effects, the content of $Na_2O$ is preferably 1% or higher, more preferably 2% or higher, further more preferably 3% or higher, and particularly preferably 4% or higher. On the other hand, from the viewpoints of preventing reduction of surface compressive stress ($CS_0$) in strengthening treatment using a sodium salt and realizing a profile having a large $CS_{90}$ value, the content of $Na_2O$ is preferably 8% or lower, more preferably 7% or lower, further more preferably 6% or lower, and particularly preferably 5% or lower.

$K_2O$ may be contained to, for example, enhance the ion exchange performance. In the case where $K_2O$ is contained, the content of $K_2O$ is preferably 0.1% or higher, more preferably 0.15% or higher, and particularly preferably 0.2% or higher. To prevent devitrification more surely, the content of $K_2O$ is preferably 0.5% or higher and more preferably 1.2% or higher. On the other hand, a high content of K is a factor in brittleness and reduction of surface layer stress due to reverse exchange at the time of strengthening. Thus, the content of $K_2O$ is preferably 5% or lower and more preferably 3% or lower.

The balance of $Li_2O$, $Na_2O$, and $K_2O$ influences the ion exchange performance. In the value obtained by dividing the proportion of $K_2O$ in a composition by a ratio of $Na_2O$ content to a $Li_2O$ content, that is, $K_2O/(Na_2O/Li_2O)$, if the value is preferably 0.8 or larger, more preferably 1 or larger, further more preferably 1.5 or larger, and even further more preferably 2 or larger, the content of sodium ions in a glass surface layer can be lowered sufficiently while $CS_{90}$ is kept large when the glass for chemical strengthening is immersed in the second molten salt composition having potassium nitrate as a base component and containing a small amount of lithium ions in second ion exchange.

Furthermore, if the value of $K_2O/(Na_2O/Li_2O)$ is, for example, 3 or larger, the sodium ions in a glass surface layer can be decreased more easily in the second ion exchange, making it easier to increase deep layer stress and form a stress profile having an inflection point in a deep layer. A stress profile having an inflection point in a deep layer is preferable from the viewpoints of making the tensile stress variation in a deep layer and the expansion ratio variation smaller when plural pieces of glass are processed cumulatively using the same molten salt composition.

On the other hand, if the value of $K_2O/(Na_2O/Li_2O)$ is, for example, 3 or smaller, the of sodium ions in a glass surface layer can be reduced properly in the second ion exchange and a close-to-straight stress profile having no inflection point can be formed easily. Having no local stress reduction, a close-to-straight stress profile can prevent development of cracks generated from a glass surface layer and hence is preferable.

MgO may be contained to, for example, lower the viscosity during melting. The content of MgO is preferably 1% or higher, more preferably 2% or higher, and further more preferably 3% or higher. On the other hand, if the MgO content is too high, it becomes difficult to form a thick compressive stress layer at the time of chemically strengthening treatment. The content of MgO is preferably 15% or lower, even more preferably 10% or lower, further more preferably 8% or lower, and particularly preferably 6% or lower.

$ZrO_2$ may not be contained. However, from the viewpoint of increasing the surface compressive stress of chemically strengthened glass, it is preferable that $ZrO_2$ be contained. The content of $ZrO_2$ is preferably 0.1% or higher, more preferably 0.15% or higher, further more preferably 0.2% or higher, and particularly preferably 0.25% or higher. Typically, the $ZrO_2$ content is 0.3% or higher. On the other hand, if the content of $ZrO_2$ is too high, devitrification defects are prone to occur and it becomes difficult to increase the compressive stress value at the time of chemically strengthening treatment. The $ZrO_2$ content is preferably 2% or lower, more preferably 1.5% or lower, further more preferably 1% or lower, and particularly preferably 0.8% or lower.

The content of $Y_2O_3$ is preferably 0.1% or higher, more preferably 0.2% or higher, further more preferably 0.5% or higher, and particularly preferably 1% or higher. On the other hand, if the content of $Y_2O_3$ is too high, it becomes difficult to form a thick compressive stress layer at the time of chemically strengthening treatment. The $Y_2O_3$ content is preferably 5% or lower, more preferably 3% or lower, further more preferably 2% or lower, and particularly preferably 1.5% or lower.

The lithium-containing glass to be subjected to the chemical strengthening according to the present invention has the composition as described above. Glass materials are mixed as appropriate so as to obtain glass having the above-described composition and are heat-melted in a glass melting furnace. Resulting molten glass is homogenized by bubbling, stirring, addition of a refining agent, etc., shaped into a glass sheet having a prescribed thickness, and annealed. Alternatively, the resulting molten glass may be shaped into glass sheets by forming it into a block shape, annealing the glass block, and cutting it.

Examples of method of shaping into a sheet shape includes a float method, a press method, a fusion method, and a down draw method. In particular, to manufacture a large glass sheet, employment of the float method is preferable. Continuous shaping methods other than the float method, such as the fusion method and the down draw method, are also preferable.

The lithium-containing glass may be crystallized glass. Preferable crystallized glass is crystallized glass containing at least one kind of crystal selected from the group consisting of a lithium silicate crystal, a lithium aluminosilicate crystal, and a lithium phosphate crystal. The lithium silicate crystal is preferably a lithium metasilicate crystal, a lithium disilicate crystal, or the like. The lithium phosphate crystal is preferably a lithium orthophosphate crystal or the like. The lithium aluminosilicate crystal is preferably a β-spodumene crystal, a petalite crystal, or the like.

To increase the mechanical strength, the crystallization ratio of crystallized glass is preferably 10% or larger, more preferably 15% or larger, further more preferably 20% or larger, and particularly preferably 25% or larger. To increase the transparency, the crystallization ratio of crystallized glass is preferably 70% or smaller, more preferably 60% or smaller, and particularly preferably 50% or smaller. Crystallized glass being small in crystallization ratio is superior in being shaped easily by bend shaping with heating. A crystallization ratio can be calculated by the Rietveld method from X-ray diffraction intensity. The Rietveld method is described in "Crystal Analysis Handbook", edited by the Crystal Analysis Handbook edition committee of The Crystallographic Society of Japan, Kyoritsu Shuppan Co., Ltd., 1999, pp. 492-499.

To increase the transparency, the average particle diameter of precipitated crystals of crystallized glass is preferably 300 nm or smaller, more preferably 200 nm or smaller, further more preferably 150 nm or smaller, and particularly preferably 100 nm or smaller. An average particle diameter of precipitated crystals can be determined from a transmission electron microscope (TEM) image and can be estimated from a scanning electron microscope (SEM) image.

EXAMPLES

Although the present invention will be described below using Examples, it is not restricted to those Examples.

Glass materials were mixed so as to have the following composition as represented by mol % based on oxides and subjected to weighing so that glass of 400 g will be manufactured. The mixed materials were put into a platinum crucible and melted in an electric furnace at 1,500° C. to 1,700° C. for about 3 hours, defoamed, and homogenized. In Examples 1 to 7 and 10-16, the glass composition was as follows: $SiO_2$: 68.9%, $Al_2O_3$: 12.4%, $Y_2O_3$: 1.3%, $ZrO_2$: 0.3%, $Li_2O$: 10.8%, $Na_2O$: 4.8%; $K_2O$: 1.2%, and the other components: 0.3%. In Examples 8 and 9, the glass composition was as follows: $SiO_2$: 63%, $Al_2O_3$: 19%, $Li_2O$: 13%, $Na_2O$: 3%, and $K_2O$: 2%.

The molten glass thus obtained was put into a metal die, held at a temperature that is about 50° C. higher than a glass transition temperature for 1 hour, and then cooled to room temperature at a rate of 0.5° C./min, whereby a glass block was obtained. After the glass block was cut and ground, both surfaces of each of resulting glass sheet were finally mirror-polished, whereby glass sheets having a thickness 0.7 mm or 0.65 mm were obtained.

The thus-obtained glass sheets were subjected to chemically strengthening treatment shown in Tables 1 and 2, whereby chemically strengthened glass of each of Examples 1 to 16 were manufactured. Each of glass sheets was subjected to chemical strengthening treatment by immersing it in a first molten salt composition shown in a row "first ion exchange" of Table 1 or 2 and holding it at a temperature shown in a row "temperature" of "first ion exchange" for a time shown in a row "time" of "first ion exchange." After that, chemically strengthened glass was manufactured by immersing each resulting glass sheet in a second molten salt composition shown in a row "second ion exchange" of Table 1 or 2 and holding it at a temperature shown in a row "temperature" of "second ion exchange" for a time shown in a row "time" of "second ion exchange."

Results are shown in Tables 1 and 2. Examples 1-10 are Inventive Examples and Examples 11-16 are Comparative Examples. In Table 1, the content of each of additives in a second molten salt composition is represented ratio to a total amount when the total amount of the second molten salt composition excluding the additives is regarded as 100%.

Each kind of chemically strengthened glass was evaluated by the following methods.

[Stress Measurement Using Scattered Light Photoelastic Stress Meter]

Stress of chemically strengthened glass was measured by the method described in WO 2018/056121 using a scattered light photoelastic stress meter (SLP-1000 produced by Orihara Industrial Co., Ltd.). Stress was measured using software SlpIV (ver. 2019.01.10.001) attached to the scattered light photoelastic stress meter (SLP-1000 produced by Orihara Industrial Co., Ltd.). Stress values $CS_0$ and $CS_{90}$, maximum tensile stress values $CT_1$ and $CT_2$, a compressive stress layer depth DOL, and a value of first-order derivative value $CS_x'$ and a value of second-order derivative value $CS_x''$ of compressive stress were calculated by the above method from obtained stress profile.

A function $\sigma(x)=a_1\times erfc(a_2\times x)+a_3\times erfc(a_4\times x)+a_5$ was used for calculating a stress profile, where $a_i$ (i=1 to 5) is fitting parameters and erfc is a complementary error function. The complementary error function erfc is defined by the following equation:

$$\begin{aligned}erfc(x) &= 1 - erf(x) \\ &= \frac{2}{\sqrt{\pi}} \int_x^\infty e^{-t^2} dt \\ &= e^{-x^2} erfcx(x)\end{aligned} \qquad \text{[Formula 1]}$$

In the evaluation employed in the present specification, the fitting parameter was optimized by minimizing a residual sum of squares of raw data obtained and the above function. Individual items were set by designation or selection in the following manner: measurement processing condition was single shot; measurement region processing adjustment item was surface and edge method; internal surface edge was 6.0 µm; internal left-right edge was automatic; internal deep portion edge was automatic (center of sample film thickness); and elongation of phase curve to center of sample thickness was fitting curve.

At the same time, distributions of the concentrations of alkali metal ions (sodium ions and potassium ions) in a direction of cross section were measured using an electron probe micro analyzer (EPMA). It was confirmed that there were no discrepancies between the stress profile obtained above and a result of this measurement.

[Stress Measurement Using Glass Surface Stress Meter]

Stress was measured by a nondestructive measuring method based on the optical waveguiding effect and the photoelastic effect using a film stress measurement meter ("FSM-6000" produced by Orihara Industrial Co., Ltd.). A result of this stress measurement was combined with a result of a stress measurement using the above-mentioned scattered light photoelastic stress meter using software "PMC" of Orihara Industrial Co., Ltd.

Figure 3A:
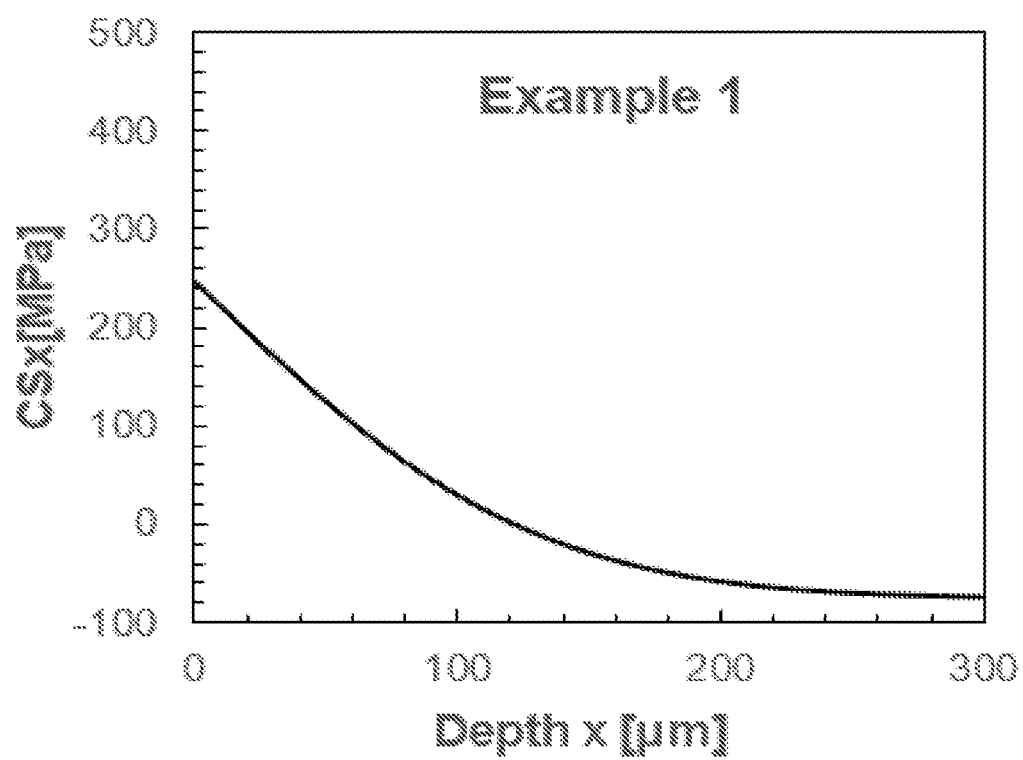
FIGS. 3A-3P show profiles of stress values CS$_x$ of Examples.
Figure 3B:
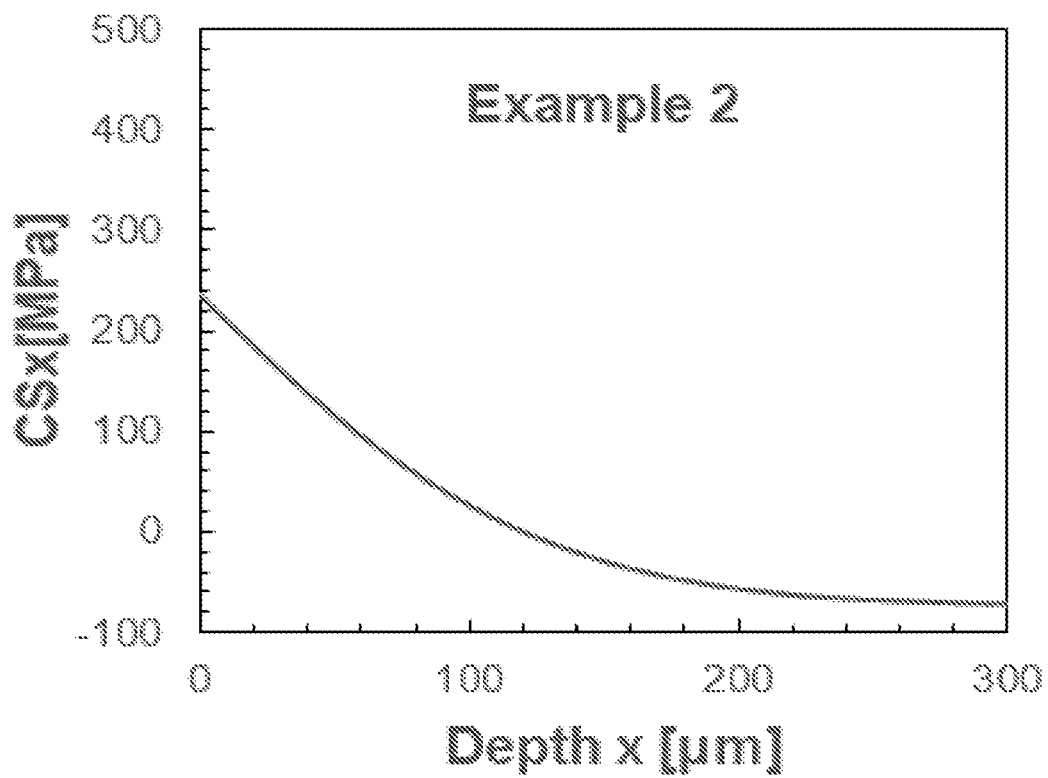
Figure 3C:
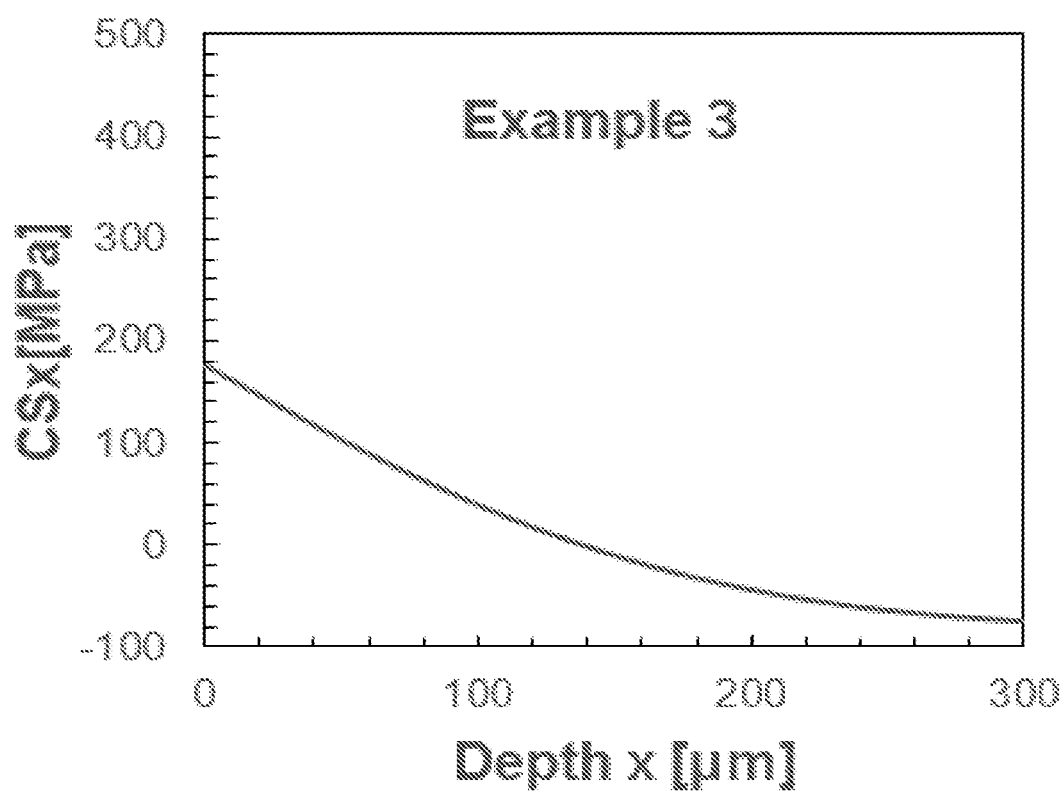
Figure 3D:
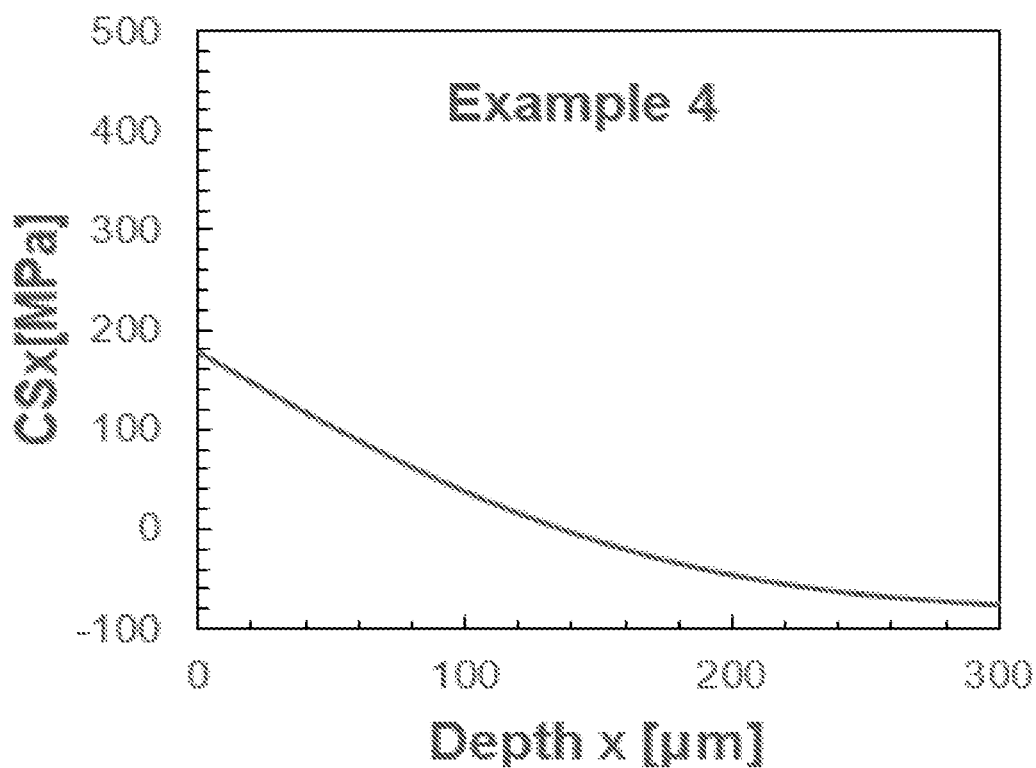
Figure 3E:
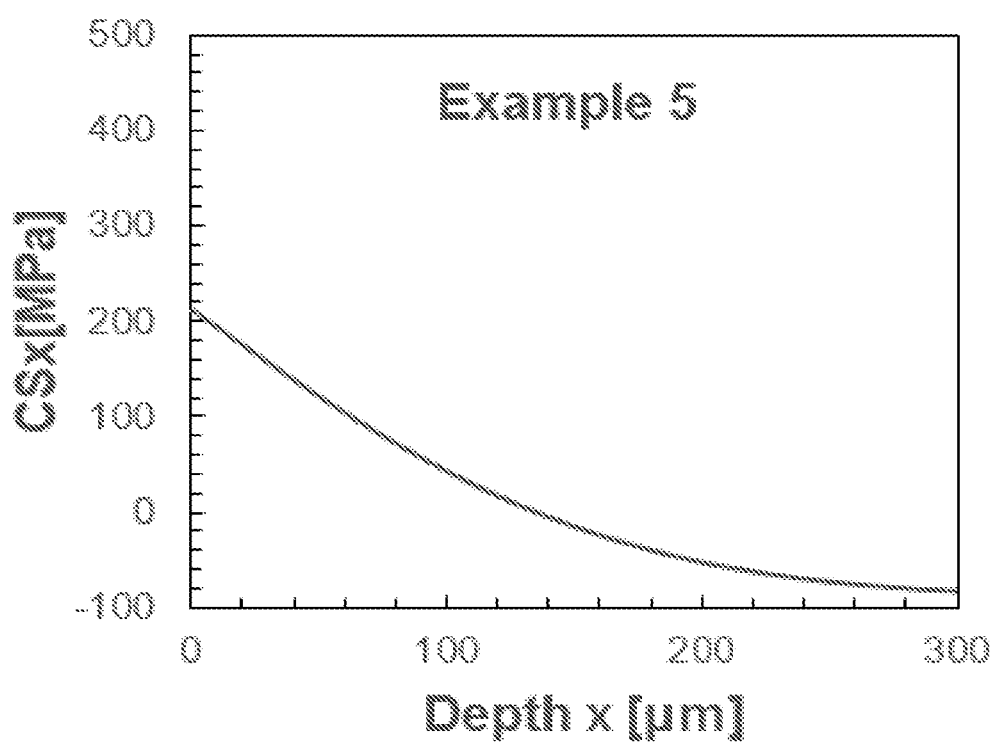
Figure 3F:
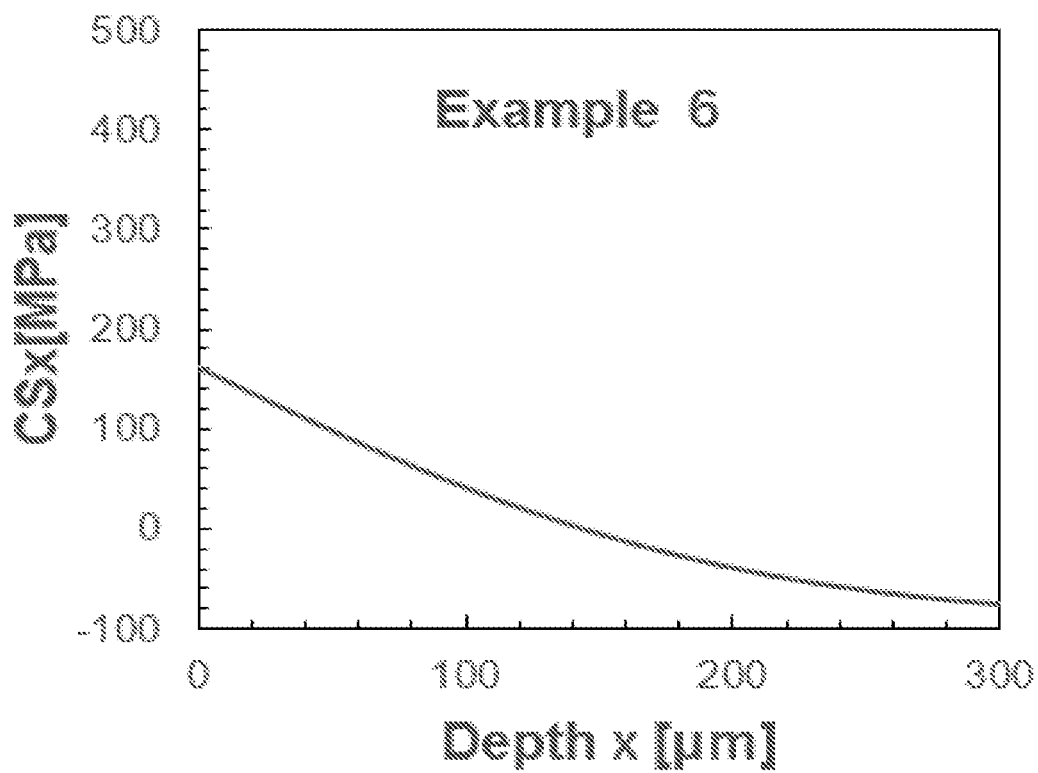
Figure 3G:
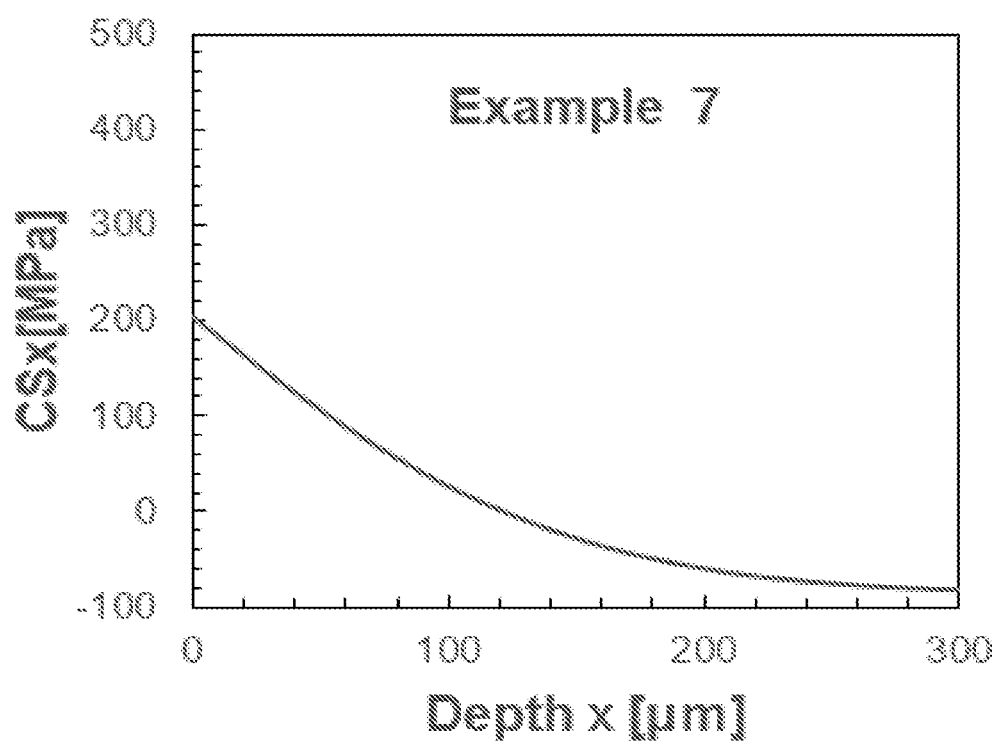
Figure 3H:
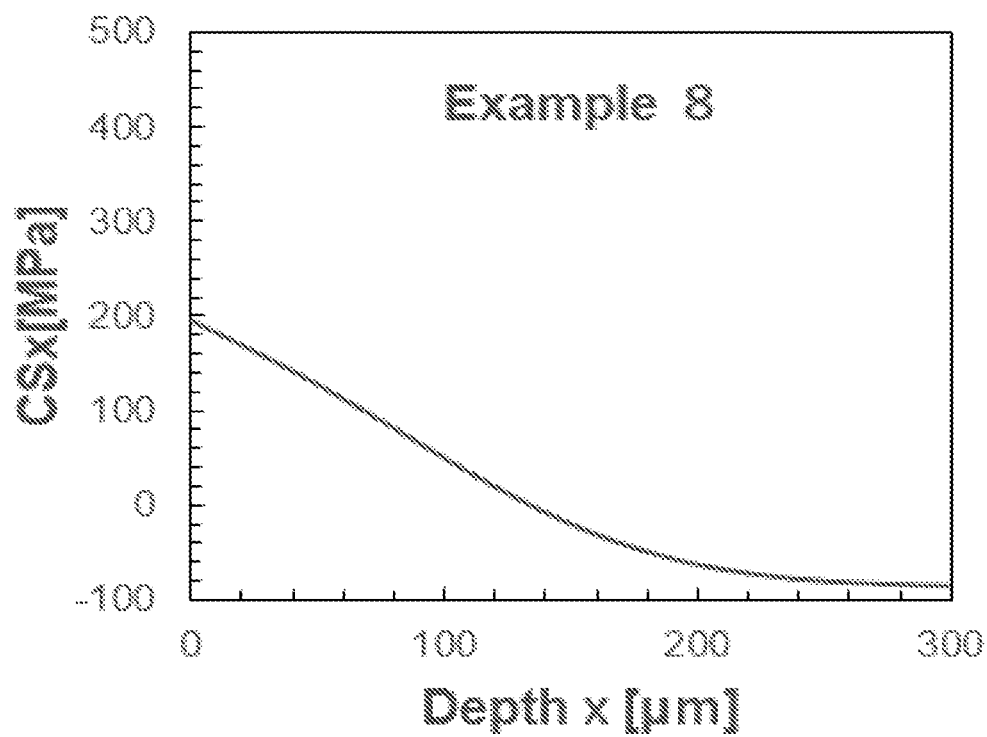
Figure 3I:
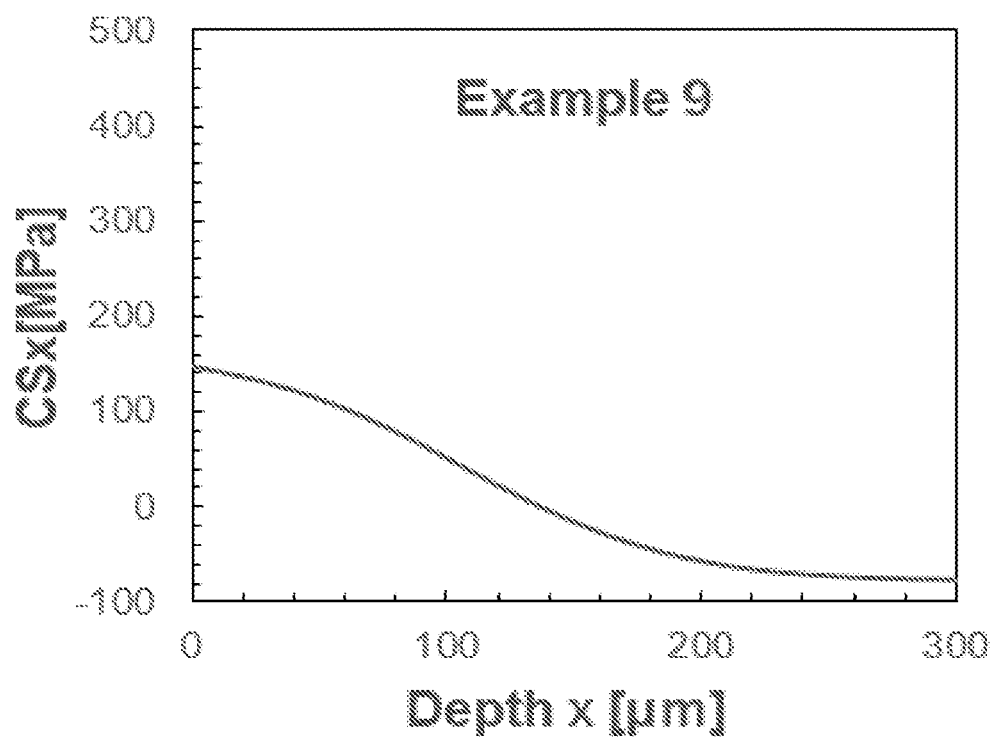
Figure 3J:
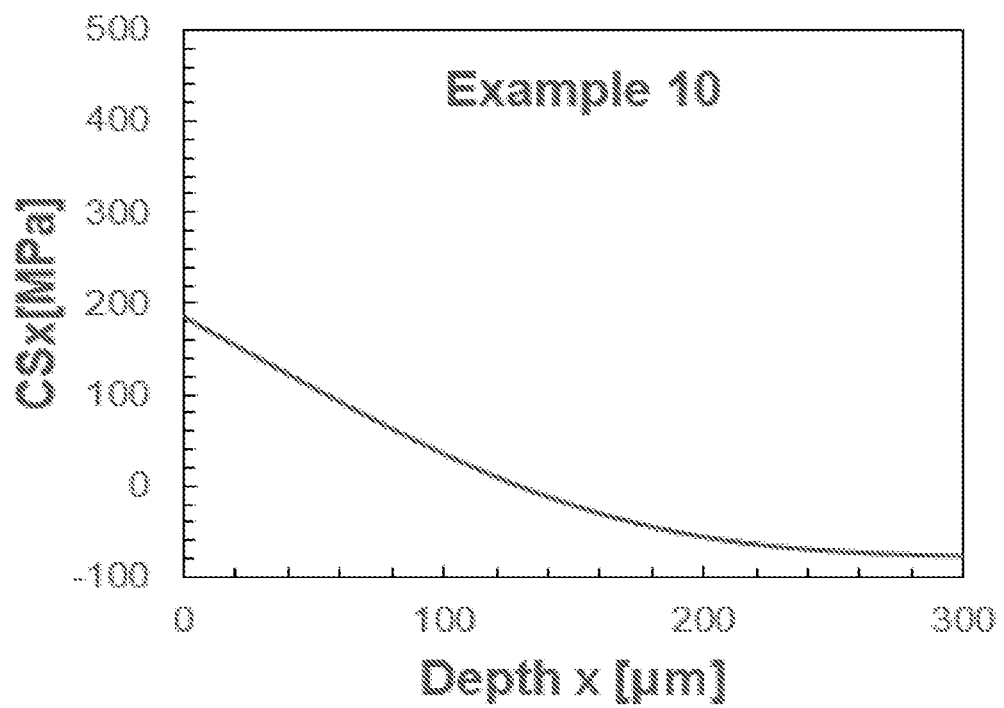
Figure 3K:
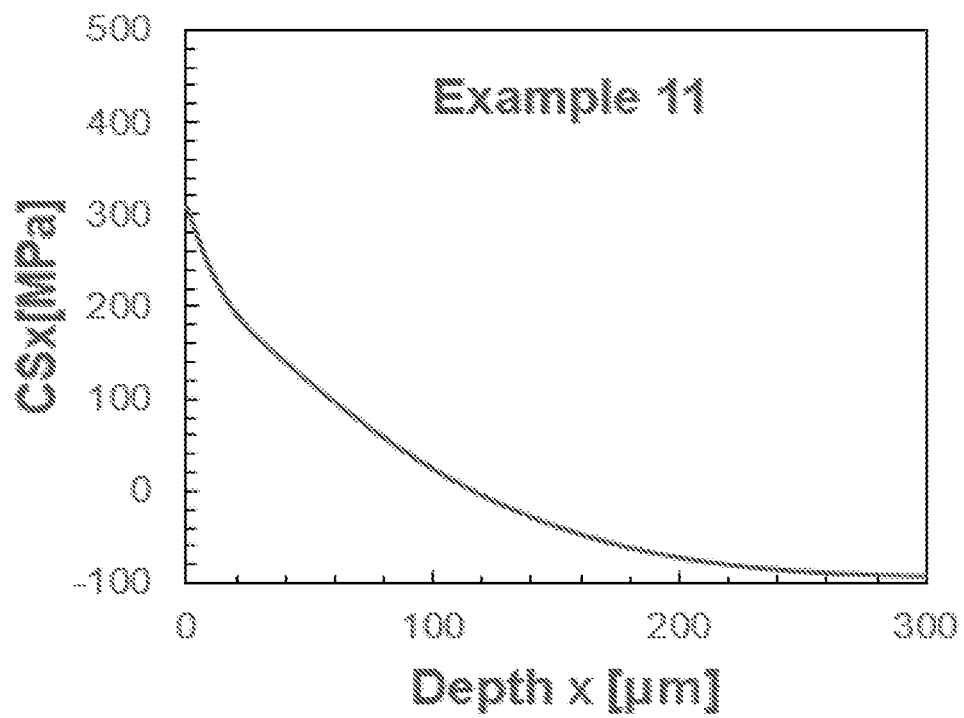
Figure 3L:
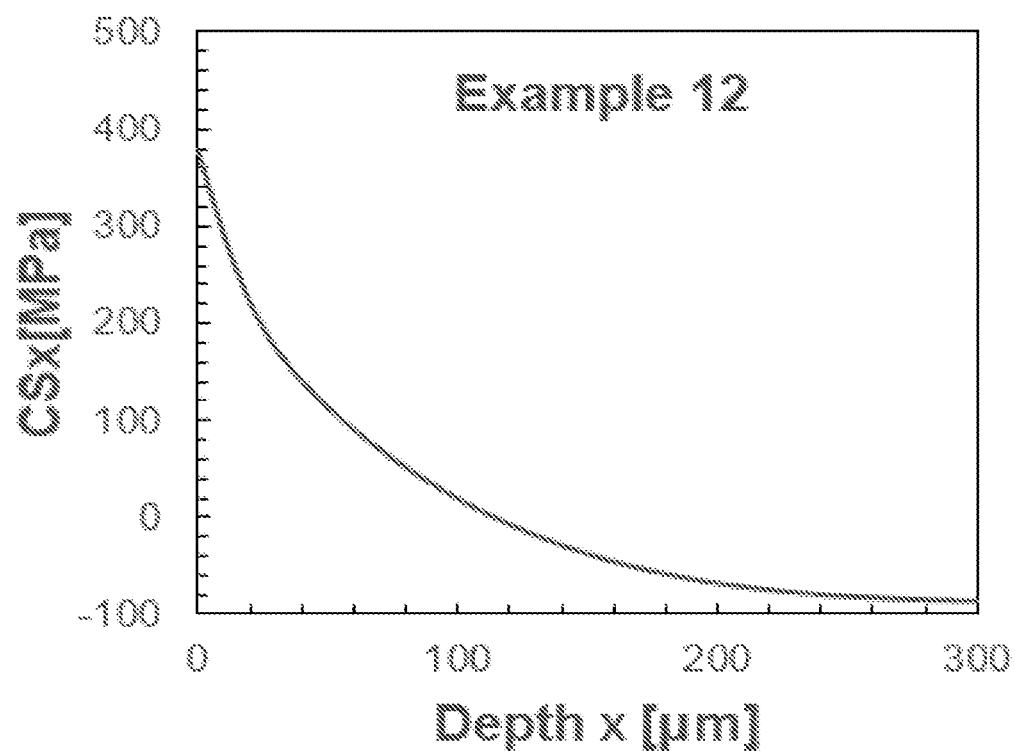
Figure 3M:
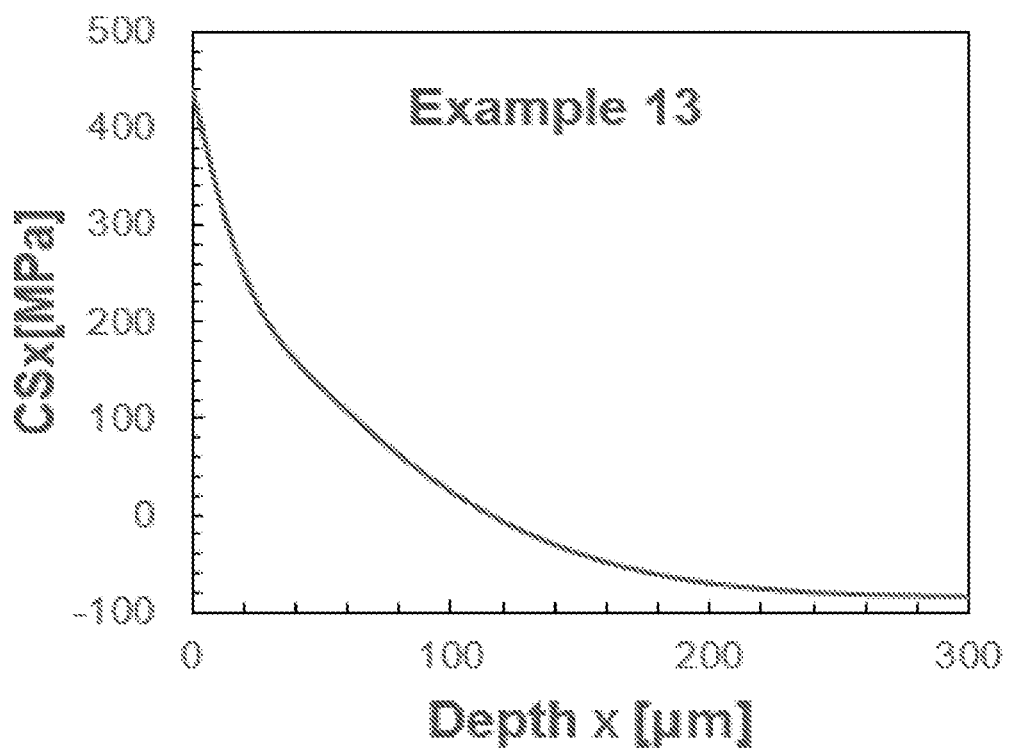
Figure 3N:
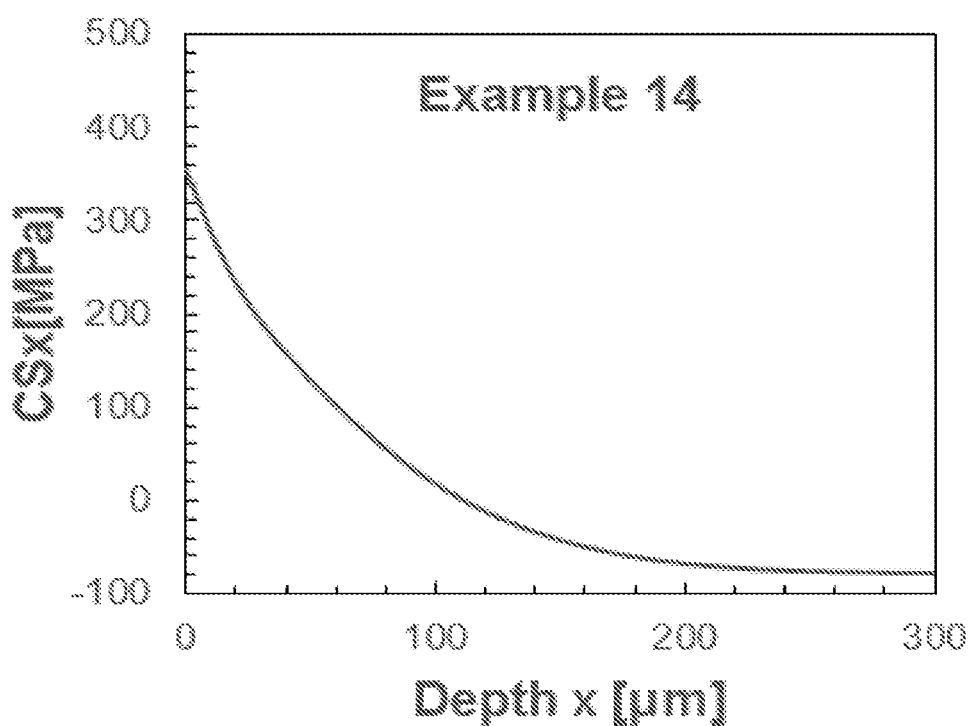
Figure 3O:
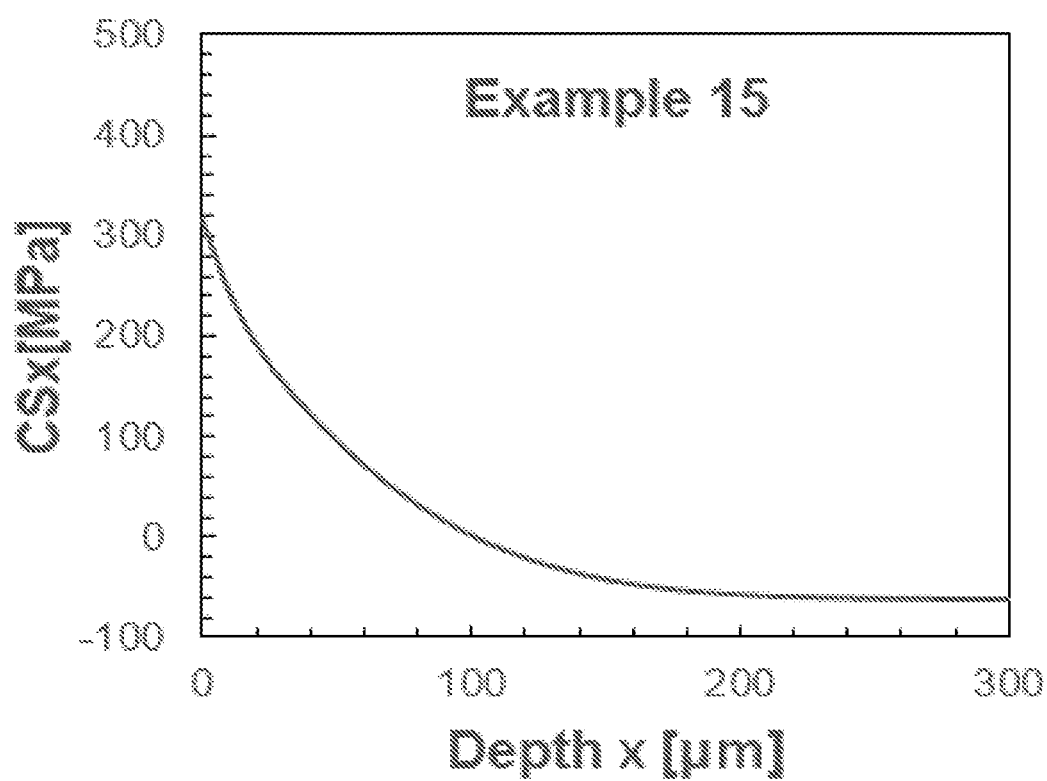
Figure 3P:
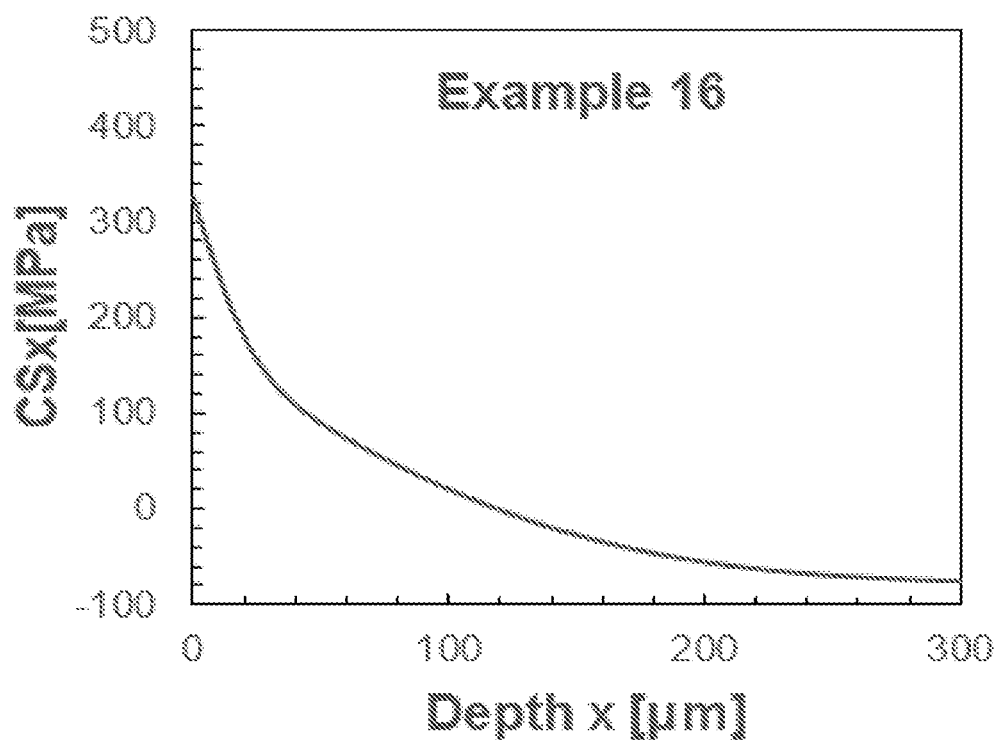
Figure 4A:
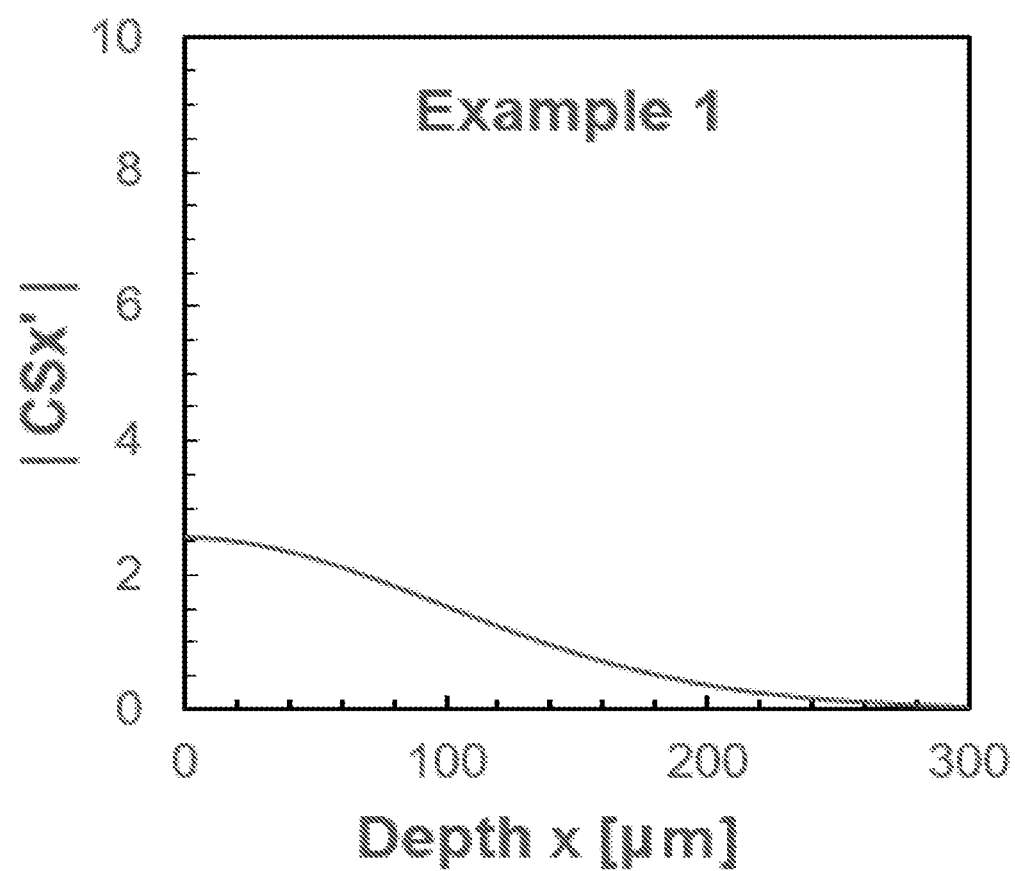
FIGS. 4A-4P show the absolute values of first-order derivatives CS$_x$' of CS$_x$ stress profile of Examples.
Figure 4B:
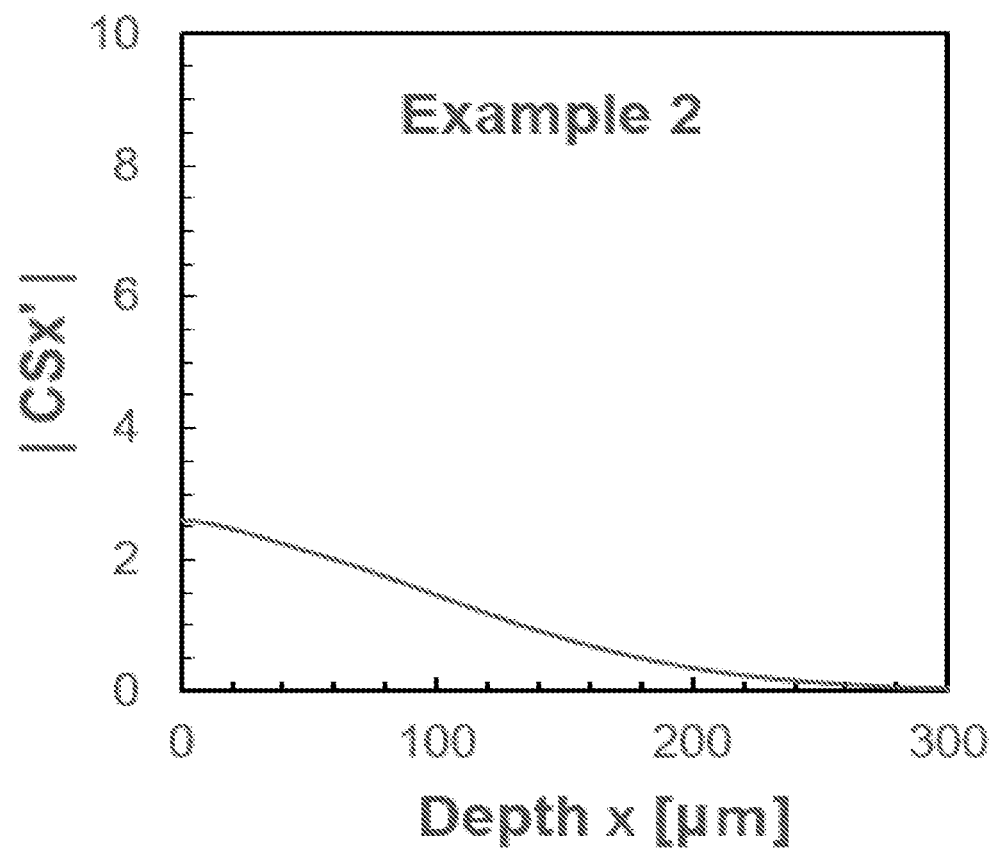
Figure 4C:
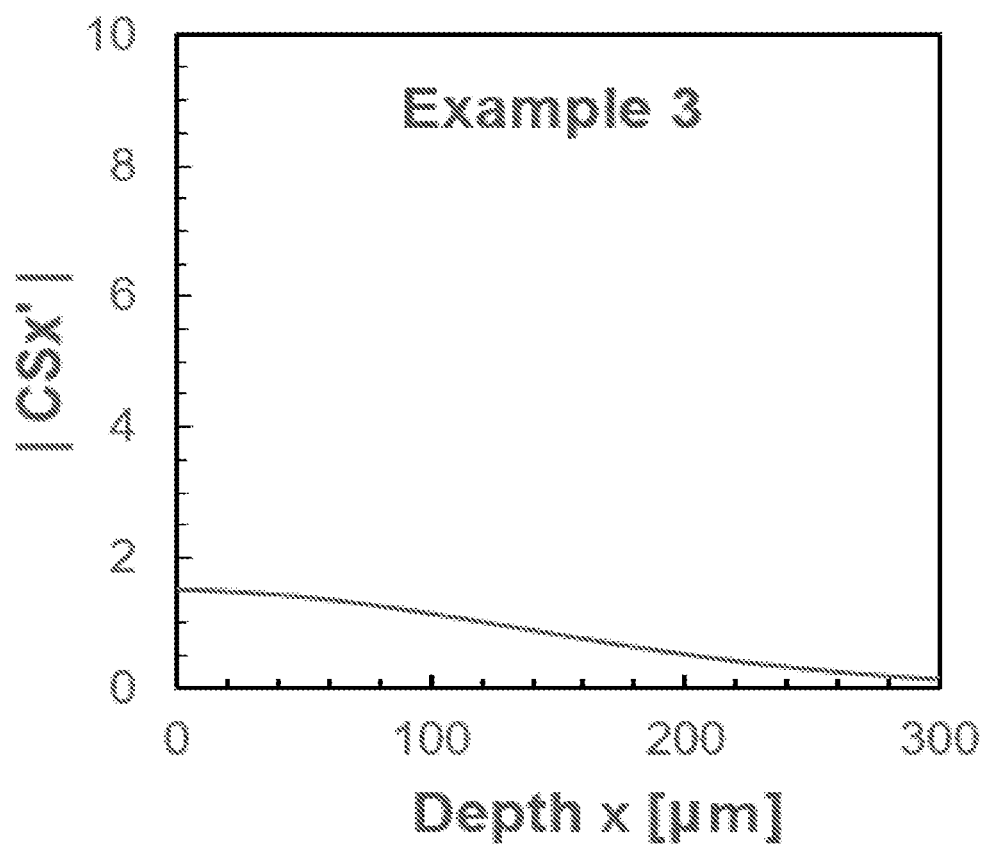
Figure 4D:
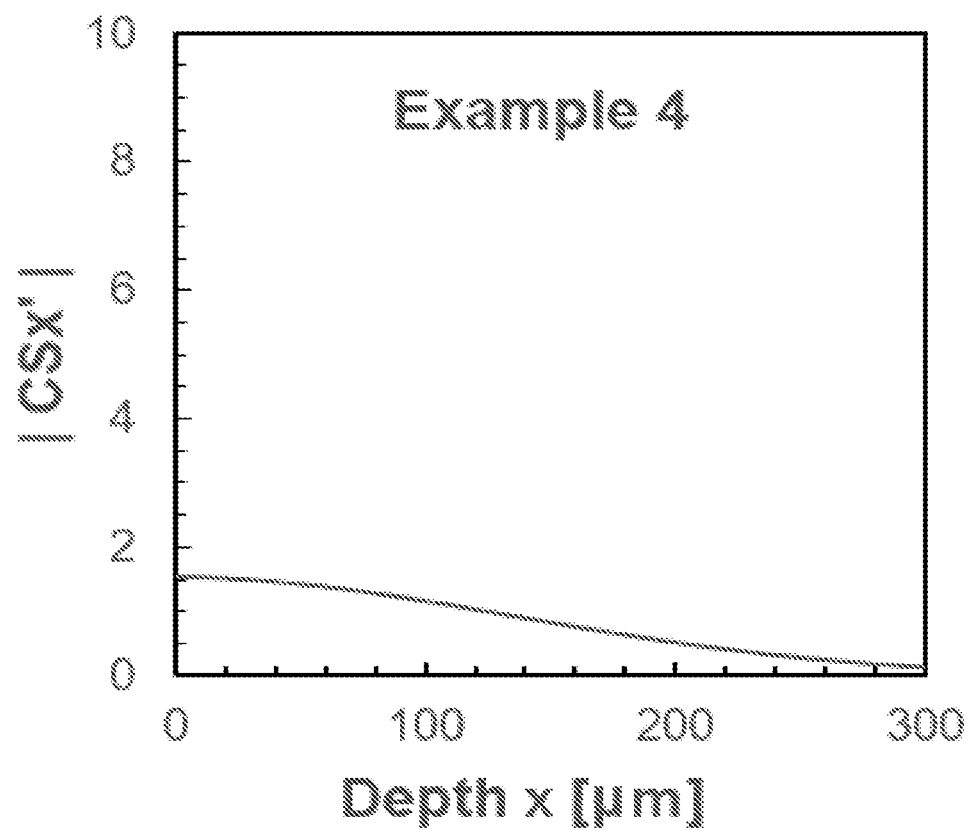
Figure 4E:
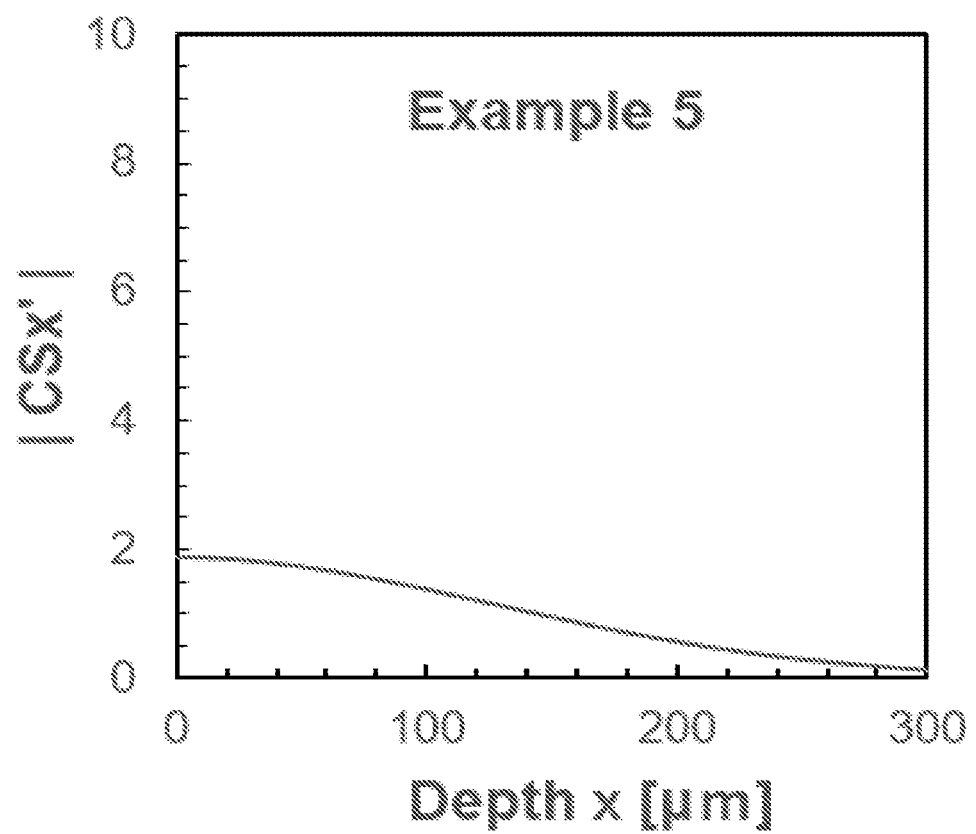
Figure 4F:
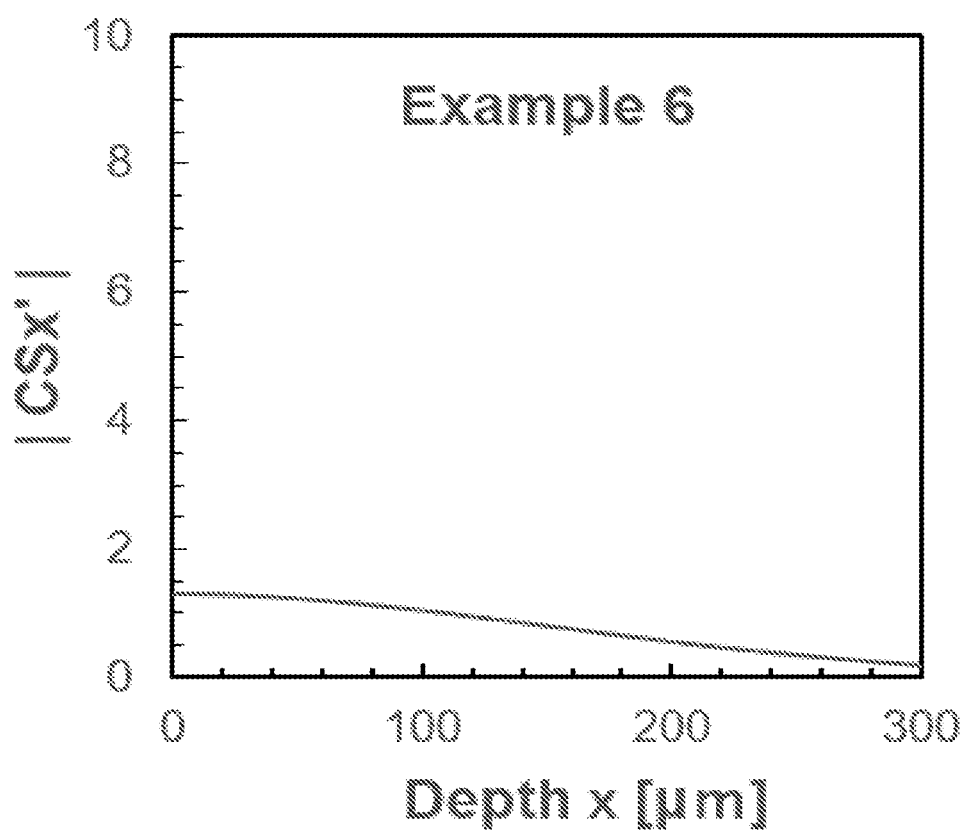
Figure 4G:
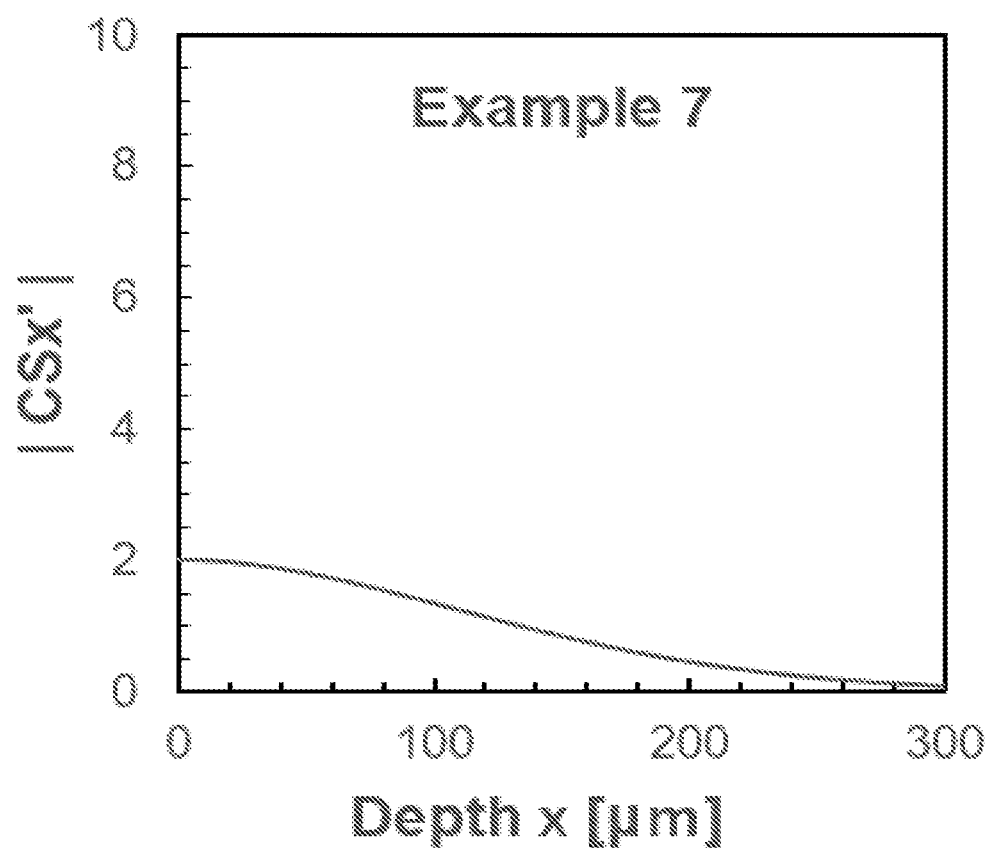
Figure 4H:
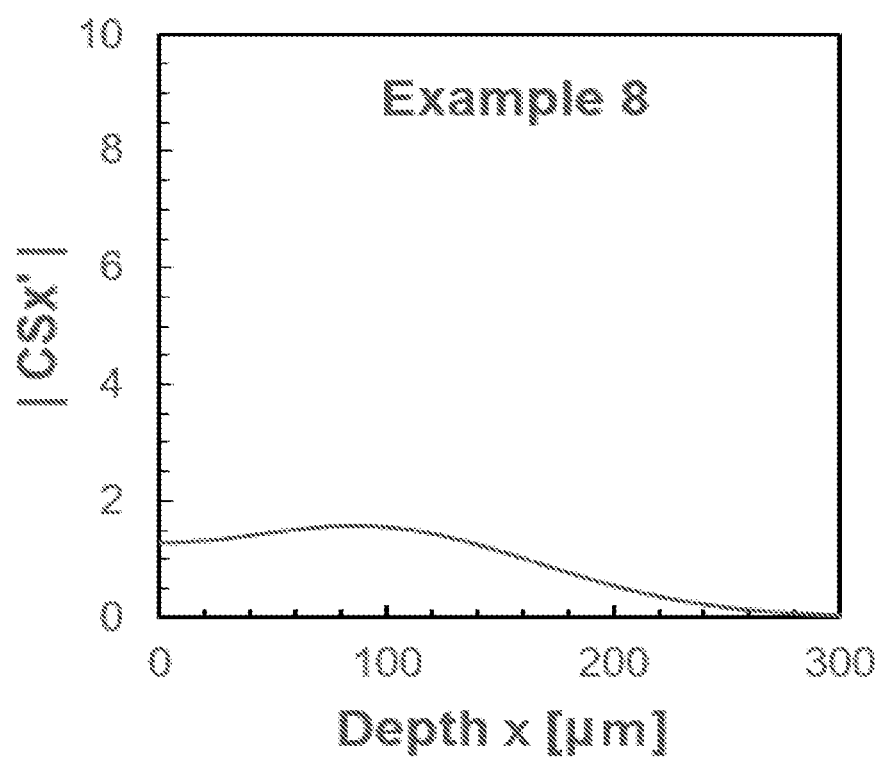
Figure 4I:
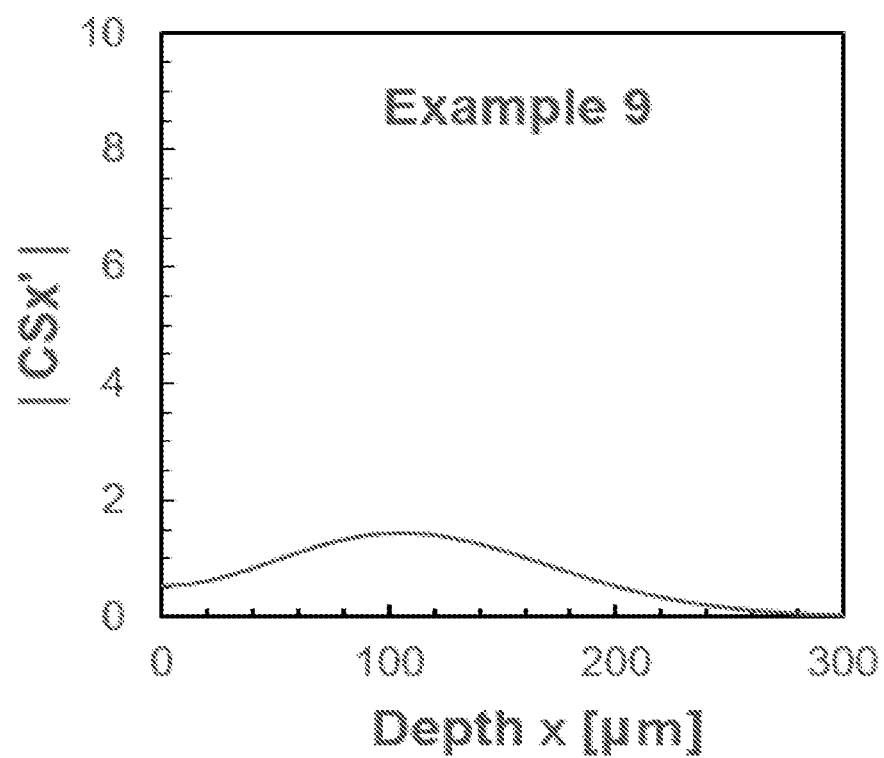
Figure 4J:
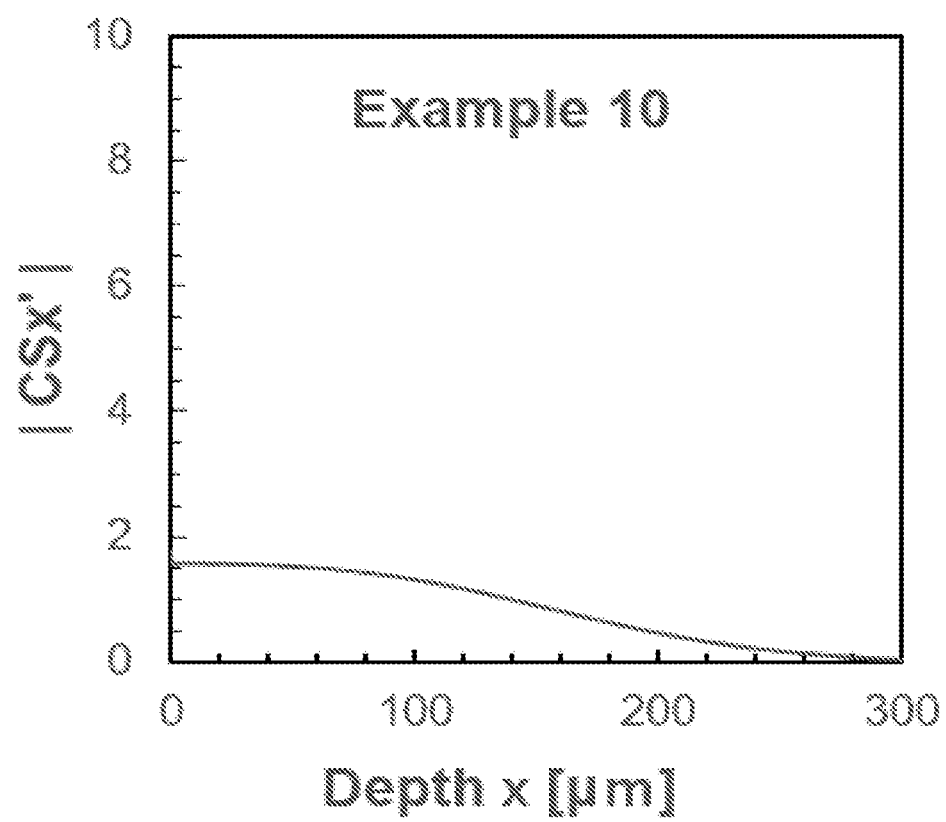
Figure 4K:
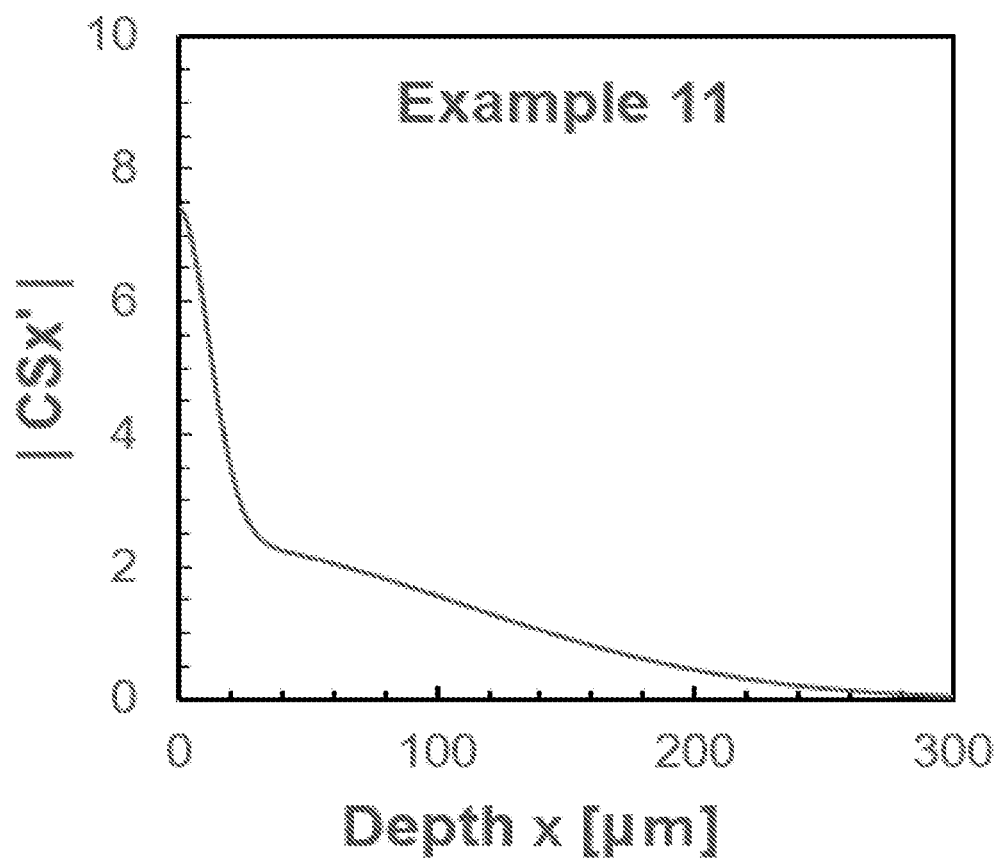
Figure 4L:
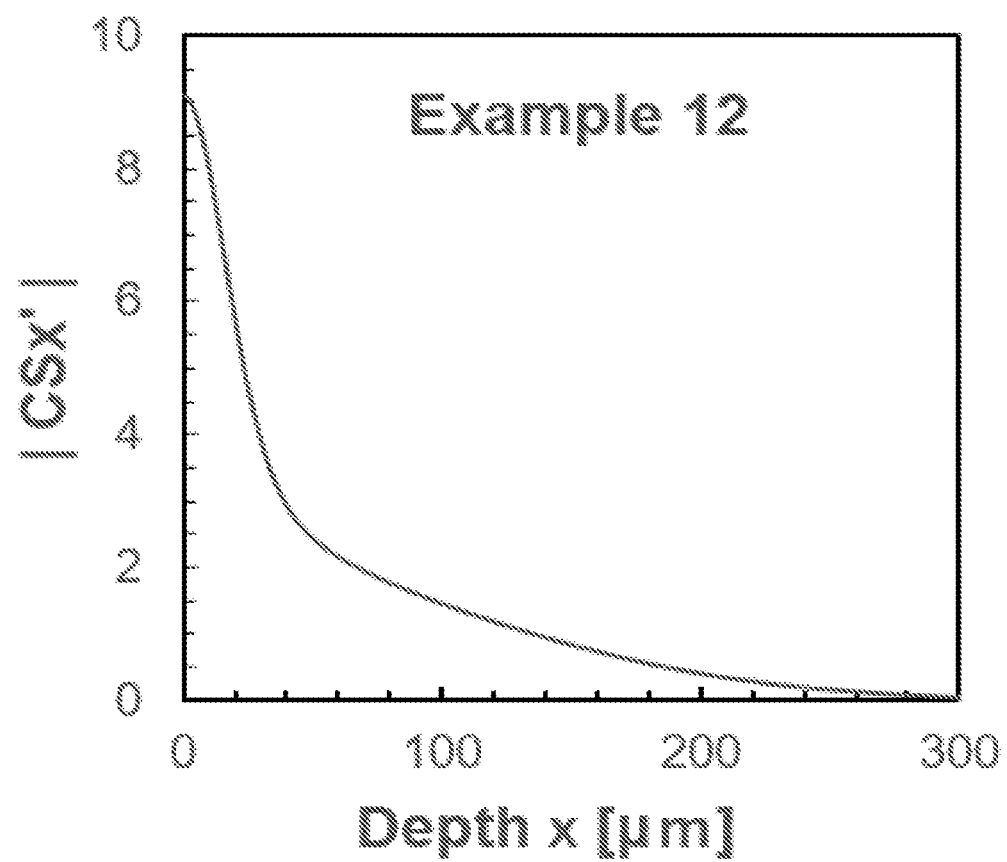
Figure 4M:
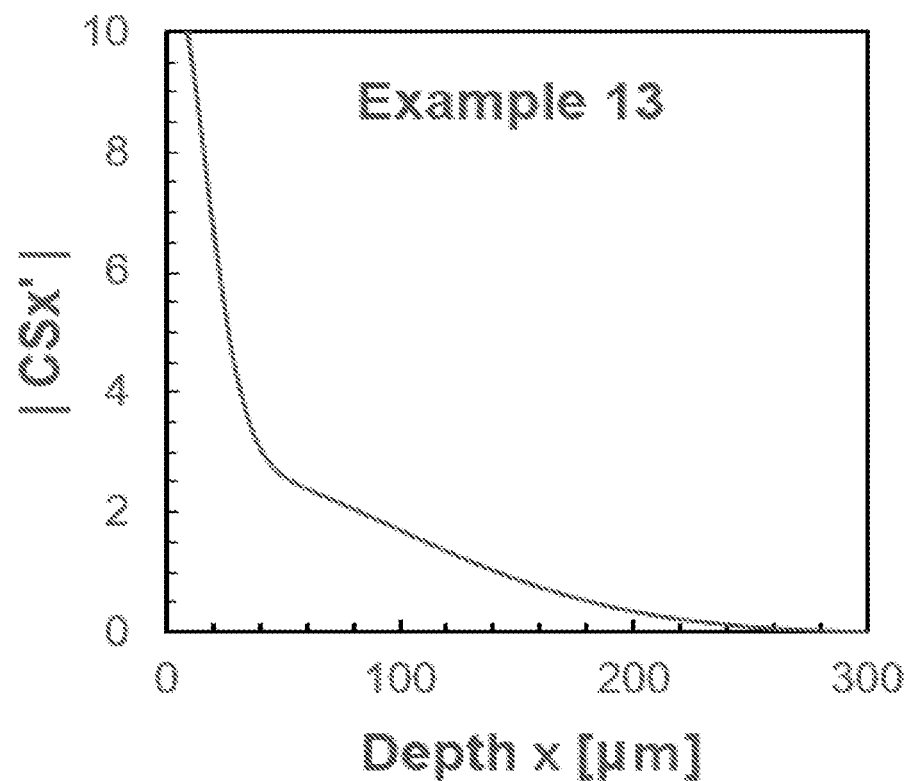
Figure 4N:
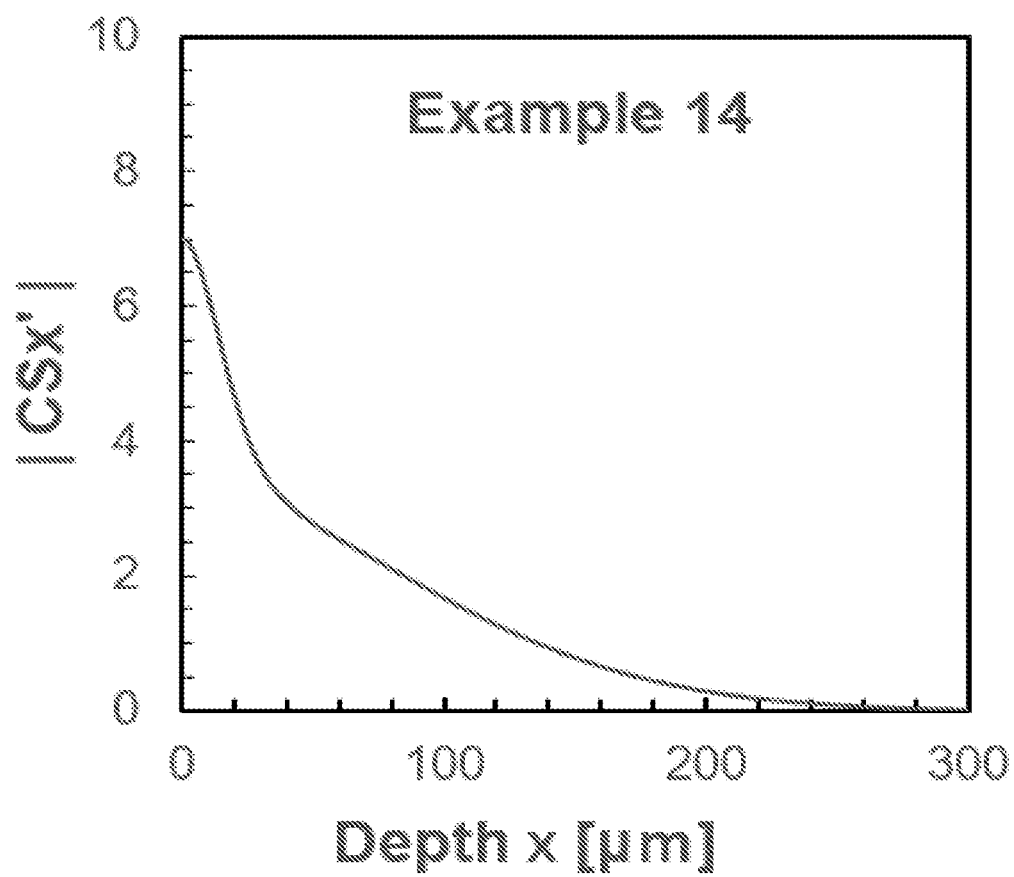
Figure 4O:
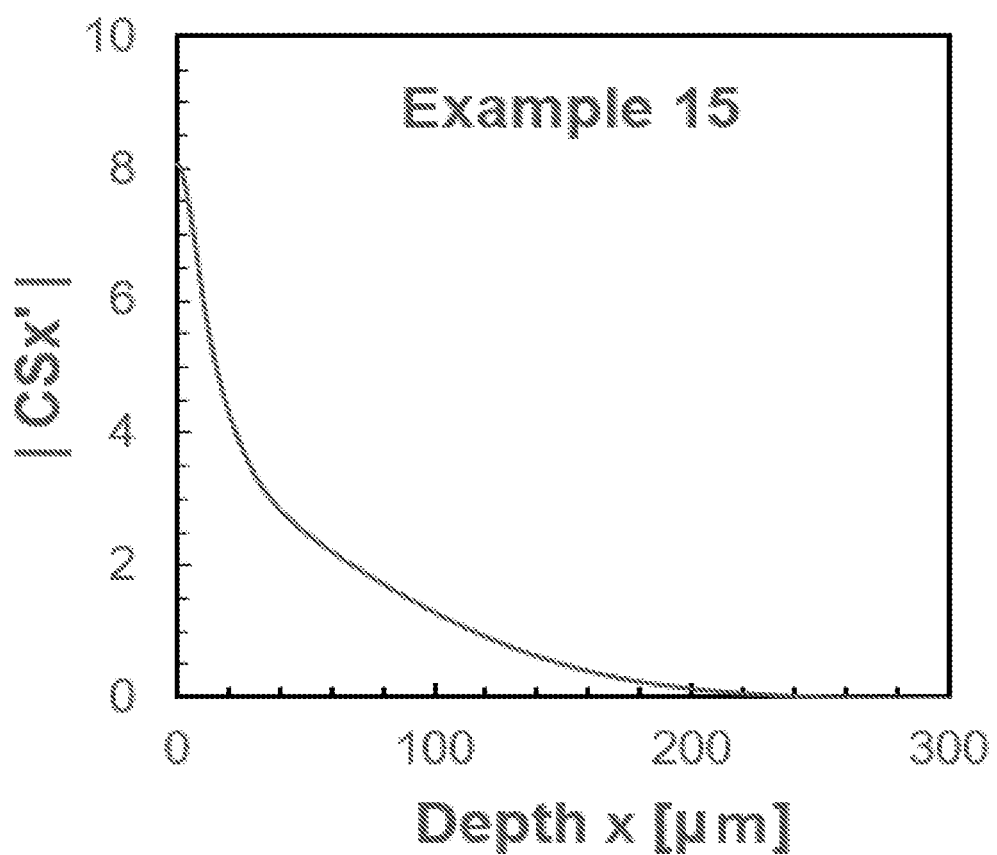
Figure 4P:
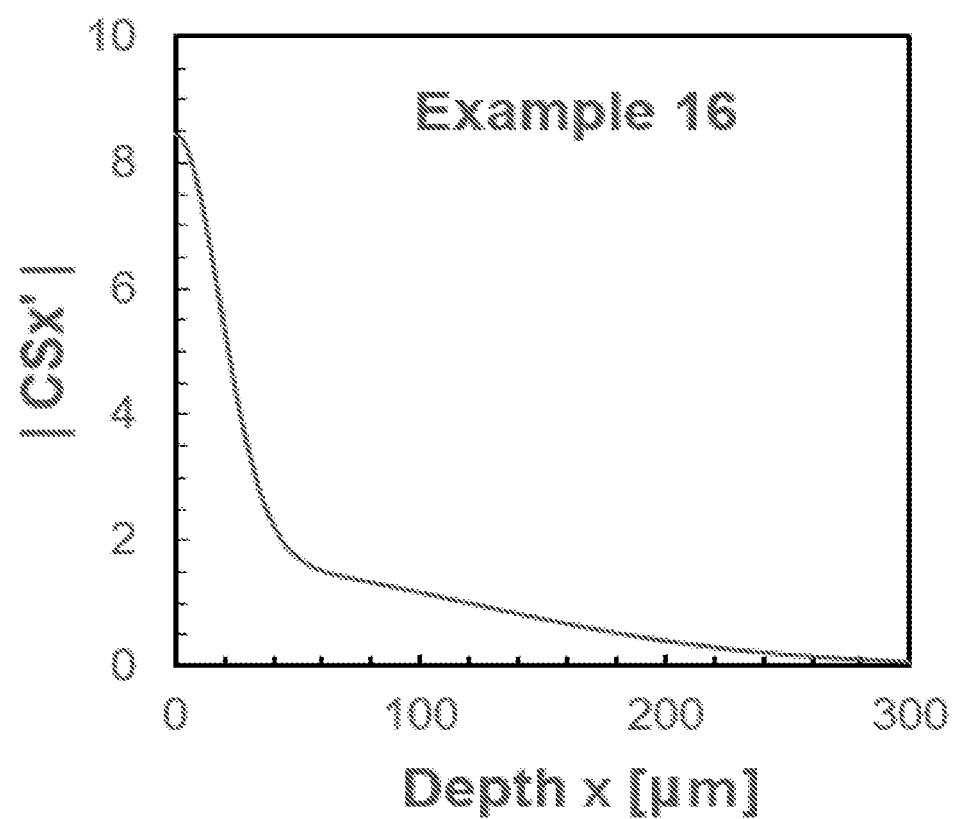
Figure 5A:
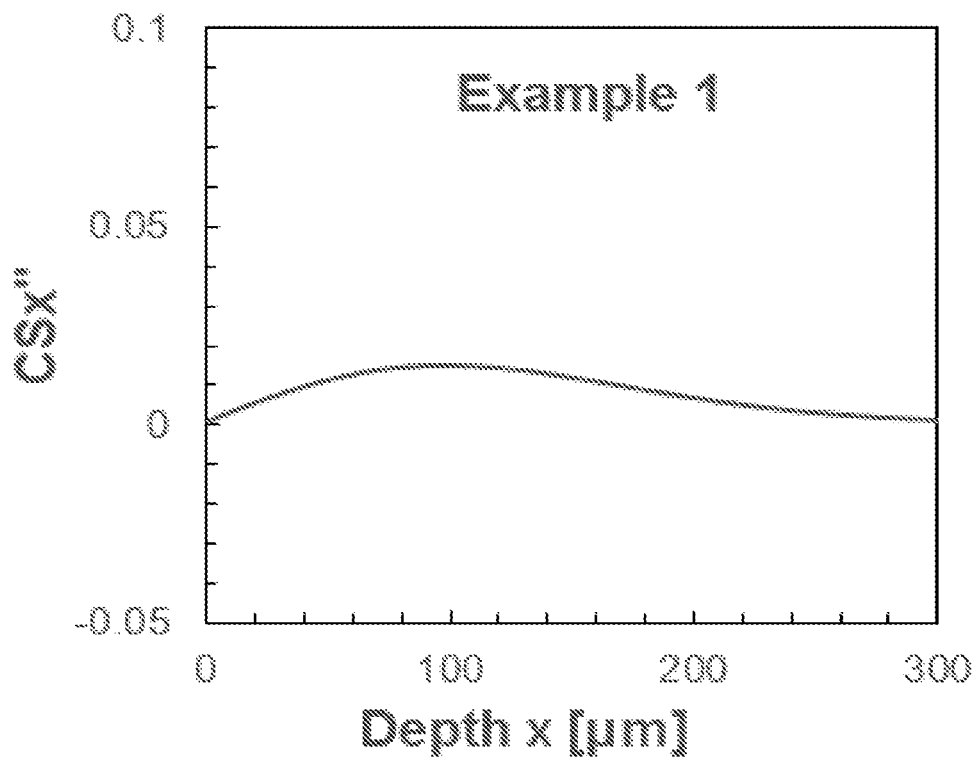
FIGS. 5A-5P show second-order derivatives CS$_x$" of CS$_x$ stress profile of Examples.
Figure 5B:
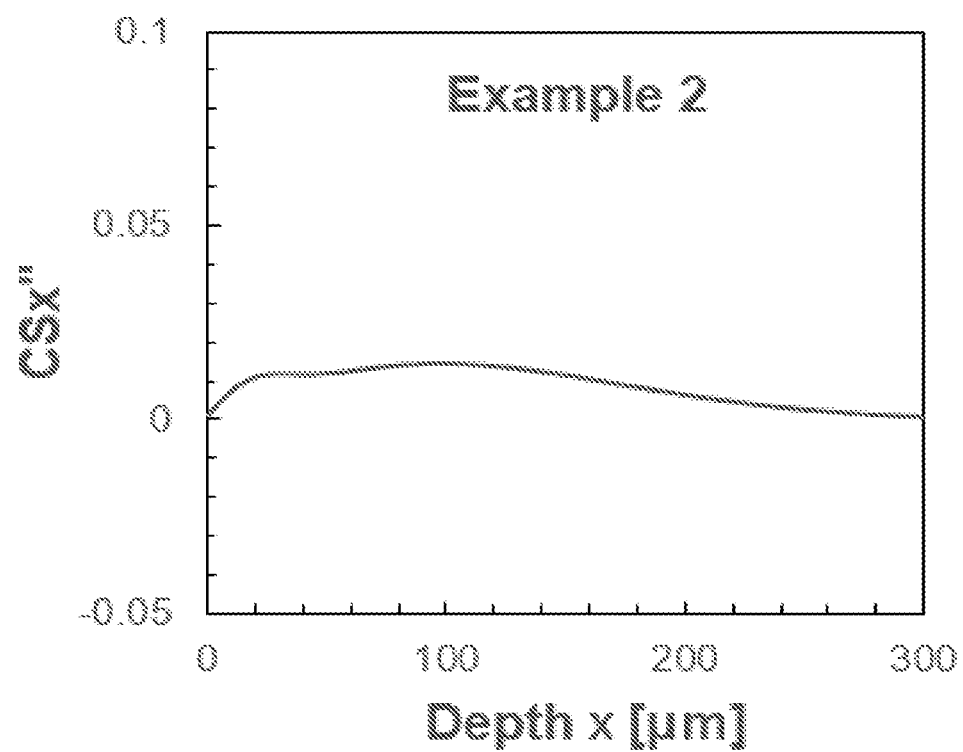
Figure 5C:
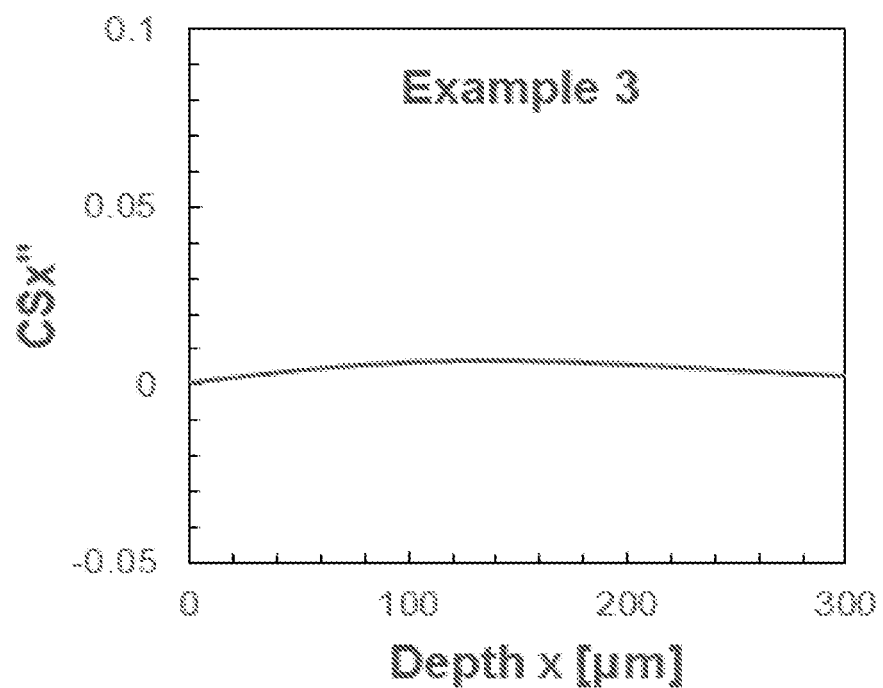
Figure 5D:
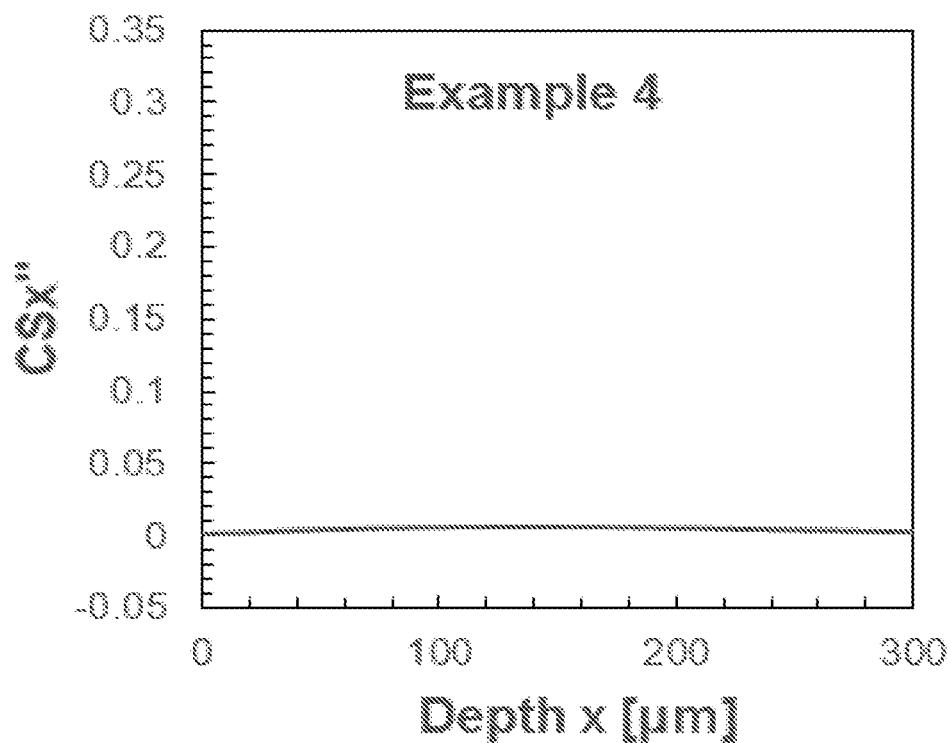
Figure 5E:
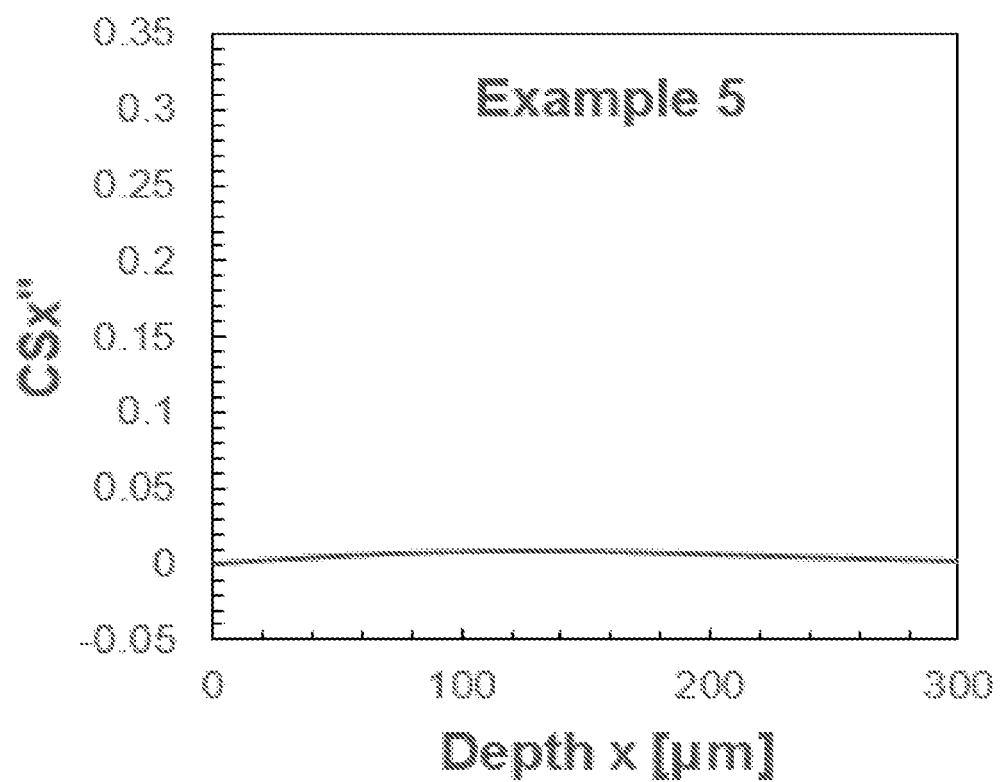
Figure 5F:
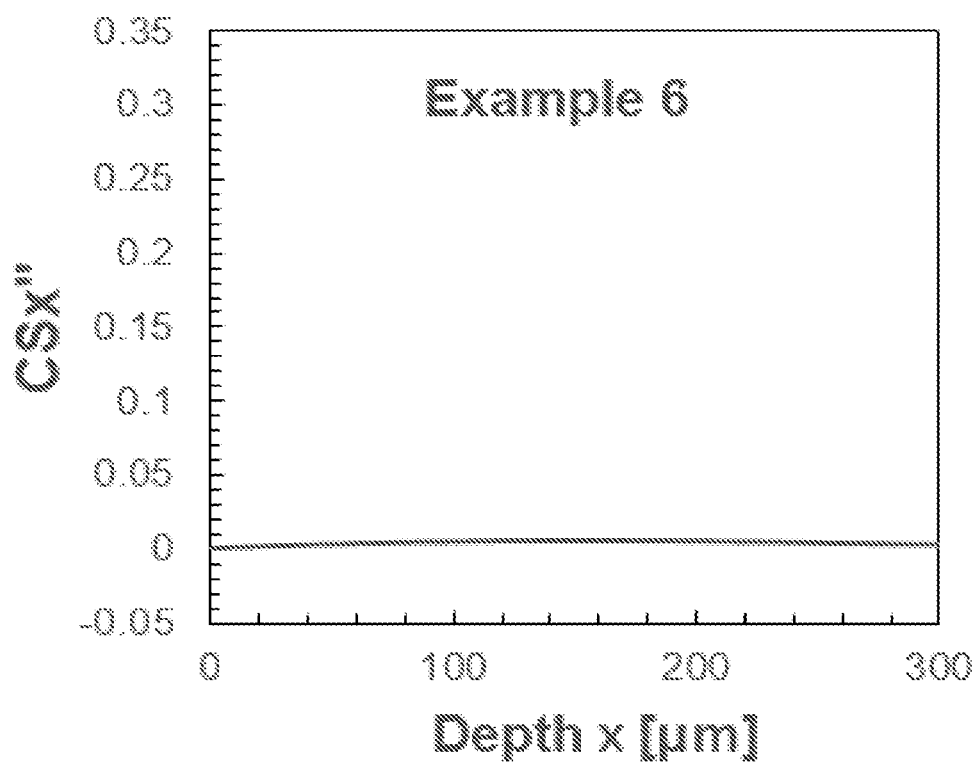
Figure 5G:
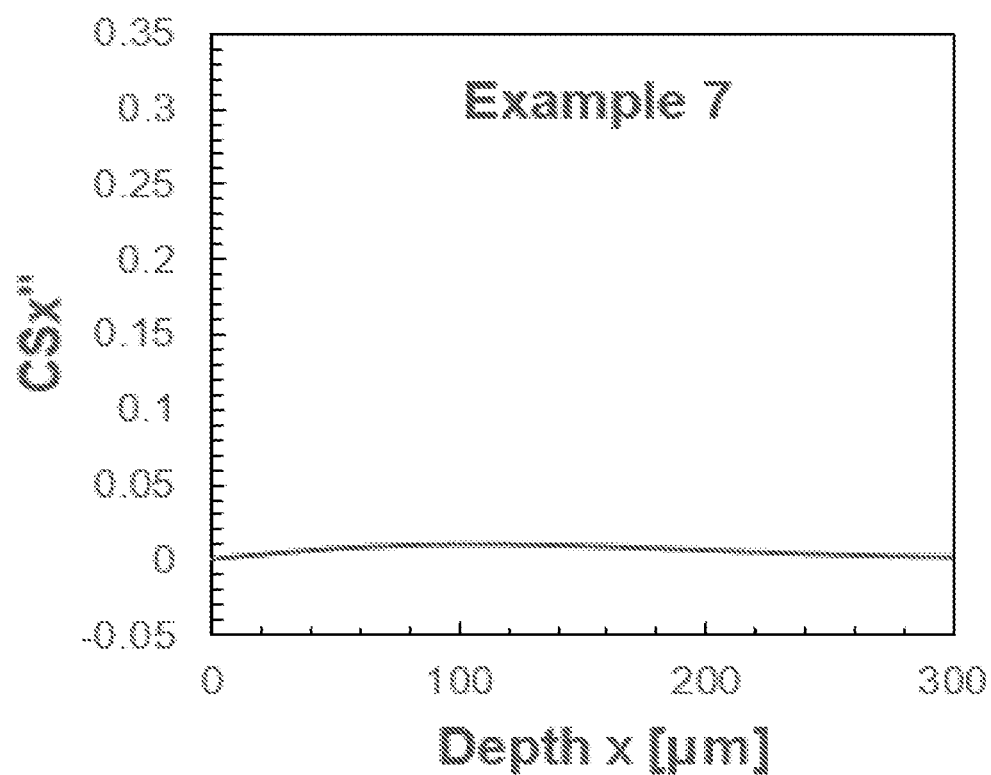
Figure 5H:
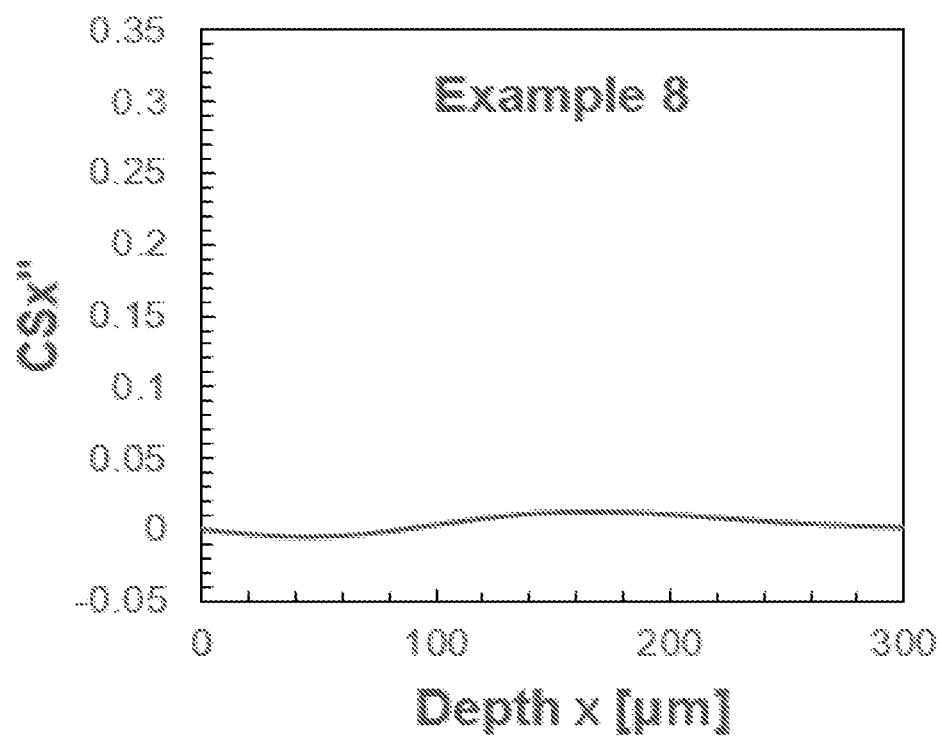
Figure 5I:
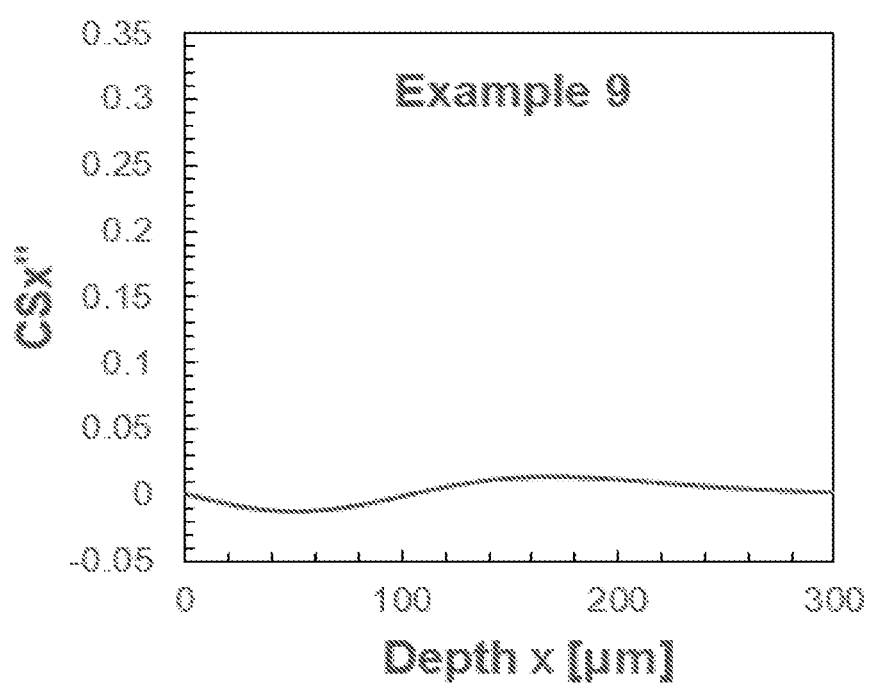
Figure 5J:
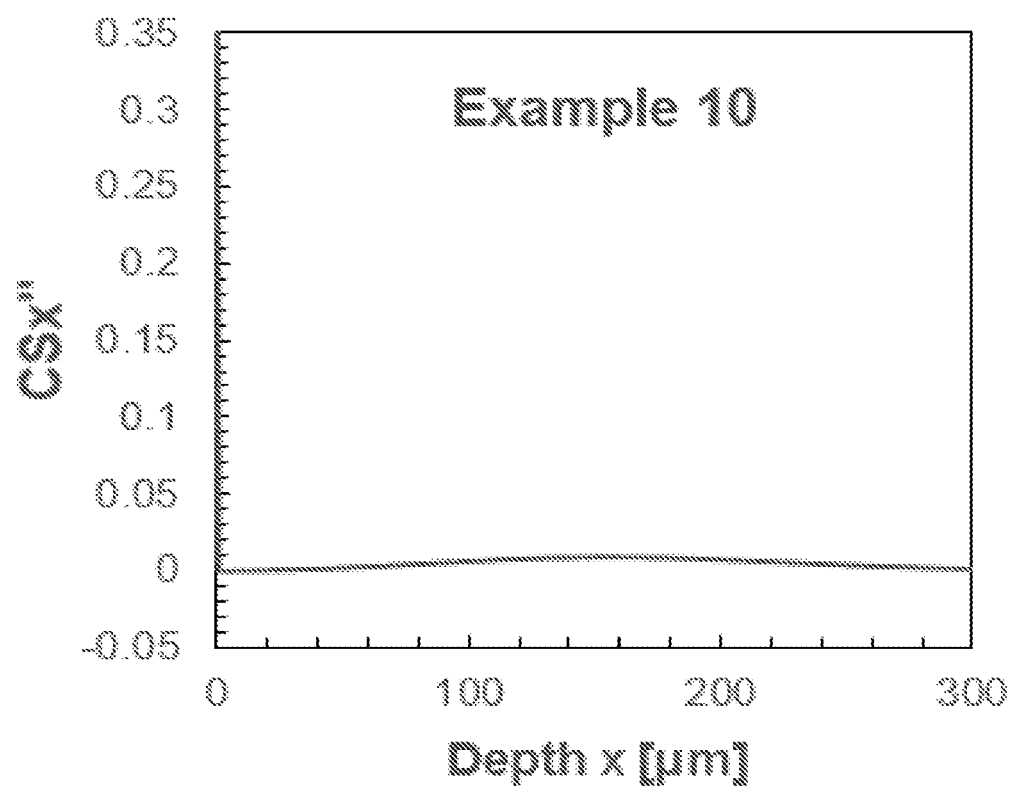
Figure 5K:
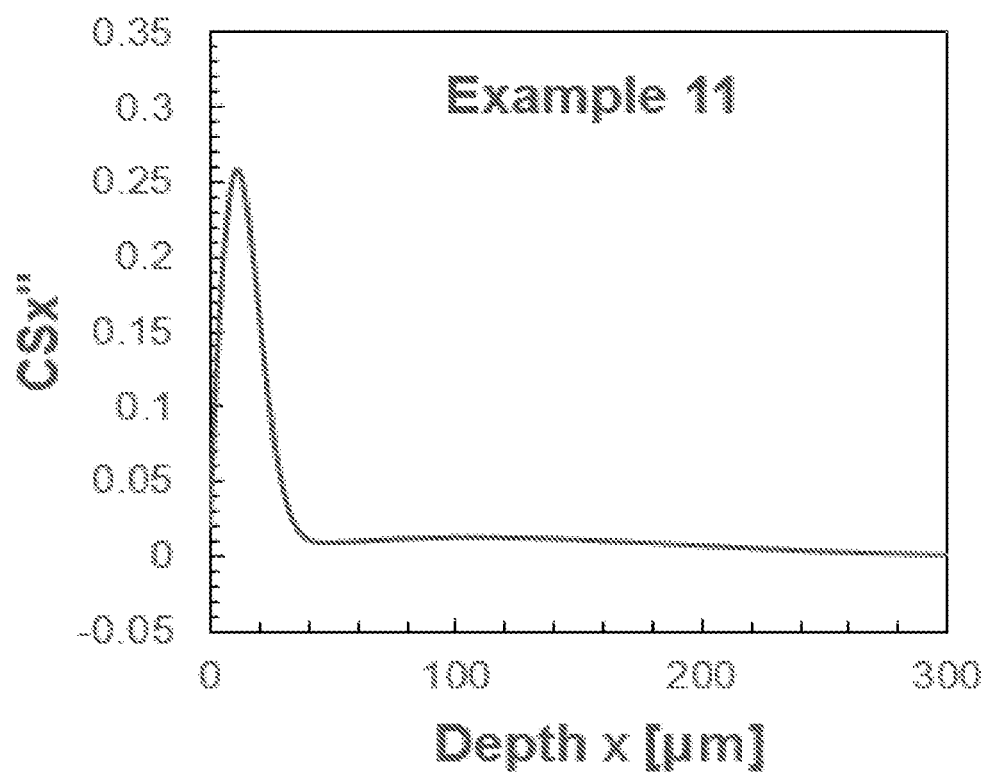
Figure 5L:
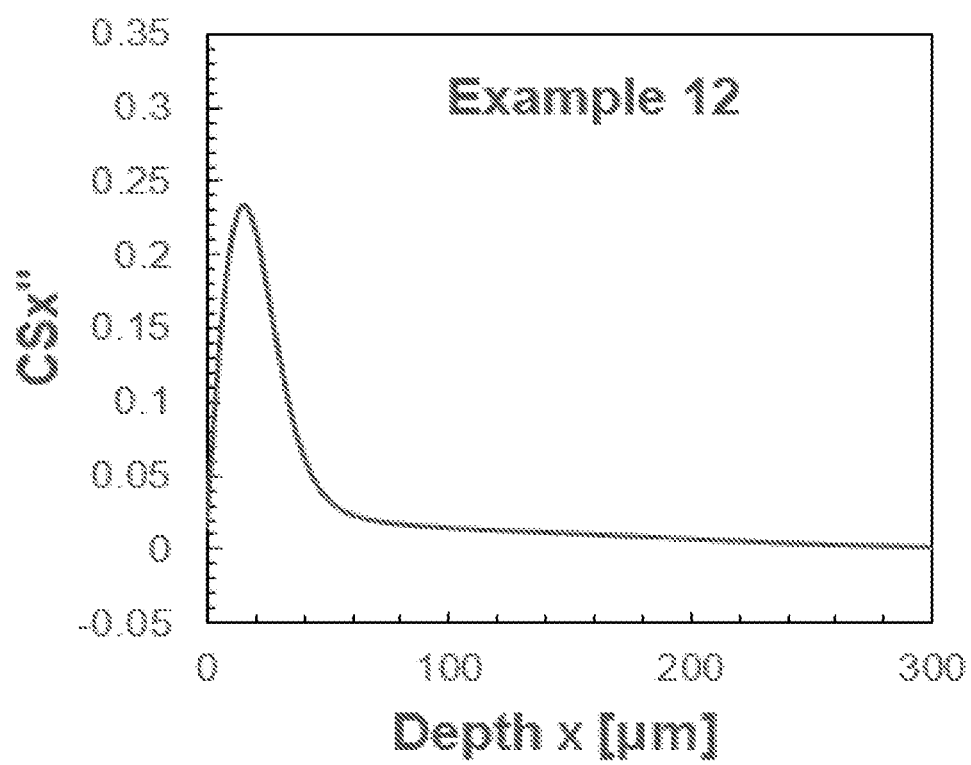
Figure 5M:
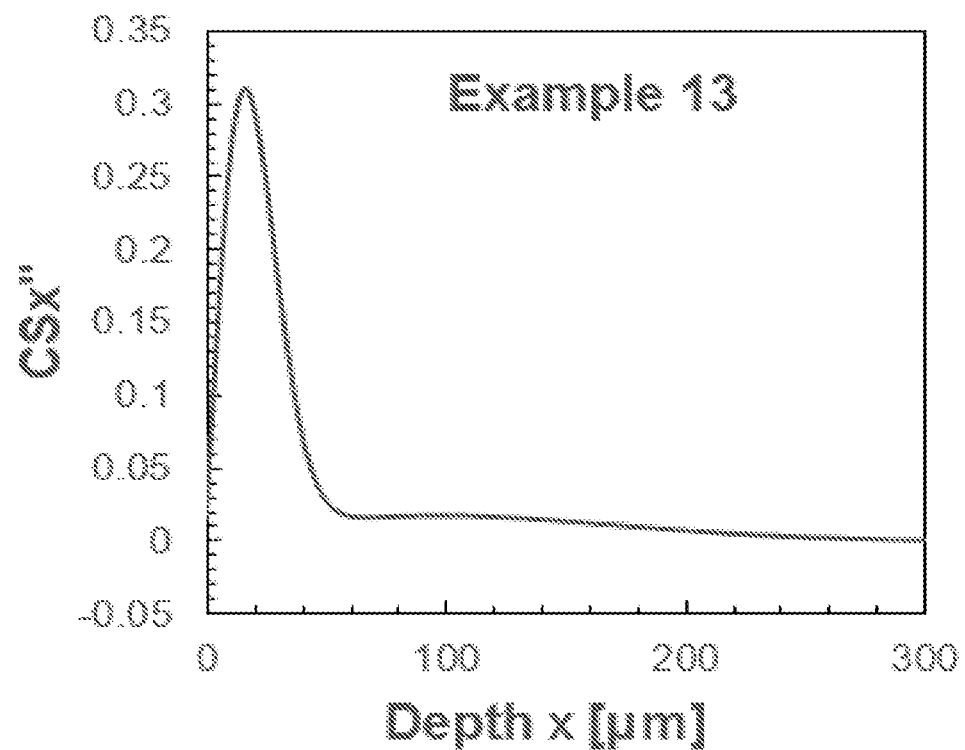
Figure 5N:
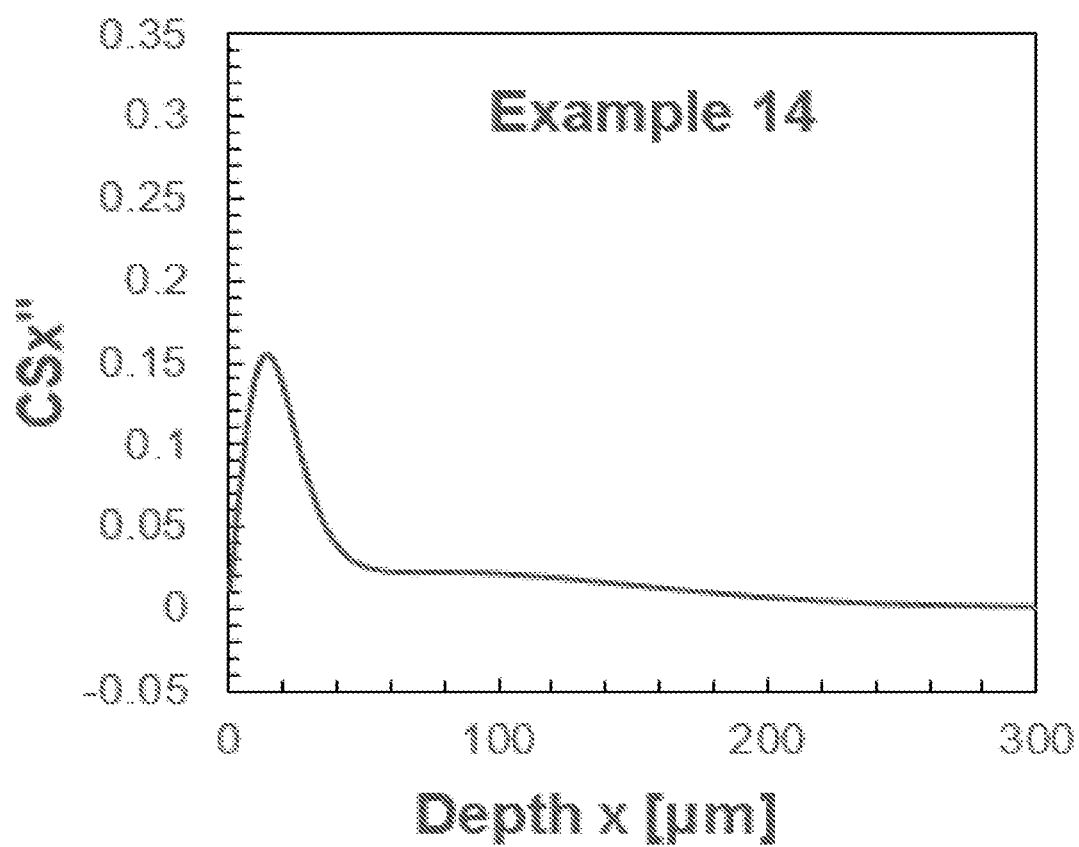
Figure 5O:
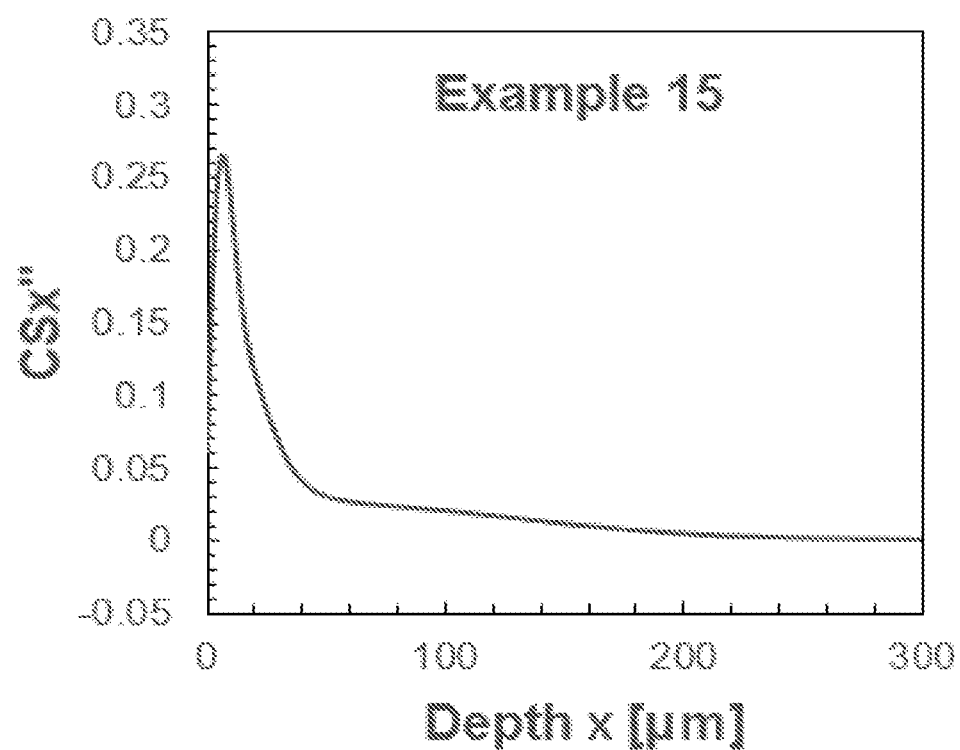
Figure 5P:
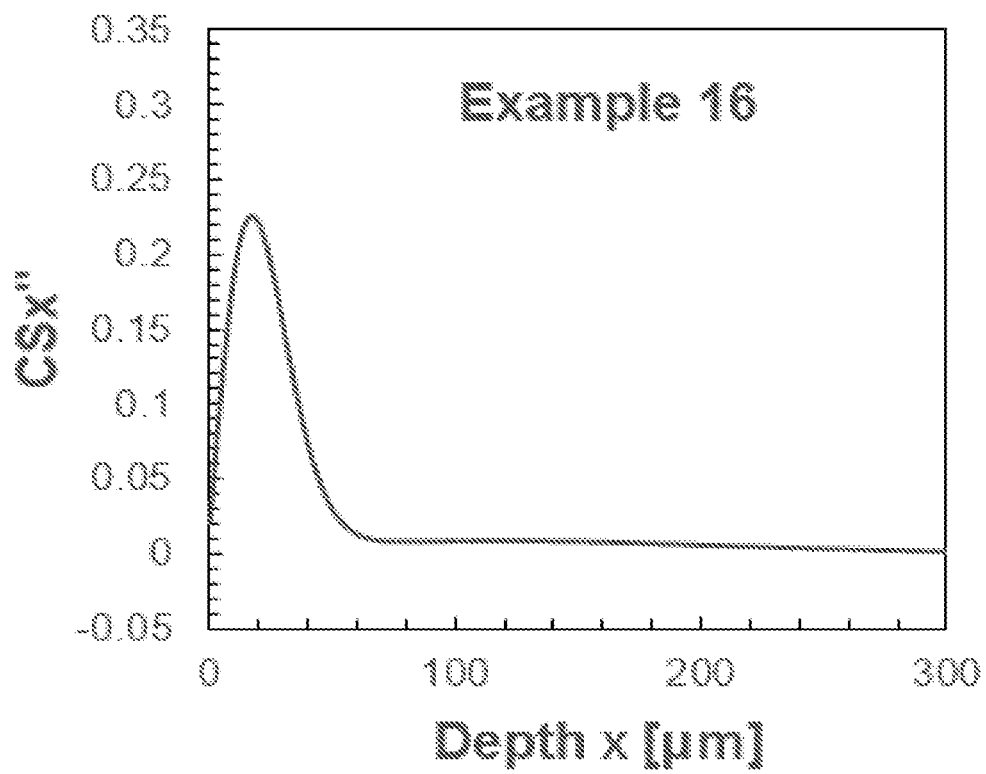
Figure 6:
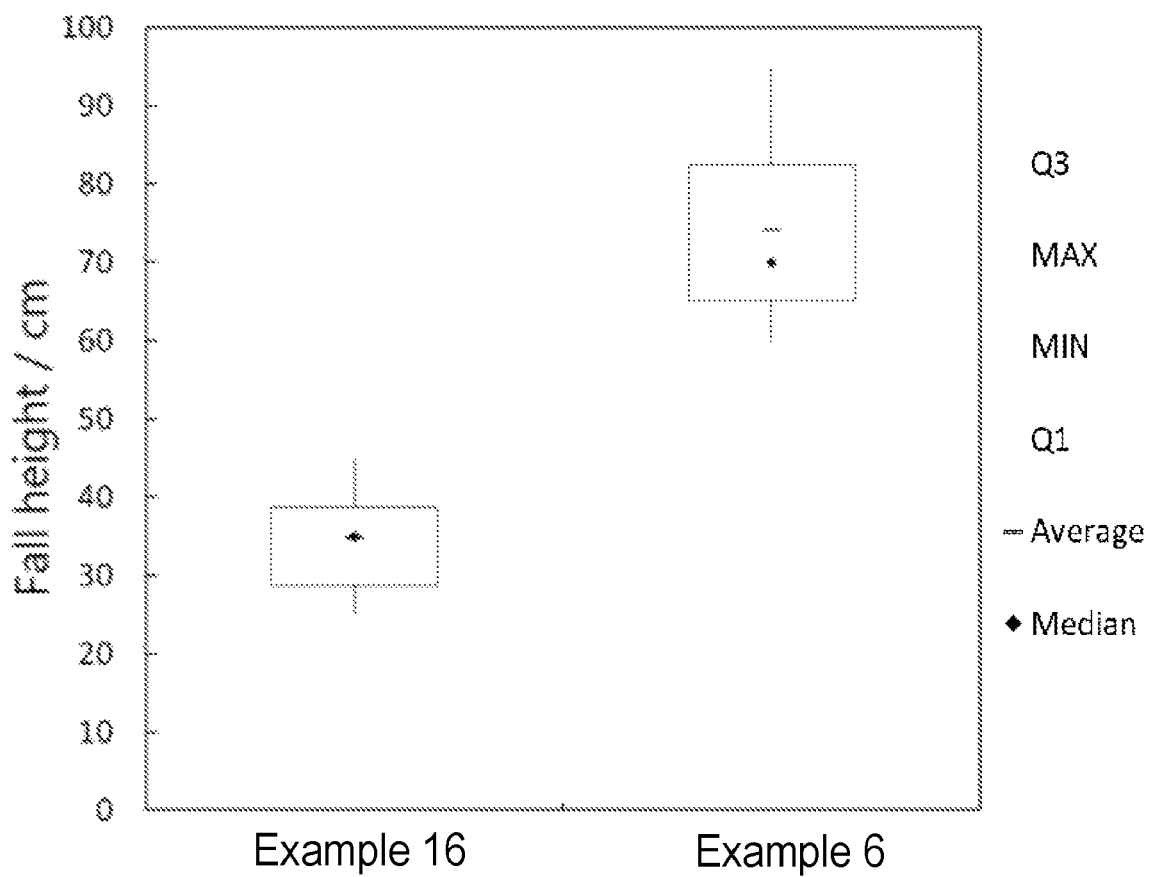
FIG. 6 shows results of drop strength tests of Examples.
Figure 7A:
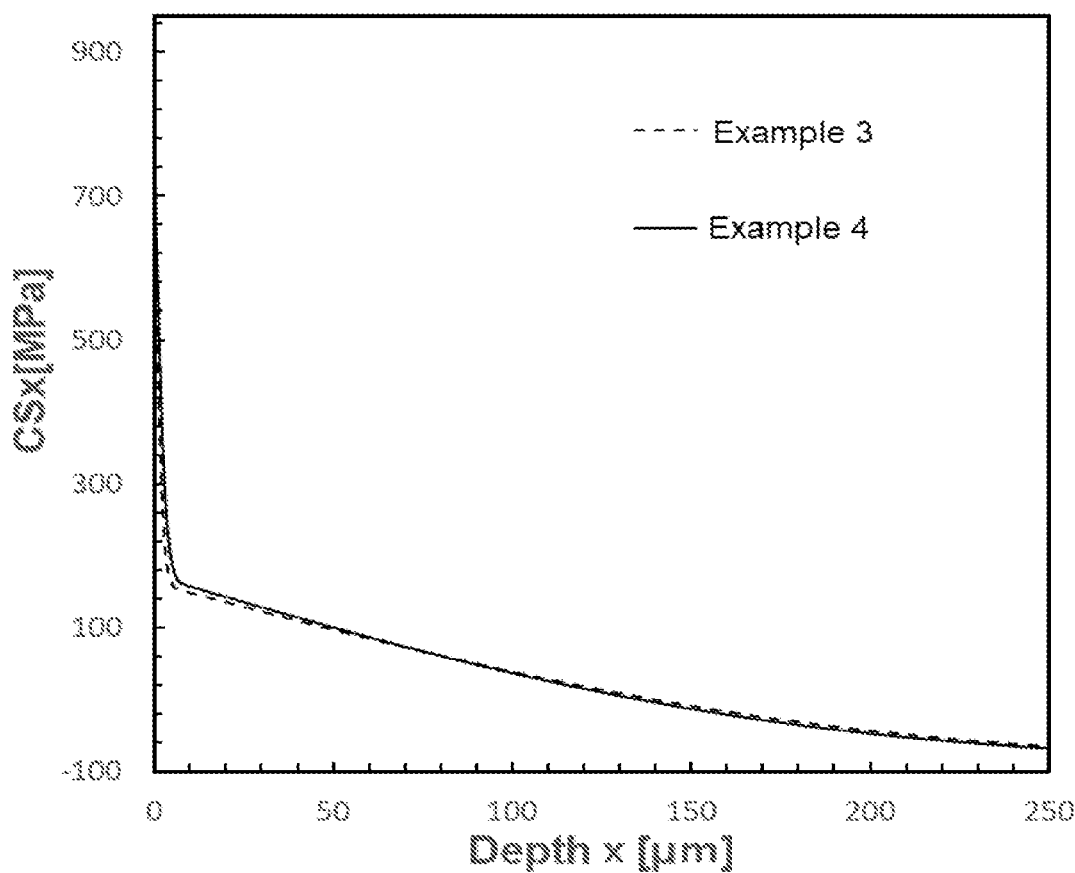
FIGS. 7A-7F show combined stress profiles of surface layers of Examples.
Figure 7B:
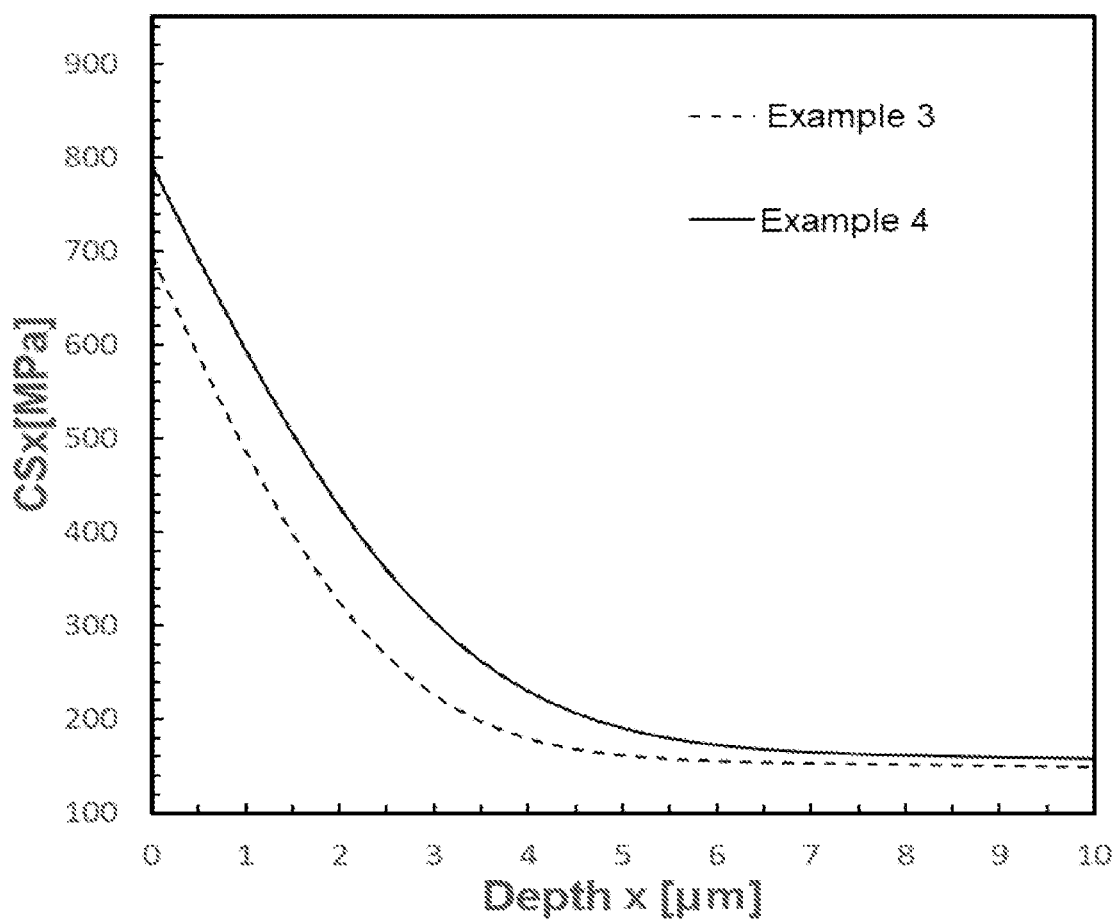
Figure 7C:
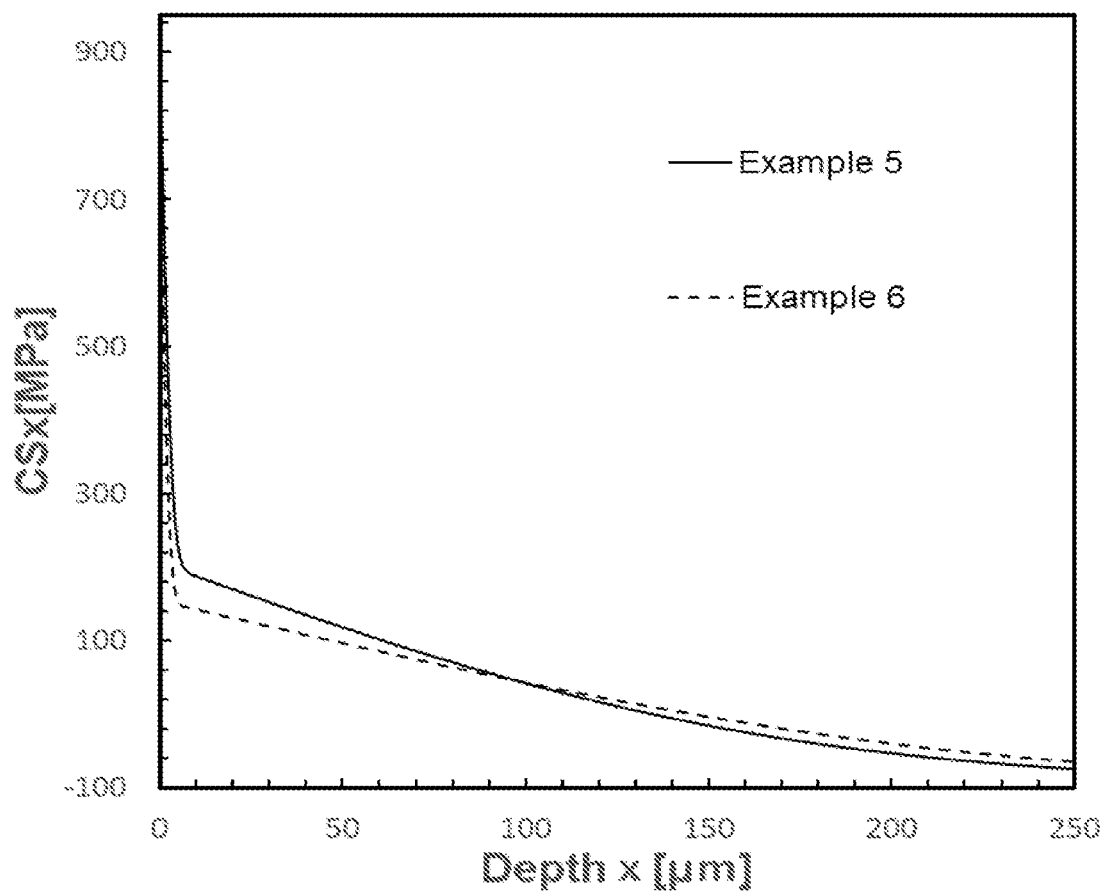
Figure 7D:
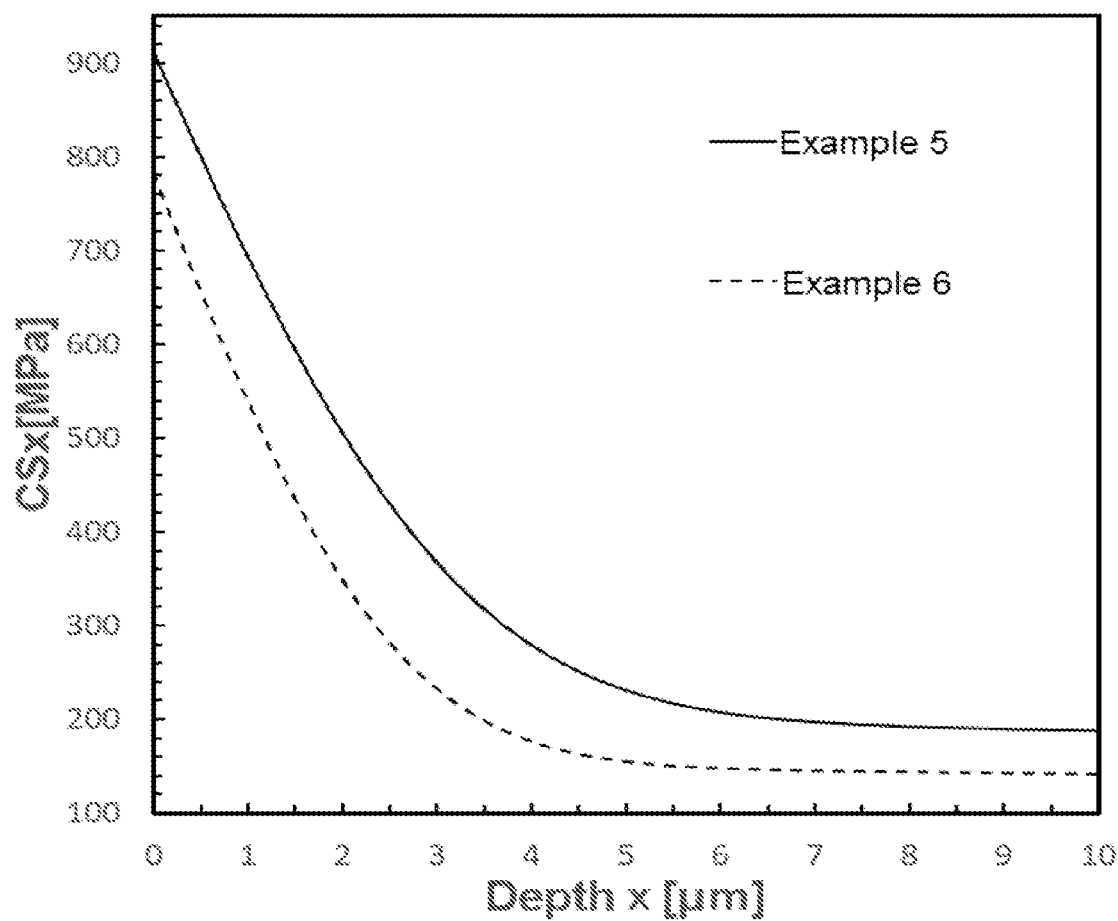
Figure 7E:
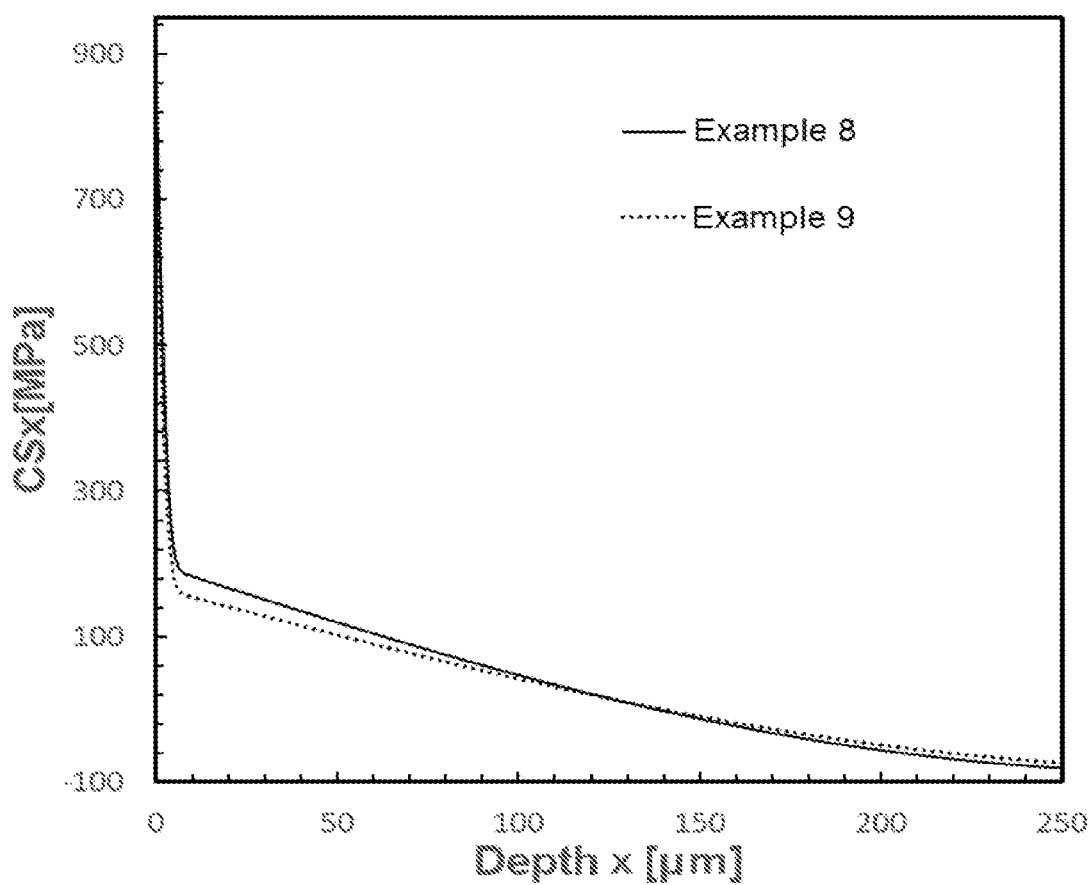
Figure 7F:
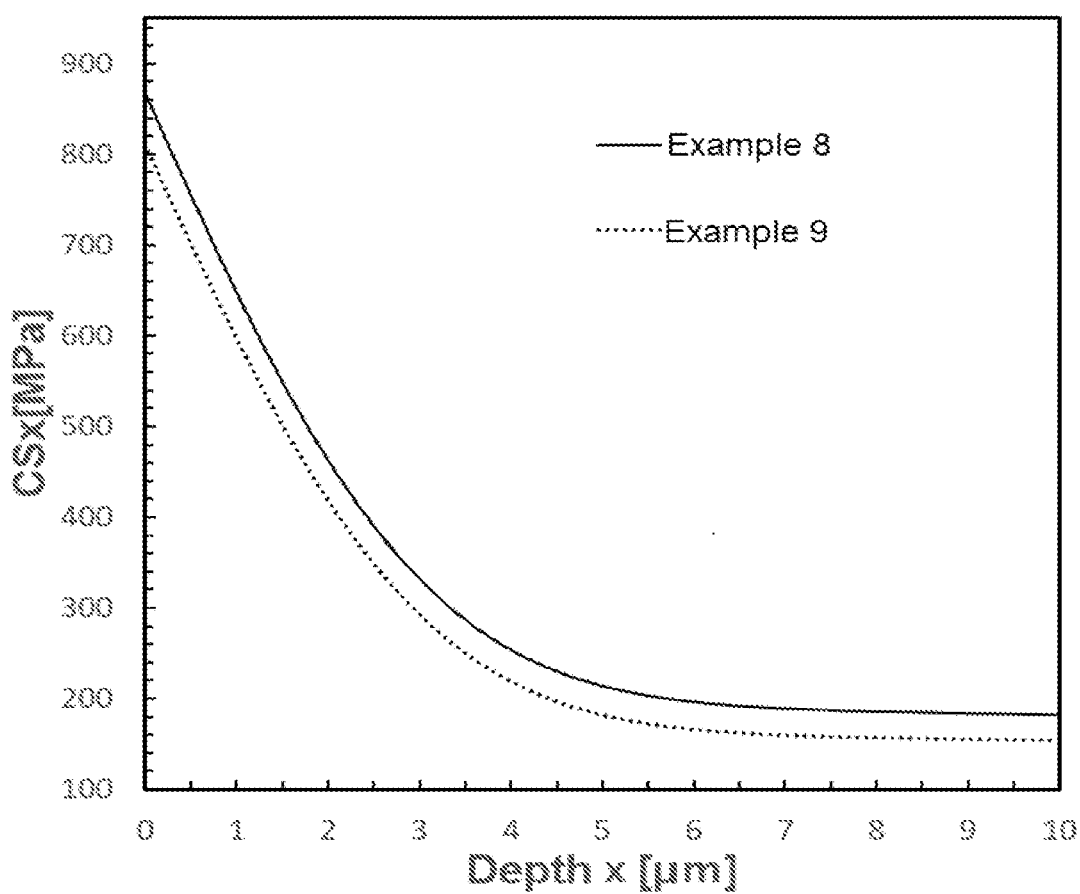

Results are shown in Tables 1 and 2 and FIG. 3A to FIG. 7F. FIGS. 3A-3P show profiles of stress values $CS_x$ of Examples 1-16 that were measured by an SLP, FIGS. 4A-4P show the absolute values of first-order derivatives $CS_x'$ of Examples 1-16, and FIGS. 5A-5P show second-order derivatives $CS_x''$ of Examples 1-16. FIGS. 7A-7F show graphs of stress profiles, each of which was obtained by combining stress measured by the SLP and stress measured by an FSM, of Examples 3-6, 8, and 9. FIGS. 7A, 7C, and 7E show entire combined stress profiles and FIGS. 7B, 7D, and 7F are enlarged graphs of parts, from the surface to a depth 10 μm, of the combined stress profiles shown in FIGS. 7A, 7C, and 7E, respectively.

[Drop Strength Test]

A drop strength test was performed in the following manner. Each of glass samples of Examples 6 and 15 having 120 mm×60 mm×0.7 mm t (thickness) was fitted into a structural body whose size, mass and stiffness were adjusted to those of common, currently used smartphones to simulate a smartphone, and a resulting sample structure was freely fallen onto an SiC sandpaper of #80. If the sample structure was not broken when it was dropped from a height of 5 cm, it was dropped again from a height that was 5 cm higher than the preceding height. This act was repeated until the sample structure was broken and a height at which the sample structure was broken for the first time was a break height. FIG. 6 is a box-and-whisker plot showing results of drop strength tests in which 19 sample structures were subjected to the drop strength test for each Example. As shown in FIG. 6, fall heights of Example 6 in which $CS_{90}$ was large were higher than those of Example 16.

[Number-of-Fragments Test]

A fracturing test was performed in which a diamond indenter having a tip angle of 90° was driven into a 50 mm×50 mm square chemically strengthened glass sample. If the glass sample was not broken, tests were repeated while the load imposed on the indenter was increased gradually and the number of fragments with load, which is a weakest load when breaking was occurred, was counted as number of fragments. If the number of fragments is larger than 10, it can be judged that CT exceeded a CT.

TABLE 1

|  |  | Ex. 1 | Ex. 2 | Ex. 3 | Ex. 4 | Ex. 5 |
|---|---|---|---|---|---|---|
| Glass material composition |  | A | A | A | A | A |
| First ion exchange | First molten salt composition (mass %) | NaNO₃ 100 | NaNO₃ 100 | NaNO₃ 100 | NaNO₃ 100 | NaNO₃ 100 |
|  | Temperature (° C.) | 420 | 420 | 420 | 420 | 420 |
|  | Time (min) | 75 | 75 | 110 | 110 | 110 |
| Second ion exchange | Second molten salt composition (mass %) | KNO₃ 99.1 NaNO₃ 0.6 LiNO₃ 0.3 | KNO3 99.7 LiNO₃ 0.3 | KNO₃ 99.25 LiNO₃ 0.75 | KNO₃ 99.5 LiNO₃ 0.5 | KNO₃ 99.5 LiNO₃ 0.5 |
|  | Additives (mass % with respect to total amount of second molten salt composition) | — | — | — | — | K₂CO₃ 0.5 Silica gel 0.5 |
|  | Temperature (° C.) | 400 | 400 | 400 | 400 | 400 |
|  | Time (min) | 60 | 60 | 80 | 100 | 100 |
| SLP profile | Thickness t (mm) | 0.7 | 0.7 | 0.7 | 0.7 | 0.7 |
|  | Maximum value of $CS_x''$ | 0.0151 | 0.0142 | 0.0065 | 0.0068 | 0.0088 |
|  | Minimum value of $CS_x''$ | 0.0011 | 0.0019 | 0.0005 | 0.0005 | 0.0006 |
|  | Maximum value of $CS_x'$ | −1.0441 | −0.9926 | −0.9323 | −0.9482 | −1.0857 |
|  | Minimum value of $CS_x'$ | −2.5455 | −2.5857 | −1.5024 | −1.5479 | −1.8805 |
|  | 19.5/(t/2 − DOL/1000) | 85 | 84 | 92 | 91 | 90 |
|  | 15/(t/2 − DOL/1000) | 65 | 65 | 71 | 70 | 69 |
|  | $CS_0$ (MPa) | 245 | 235 | 176 | 178 | 212 |
|  | $CT_2$ (MPa) | 75 | 73 | 77 | 80 | 85 |
|  | $CS_{90}$ (MPa) | 45 | 43 | 51 | 49 | 56 |
|  | $CS_{90}/\{CT_2 \times (t − 2 \times DOL/1,000)\}/t$ (/mm²) | 1.86 | 1.82 | 2.21 | 2.06 | 2.19 |
|  | DOL (μm) | 121 | 119 | 138 | 135 | 134 |
|  | $CT_2/CT_1$ | 0.96 | 0.94 | 0.82 | 0.84 | 0.90 |
| SLP/FSM combined profile | $CS_0$ (MPa) | — | — | — | 793 | 913 |
|  | $CS_{90}$ (MPa) | — | — | — | 49 | 56 |
|  | $CT_2$ (MPa) | — | — | — | 80 | 85 |
|  | DOL (μm) | — | — | — | 136 | 135 |

|  |  | Ex. 6 | Ex. 7 | Ex. 8 | Ex. 9 | Ex. 10 |
|---|---|---|---|---|---|---|
| Glass material composition |  | A | A | A | A | A |
| First ion exchange | First molten salt composition (mass %) | NaNO₃ 100 | NaNO₃ 100 | NaNO₃ 100 | NaNO₃ 100 | NaNO₃ 98.4 LiNO₃ 1.6 |
|  | Temperature (° C.) | 420 | 420 | 400 | 400 | 420 |
|  | Time (min) | 110 | 75 | 80 | 80 | 105 |
| Second ion exchange | Second molten salt composition (mass %) | KNO3 99 LiNO₃ 1 | KNO₃ 99.7 LiNO3 0.3 | KNO₃ 99 LiNO₃ 1 | KNO₃ 99 LiNO₃ 1 | KNO₃ 99.5 NaNO₃ 0.3 LiNO₃ 0.2 |
|  | Additives (mass % with respect to total amount of second molten salt composition) | K₂CO₃ 0.5 Silica gel 0.5 | — | K₂CO₃ 0.5 Silica gel 0.5 | — | — |
|  | Temperature (° C.) | 400 | 400 | 420 | 420 | 400 |
|  | Time (min) | 100 | 60 | 60 | 60 | 70 |
| SLP profile | Thickness t (mm) | 0.7 | 0.65 | 0.7 | 0.7 | 0.7 |
|  | Maximum value of $CS_x''$ | 0.0049 | 0.0105 | 0.0100 | 0.0087 | −0.0099 |
|  | Minimum value of $CS_x''$ | 0.0004 | 0.0008 | −0.0052 | −0.0135 | −1.7475 |
|  | Maximum value of $CS_x'$ | −0.8803 | −1.0029 | −1.2870 | −0.5323 | 0.3739 |
|  | Minimum value of $CS_x'$ | −1.2926 | −2.0198 | −1.5783 | −1.4355 | 0.00002 |
|  | 19.5/(t/2 − DOL/1000) | 94 | 96 | 90 | 91 | 88 |

TABLE 1-continued

|  |  |  |  |  |  |  |
|---|---|---|---|---|---|---|
|  | 15/(t/2 − DOL/1000) | 73 | 74 | 69 | 70 | 68 |
|  | $CS_0$ (MPa) | 161 | 204 | 195 | 147 | 183 |
|  | $CT_2$ (MPa) | 79 | 83 | 85 | 78 | 78 |
|  | $CS_{90}$ (MPa) | 52 | 41 | 66 | 65 | 47 |
|  | $CS_{90}/\{CT_2 \times (t − 2 \times DOL/1,000)\}/t$ (/mm²) | 2.27 | 1.89 | 2.56 | 2.77 | 1.96 |
|  | DOL (μm) | 144 | 122 | 134 | 136 | 128 |
|  | $CT_2/CT_1$ | 0.83 | 0.94 | 0.77 | 0.71 | 0.935 |
| SLP/FSM combined profile | $CS_0$ (MPa) | 783 | — | 866 | 811 | — |
|  | $CS_{90}$ (MPa) | 52 | — | 60 | 53 | — |
|  | $CT_2$ (MPa) | 79 | — | 86 | 80 | — |
|  | DOL (μm) | 145 | — | 137 | 139 | — |

TABLE 2

|  |  | Ex. 11 | Ex. 12 | Ex. 13 | Ex. 14 | Ex. 15 | Ex. 16 |
|---|---|---|---|---|---|---|---|
| Glass material composition |  | A | A | A | A | A | A |
| First ion exchange | First molten salt composition (mass %) | NaNO₃ 100 | NaNO₃ 100 | NaNO₃ 100 | NaNO₃ 100 | NaNO₃ 100 | NaNO₃ 100 |
|  | Temperature (° C.) | 420 | 380 | 420 | 380 | 380 | 380 |
|  | Time (min) | 75 | 150 | 75 | 150 | 90 | 120 |
| Second ion exchange | Second molten salt composition (mass %) | KNO₃ 99.7 NaNO₃ 0.3 | KNO₃ 100 | KNO₃ 99.7 NaNO₃ 0.3 | KNO₃ 100 | KNO₃ 100 | KNO₃ 99 NaNO₃ 1 |
|  | Additives (mass % with respect to total amount of second molten salt composition) | — | — | — | — | — | — |
|  | Temperature (° C.) | 400 | 400 | 400 | 400 | 400 | 440 |
|  | Time (min) | 60 | 60 | 60 | 60 | 60 | 60 |
| SLP profile | Thickness t (mm) | 0.65 | 0.65 | 0.7 | 0.7 | 0.7 | 0.7 |
|  | Maximum value of $CS_x''$ | 0.2590 | 0.2335 | 0.3105 | 0.1543 | 0.2656 | 0.2254 |
|  | Minimum value of $CS_x''$ | 0.0094 | 0.0117 | 0.0157 | 0.0165 | 0.0141 | 0.0078 |
|  | Maximum value of $CS_x'$ | −1.1373 | −1.0207 | −1.1454 | −1.0314 | −0.7253 | −0.8809 |
|  | Minimum value of $CS_x'$ | −7.3666 | −9.0498 | −11.1783 | −6.9512 | −7.9772 | −8.4140 |
|  | 19.5/(t/2 − DOL/1000) | 93 | 92 | 83 | 81 | 78 | 84 |
|  | 15/(t/2 − DOL/1000) | 72 | 71 | 64 | 63 | 60 | 65 |
|  | $CS_0$ (MPa) | 308 | 376 | 442 | 352 | 316 | 325 |
|  | $CT_2$ (MPa) | 95 | 87 | 85 | 78 | 61 | 77 |
|  | $CS_{90}$ (MPa) | 39 | 34 | 39 | 34 | 16 | 32 |
|  | $CS_{90}/\{CT_2 \times (t − 2 \times DOL/1,000)\}/t$ (/mm²) | 1.53 | 1.41 | 1.40 | 1.31 | 0.77 | 1.26 |
|  | DOL (μm) | 116 | 114 | 115 | 111 | 102 | 118 |
|  | $CT_2/CT_1$ | 1.07 | 1.23 | 1.09 | 1.10 |  |  |
| SLP/FSM combined profile | $CS_0$ (MPa) | — | — | — | — | — | — |
|  | $CS_{90}$ (MPa) | — | — | — | — | — | — |
|  | $CT_2$ (MPa) | — | — | — | — | — | — |
|  | DOL (μm) | — | — | — | — | — | — |

As seen from Tables 1 and 2, in Examples 1-10 which are Inventive Examples, $CS_x'$ was −4.7 or larger, as a result of which $CS_{90}$ was made larger than in Comparative Examples and the drop strength was increased.

$CT_1$ and DOL after the first ion exchange were 78 MPa and 94 am in Examples 1, 2, and 13, 95 MPa and 105 μm in Examples 3-6, 88 MPa and 100 μm in Examples 7 and 11, and 71 MPa and 86 μm in Examples 12 and 14. $CT_1$ was 110 MPa in Examples 8 and 9.

In Examples 1-10, the maximum tensile stress value $CT_1$ were introduced by the first ion exchange so that the maximum tensile stress value $CT_1$ became 19.5/(t/2−DOL/1,000) or larger, that is, $CT_1$ at this time exceeded the CT limit value. On the other hand, through the second ion exchange the maximum tensile stress value $CT_2$ became smaller than 19.5/(t/2−DOL/1,000), that is, $CT_2$ after the second ion exchange was smaller than the CT limit value. As shown in Table 1, the ratio of $CT_2$ after the second ion exchange to $CT_1$ after the first ion exchange (in Table 1, item $CT_2/CT_1$) was 0.99 or smaller. That is, in Examples 1-10, sufficiently large compressive stress was introduced by the first ion exchange and the total amount of compressive stress was reduced while $CS_{90}$ was kept large by the second ion exchange, whereby the maximum tensile stress value $CT_2$ was made smaller than the CT limit. Furthermore, in Examples 5, 6, and 8, it is seen that by adding silica gel and potassium carbonate in the second molten salt composition, "Na—K exchange" was accelerated and $CS_0$ was increased in the SLP/FSM combined profile.

On the other hand, in Examples 11-16 which are Comparative Examples, lithium nitrate was not added to the second molten salt composition at the second ion exchange, and the value of $CS_{90}/\{CT_2 \times (t−2 \times DOL/1,000)\}/t$ was smaller than in Inventive Examples. Furthermore, in Examples 11 and 13, the maximum tensile stress value $CT_2$ after the second ion exchange was larger than 19.5/(t/2−DOL/1,000), that is, exceeded the CT limit. This means that breaking may occur explosively to make the number of fragments very large. On the other hand, in Examples 12 and 14, $CS_{90}$ was small because the $CT_1$ value after the first ion exchange was made small so that the maximum tensile stress value $CT_2$ after the second ion exchange became the CT limit or smaller.

Table 3 shows Inventive Examples 17-19 and Comparative Example 20 in each which chemically strengthened glass was manufactured that had a base composition containing $SiO_2$ of 40 to 75%, $Al_2O_3$ of 10 to 20% and $Li_2O$ of 5 to 35% as represented by mol % based on oxides. The chemically strengthened glass of each of Inventive Examples 17-19 satisfied $CS_{90}/\{CT_2\times(t-2\times DOL/1,000)\}/t \geq 2.00$. In Comparative Example 20, $CS_{90}/\{CT_2\times(t-2\times DOL/1,000)\}/t$ had a small value.

TABLE 3

|  |  | Example 17 | Example 18 | Example 19 | Example 20 |
|---|---|---|---|---|---|
| First ion exchange | First molten salt composition (mass %) | $NaNO_3$ 100 | $NaNO_3$ 100 | $NaNO_3$ 100 | $NaNO_3$ 100 |
|  | Temperature (° C.) | 390 | 390 | 390 | 390 |
|  | Time (min) | 360 | 310 | 280 | 180 |
| Second ion exchange | Second molten salt composition (mass %) | $KNO_3$ 99.5 $NaNO_3$ 0.5 | $KNO_3$ 99.5 $NaNO_3$ 0.5 | $KNO_3$ 99.5 $NaNO_3$ 0.5 | $KNO_3$ 100 |
|  | Additives (mass % with respect to total amount of second molten salt composition) | — | — | — | — |
|  | Temperature (° C.) | 410 | 410 | 410 | 410 |
|  | Time (min) | 60 | 60 | 60 | 60 |
| SLP profile | Thickness t (mm) | 0.7 | 0.65 | 0.65 | 0.7 |
|  | $CT_2$ (MPa) | 107 | 112 | 103 | 98 |
|  | $CS_{90}$ (MPa) | no | 100 | 80 | 49 |
|  | $CS_{90}\{CT_2\times(t-2\times DOL/1,000)\}/t$ (/mm$^2$) | 3.23 | 3.43 | 2.86 | 1.45 |
|  | DOL (μm) | 123 | 125 | 116 | 104 |
|  | $CT_2/CT_1$ | 0.71 | 0.75 | 0.80 | 1.21 |

In Inventive Examples 17-19, the ratio of $CT_2$ after the second ion exchange to $CT_1$ after the first ion exchange (in Table 3, item $CT_2/CT_1$) was 0.99 or smaller. In Inventive Examples 17-19, $CT_1$ was larger than that in Comparative Example 20, sufficiently large compressive stress was introduced by the first ion exchange and the total amount of compressive stress was reduced while $CS_{90}$ was kept large by the second ion exchange, whereby the maximum tensile stress value $CT_2$ was made smaller than the CT limit.

The present application is based on Japanese Patent Application No. 2021-030726 filed on Feb. 26, 2022, and the contents thereof are incorporated herein by reference.

What is claimed is:

1. A chemically strengthened glass having a thickness t in mm, wherein a first-order derivative $CS_x'$ of a stress value $CS_x$ in MPa is −4.7 or larger in a range of $CS_x \geq 0$ in a profile of the stress value $CS_x$ in MPa,
    wherein the stress value $CS_x$ in MPa is a function of a depth x in μm from a glass surface,
    wherein the stress value $CS_x$ in MPa is measured by a scattered light photoelastic stress meter,
    wherein a base composition of the chemically strengthened glass comprises, as represented by mol % based on oxides,
    from 52 mol % to 75 mol % of $SiO_2$;
    from 8 mol % to 20 mol % of $Al_2O_3$;
    5 mol % to 16 mol % of $Li_2O$; and
    8 mol % or less of $Na_2O$, and
    wherein a maximum stress value $CS_{90}$ at a depth 90 μm from a glass surface satisfies the following inequality:

$CS_{90}/\{CT_2\times(t-2\times DOL/1,000)\}/t \geq 1.62$, wherein t is the thickness in mm, $CT_2$ is a tensile stress in MPa and DOL is a compressive stress layer depth in μm.

2. The chemically strengthened glass according to claim 1, wherein in the profile of the stress value $CS_x$, a second-order derivative $CS_x''$ of the stress value $CS_x$ satisfies $CS_x'' \leq 0.050$.

3. The chemically strengthened glass according to claim 1, wherein a second-order derivative $CS_x''$ of the stress value $CS_x$ is greater than 0.

4. The chemically strengthened glass according to claim 1, wherein the first-order derivative $CS_x'$ of the stress value $CS_x$ is 0 or smaller.

5. The chemically strengthened glass according to claim 1, wherein in the profile of the stress value $CS_x$ in MPa, a stress value $CS_0$ at a glass outermost surface is 300 MPa or smaller.

6. The chemically strengthened glass according to claim 1, wherein a maximum tensile stress $CT_2$ in MPa satisfies the following inequality:

$CT_2 \leq 19.5/(t/2-DOL/1,000)$, wherein t is the thickness in mm and DOL is a compressive stress layer depth in μm.

7. The chemically strengthened glass according to claim 1, wherein:
    the chemically strengthened glass is a chemically strengthened glass obtained by a chemical strengthening of at least two steps; and
    a maximum tensile stress $CT_2$ in MPa of the chemically strengthened glass is from 50% to 99% of a maximum tensile stress $CT_1$ in MPa of a chemically strengthened glass obtained after a first-stage chemical strengthening of the chemical strengthening of the at least two steps.

* * * * *